United States Patent
Yoshida et al.

(10) Patent No.: US 9,767,234 B2
(45) Date of Patent: Sep. 19, 2017

(54) METHOD OF IDENTIFICATION OF CAUSE AND/OR LOCATION OF CAUSE OF OCCURRENCE OF SPRINGBACK

(75) Inventors: Tohru Yoshida, Tokyo (JP); Shunji Hiwatashi, Tokyo (JP); Seiichi Daimaru, Tokyo (JP); Yasuharu Tanaka, Tokyo (JP); Takashi Ariga, Tokyo (JP); Toshiyuki Niwa, Tokyo (JP); Yukihisa Kuriyama, Tokyo (JP); Satoru Okayama, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1377 days.

(21) Appl. No.: 12/439,126

(22) PCT Filed: Aug. 30, 2007

(86) PCT No.: PCT/JP2007/067358
§ 371 (c)(1),
(2), (4) Date: Feb. 26, 2009

(87) PCT Pub. No.: WO2008/026777
PCT Pub. Date: Mar. 6, 2008

(65) Prior Publication Data
US 2010/0005845 A1    Jan. 14, 2010

(30) Foreign Application Priority Data

Aug. 31, 2006  (JP) .................. 2006-236314
Sep. 8, 2006   (JP) .................. 2006-244351
(Continued)

(51) Int. Cl.
*G06F 17/50*     (2006.01)

(52) U.S. Cl.
CPC ...... *G06F 17/5018* (2013.01); *G06F 2217/16* (2013.01); *Y02T 10/82* (2013.01)

(58) Field of Classification Search
CPC ... G06F 17/5018; G06F 2217/16; Y02T 10/82
(Continued)

(56) References Cited

U.S. PATENT DOCUMENTS 3,333,445 A * 8/1967 Mergler et al. ............. 72/16.2
3,352,136 A * 11/1967 Clarke ....................... 72/16.2
(Continued)

FOREIGN PATENT DOCUMENTS

CN   101495251 A       7/2009
EP       1327695 A1 *  7/2003   ........... C22C 38/06
(Continued)

OTHER PUBLICATIONS

"Advanced Strength and Applied Elasticity," 4th editon, by Ansel c. Ugural, Saul K. Fenster, copyright (c) 2003 by Pearson Education, Inc. Publishing as Prentice Hall Professional Technical Refernece Upper Saddle River, New Jersey 07458 ISBN 0-10-047392-8.*
(Continued)

*Primary Examiner* — David Bryant
*Assistant Examiner* — Lawrence Averick
(74) *Attorney, Agent, or Firm* — Birch, Stewart, Kolasch & Birch, LLP

(57) ABSTRACT

A method of identification of a cause of occurrence of springback comprising a press forming analysis step of numerically analyzing forming conditions of press forming to obtain forming data of a press formed part, a processing step of processing at least one of a physical property value and physical property quantity data of part of the regions of said press formed part among forming data of said press formed part, and a springback value calculation step of calculating a springback value based on the results of said processing.

19 Claims, 73 Drawing Sheets

(a)

(b)

(c)

(30) Foreign Application Priority Data

| Sep. 29, 2006 | (JP) | ................................ | 2006-268855 |
| Sep. 29, 2006 | (JP) | ................................ | 2006-269253 |
| Oct. 2, 2006 | (JP) | ................................ | 2006-270693 |
| Oct. 2, 2006 | (JP) | ................................ | 2006-271097 |

(58) Field of Classification Search
 USPC ................ 702/33, 41–44, 73, 85, 108, 151;
 72/16.2, 16.3, 17.3, 18.1, 18.2, 31.1,
 72/31.11, 389.3, 702
 See application file for complete search history.

(56) References Cited

U.S. PATENT DOCUMENTS

| 3,474,650 | A | * | 10/1969 | Clewley et al. | ............... | 72/18.2 |
| 3,821,525 | A | * | 6/1974 | Easton et al. | ................. | 700/165 |
| 3,860,803 | A | * | 1/1975 | Levine | ........................... | 700/98 |
| 4,430,879 | A | * | 2/1984 | Rolland | ...................... | 72/389.3 |
| 4,552,002 | A | * | 11/1985 | Haenni et al. | ................. | 72/21.4 |
| 4,640,113 | A | * | 2/1987 | Dieperink et al. | ............ | 72/16.2 |
| 4,802,357 | A | * | 2/1989 | Jones | ........................... | 72/17.3 |
| 4,819,467 | A | * | 4/1989 | Graf et al. | ...................... | 72/20.1 |
| 4,864,509 | A | * | 9/1989 | Somerville et al. | ........... | 700/165 |
| 4,947,666 | A | * | 8/1990 | Hametner et al. | ................ | 72/37 |
| 4,979,385 | A | * | 12/1990 | LaFrasse et al. | ............. | 72/17.3 |
| 4,989,439 | A | * | 2/1991 | Ewert et al. | .................... | 72/372 |
| 5,007,264 | A | * | 4/1991 | Haack | .......................... | 72/17.3 |
| 5,275,031 | A | * | 1/1994 | Whiteside et al. | ............ | 72/17.3 |
| 5,285,668 | A | * | 2/1994 | Tokai | ........................... | 72/17.3 |
| 5,341,303 | A | * | 8/1994 | Foroudastan et al. | ........ | 700/145 |
| 5,345,803 | A | * | 9/1994 | Cutter | ........................... | 72/157 |
| 5,483,750 | A | * | 1/1996 | Ooenoki et al. | ................ | 33/534 |
| 5,528,504 | A | * | 6/1996 | Brewer | .......................... | 700/97 |
| 5,704,238 | A | * | 1/1998 | Tokai | .......................... | 72/31.11 |
| 5,743,124 | A | * | 4/1998 | Sugiyama et al. | ............. | 72/166 |
| 5,829,288 | A | * | 11/1998 | Serruys | .......................... | 72/17.1 |
| 5,839,310 | A | * | 11/1998 | Tokai et al. | ..................... | 72/31.1 |
| 5,842,366 | A | * | 12/1998 | Klingel et al. | ................. | 72/31.1 |
| 5,857,366 | A | * | 1/1999 | Koyama | ......................... | 72/31.1 |
| 5,865,056 | A | * | 2/1999 | Nagakura | ....................... | 72/461 |
| 5,899,103 | A | * | 5/1999 | Ooenoki et al. | ............... | 72/31.1 |
| 5,913,929 | A | * | 6/1999 | Gustafsson et al. | ........... | 72/31.1 |
| 5,992,210 | A | * | 11/1999 | Blurton-Jones | ................ | 72/702 |
| 6,098,435 | A | * | 8/2000 | Takada | ......................... | 72/31.11 |
| 6,161,408 | A | * | 12/2000 | Ooenoki et al. | ............. | 72/31.01 |
| 6,189,364 | B1 | * | 2/2001 | Takada | .......................... | 72/702 |
| 6,205,366 | B1 | * | 3/2001 | Tang et al. | ....................... | 700/97 |
| 6,292,716 | B1 | * | 9/2001 | Moore et al. | .................... | 700/260 |
| 6,522,979 | B1 | * | 2/2003 | Yavari et al. | .................... | 702/42 |
| 6,553,803 | B1 | * | 4/2003 | Heingartner et al. | ......... | 72/31.1 |
| 6,571,589 | B1 | * | 6/2003 | Ito et al. | ....................... | 72/31.11 |
| 6,581,427 | B2 | * | 6/2003 | Gerritsen | ...................... | 72/31.11 |
| 6,651,472 | B2 | * | 11/2003 | Chebbi | .......................... | 72/31.1 |
| 6,662,610 | B1 | * | 12/2003 | Sekita et al. | .................... | 72/31.1 |
| 6,708,541 | B1 | * | 3/2004 | Matsumoto et al. | .......... | 72/31.1 |
| 6,722,181 | B2 | * | 4/2004 | Nagakura | ....................... | 72/461 |
| 6,748,788 | B2 | * | 6/2004 | Yamano et al. | ............. | 72/379.2 |
| 6,751,993 | B2 | * | 6/2004 | Sekita et al. | .................... | 72/31.1 |
| 6,810,352 | B2 | * | 10/2004 | Sasahara | ....................... | 702/155 |
| 7,040,129 | B2 | * | 5/2006 | Koyama et al. | ................ | 72/31.11 |
| 7,089,774 | B2 | * | 8/2006 | Takahashi | .................... | 72/389.3 |
| 7,130,714 | B1 | * | 10/2006 | Kulkarni et al. | ............. | 700/165 |
| 7,249,478 | B2 | * | 7/2007 | Takehara et al. | .............. | 72/31.1 |
| 7,321,365 | B2 | * | 1/2008 | Brombolich | .................. | 345/420 |
| 7,395,128 | B2 | * | 7/2008 | Zhu et al. | ....................... | 700/97 |
| 7,464,011 | B2 | * | 12/2008 | Ren et al. | ......................... | 703/2 |
| 7,542,889 | B2 | * | 6/2009 | Hillmann et al. | ............... | 703/6 |
| 7,584,637 | B2 | * | 9/2009 | Ghiran et al. | ............... | 72/31.05 |
| 7,809,455 | B2 | * | 10/2010 | Kanai et al. | .................... | 700/98 |
| 7,957,918 | B2 | * | 6/2011 | Niwa | ..................... | B21D 22/02 |
| | | | | | | 702/33 |
| 2003/0015012 | A1 | * | 1/2003 | Nagakura | .................... | 72/31.11 |
| 2003/0050765 | A1 | | 3/2003 | Sasahara | | |
| 2003/0196735 | A1 | * | 10/2003 | Sugiura et al. | ............... | 148/602 |
| 2006/0117824 | A1 | * | 6/2006 | Takehara et al. | ............ | 72/31.11 |
| 2006/0201229 | A1 | * | 9/2006 | Zhu et al. | ........................ | 72/413 |
| 2008/0072652 | A1 | * | 3/2008 | Mondani | ...................... | 72/389.3 |
| 2009/0119031 | A1 | * | 5/2009 | Niwa | ..................... | B21D 22/02 |
| | | | | | | 702/43 |
| 2009/0177417 | A1 | * | 7/2009 | Yonemura | ................ | G01N 3/00 |
| | | | | | | 702/42 |
| 2009/0178453 | A1 | * | 7/2009 | Ghiran et al. | ............... | 72/31.05 |
| 2010/0005845 | A1 | * | 1/2010 | Yoshida et al. | ............. | 72/31.01 |
| 2010/0241366 | A1 | | 9/2010 | Nonomura et al. | | |
| 2010/0281942 | A1 | * | 11/2010 | Carlini | ............................ | 72/369 |
| 2011/0094279 | A1 | * | 4/2011 | Suzuki et al. | ................ | 72/17.3 |
| 2011/0166685 | A1 | * | 7/2011 | Suzuki et al. | ................ | 700/103 |

FOREIGN PATENT DOCUMENTS

| EP | 2058062 | A1 | * | 5/2009 | ............ | G06F 17/50 |
| EP | 2062663 | A1 | | 5/2009 | | |
| JP | 07303919 | | | 11/1995 | | |
| JP | 8-10851 | A | | 1/1996 | | |
| JP | 2000312933 | A | | 11/2000 | | |
| JP | 2003-33828 | A | | 2/2003 | | |
| JP | 2003-157229 | A | | 5/2003 | | |
| JP | 2003340529 | A | | 12/2003 | | |
| JP | 2004337968 | A | | 12/2004 | | |
| JP | 2005-28410 | A | | 2/2005 | | |
| JP | 2005205450 | A | | 8/2005 | | |
| JP | 2006-31594 | A | | 2/2006 | | |
| JP | 2007111725 | A | * | 5/2007 | | |
| JP | 2006-051256 | | | 9/2007 | | |
| JP | 2007-229724 | A | | 9/2007 | | |
| JP | 2008-49389 | A | | 3/2008 | | |
| WO | WO 03072278 | A1 | * | 9/2003 | ............... | B21D 5/02 |
| WO | WO 2006063683 | A1 | * | 6/2006 | | |

OTHER PUBLICATIONS

"Shape Control Techniques for High Strength Steel Metal Forming," Nippon Steel Technical Report No. 88 Jul. 2003.*

"Shape control Techniques for High Strength Steel in Sheet Metal Forming," by Tohru Yoshida, Tomohisa Katayama, Koji Hashimoto, Yukihisa Kuriyama Nippon Steel Technical Report No. 88 Jul. 2003.*

Office Action dated Nov. 12, 2010 in Chinese Application No. 200780032577.9.

Ren, Zhi-guo et al., "Numerical Simulation of Forming and Springback Process on Engine-hood," Journal Harbin University Science and Technology, vol. 11, No. 1, pp. 246-248, Feb. 2006.

Xu, Wei-Li et al., "Stamping stiffnes coupling simulation techniques," Forging and Stamping Technology, pp. 6-8, Jan. 2006.

Office Action for Japanese Patent Application No. 2006-236314, mailed Nov. 17, 2009.

Matsuyama et al., "Latest Stamping Simulation Technique" New Technologies, Mitsubishi Motors Technical Review, 2006, No. 18, pp. 126-131.

Notice of Reasons for Rejection in related Japanese Application No. 2006-236314 dated Apr. 27, 2006 including partial English translation of descriptions regarding Article 29-bis.

JP Office Action issued in JP Patent Application No. 2009-092505, dated Oct. 4, 2011.

Canadian Office Action dated Feb. 27, 2012, issued in corresponding Canadian Application No. 2,662,109.

R. Lingbeek, et al., "The Development of a Finite Elements Based Springback Compensation Tool for Sheet Metal Products," Journal of Materials Processing Technology, vol. 169(1), pp. 115-125, (2005).

* cited by examiner

Fig.1
(a) 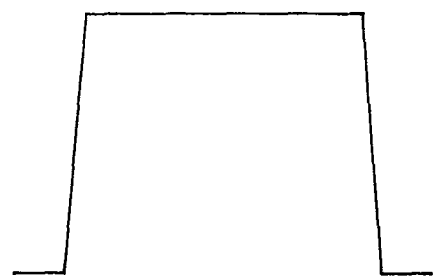
(b) 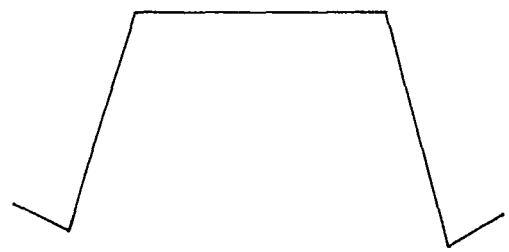
(c) 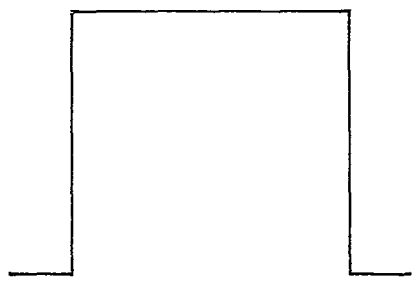

Fig.2
(a) 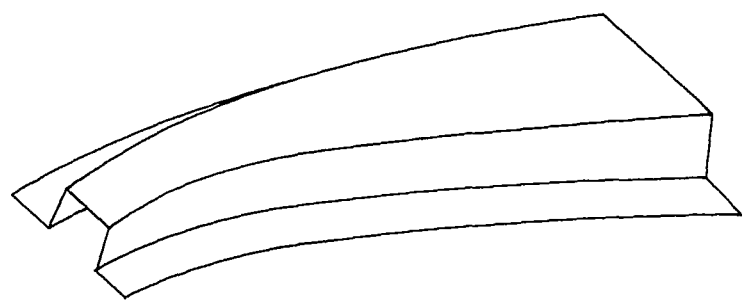
(b) 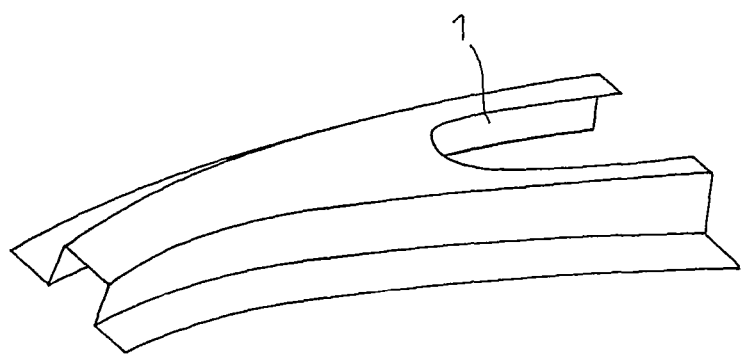
(c) 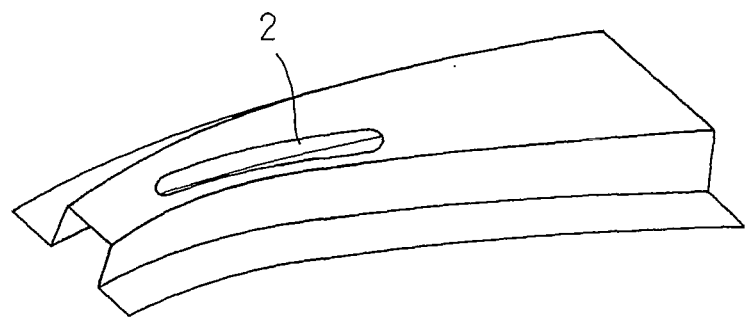
(d) 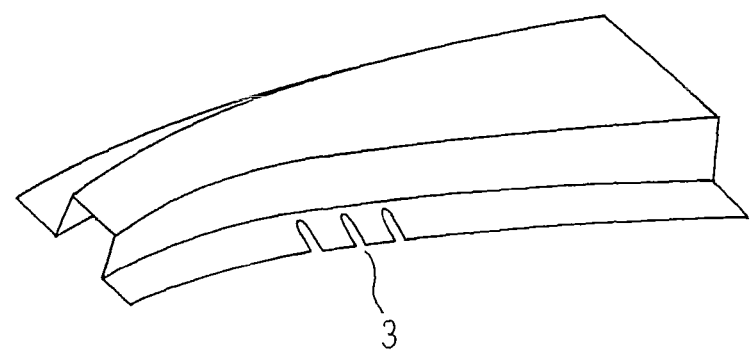

Fig.6
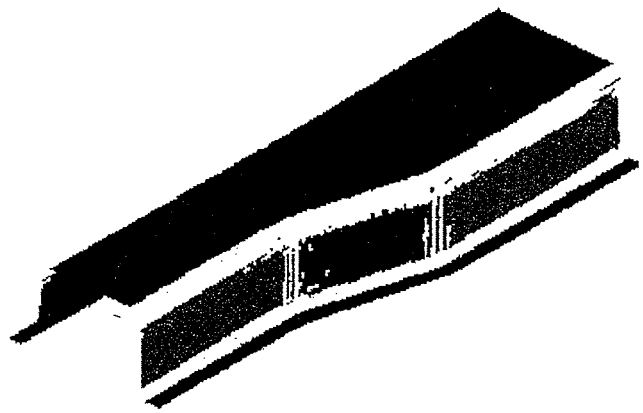
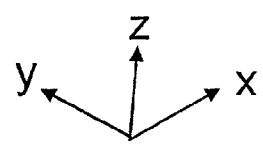

Fig.9
(a)
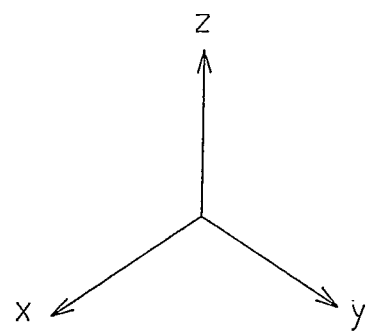
(b)
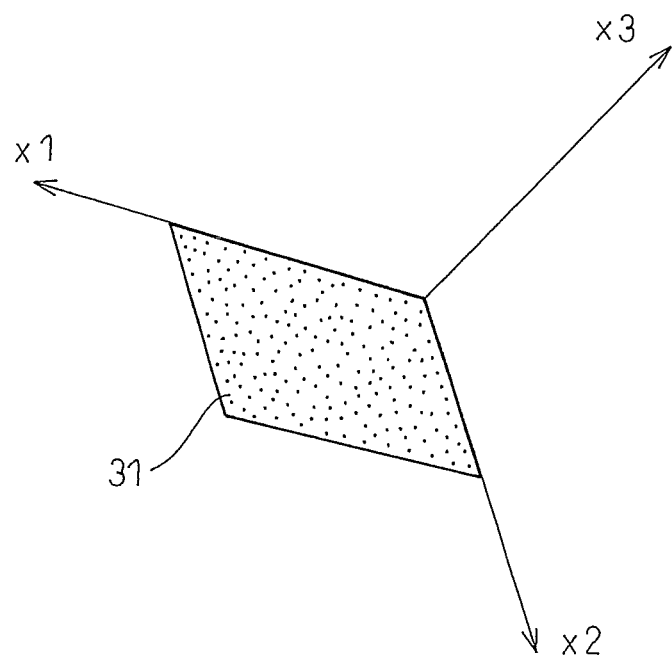

Fig.19
(a)
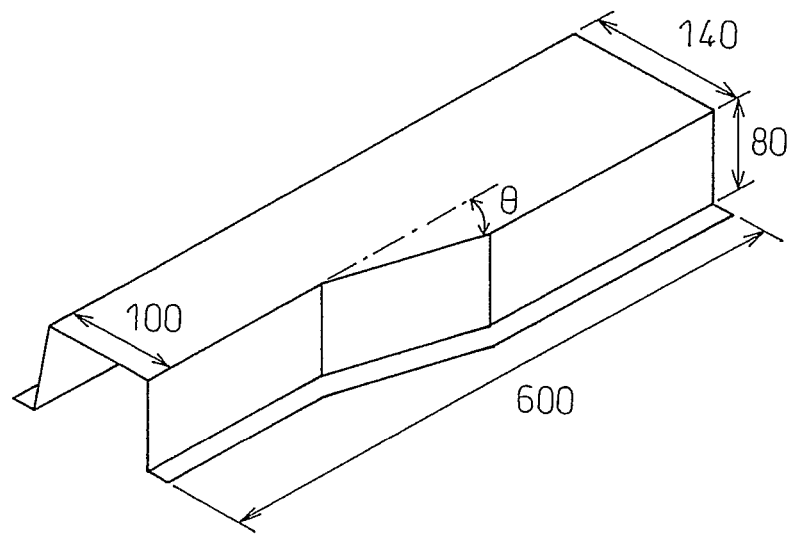
(b)
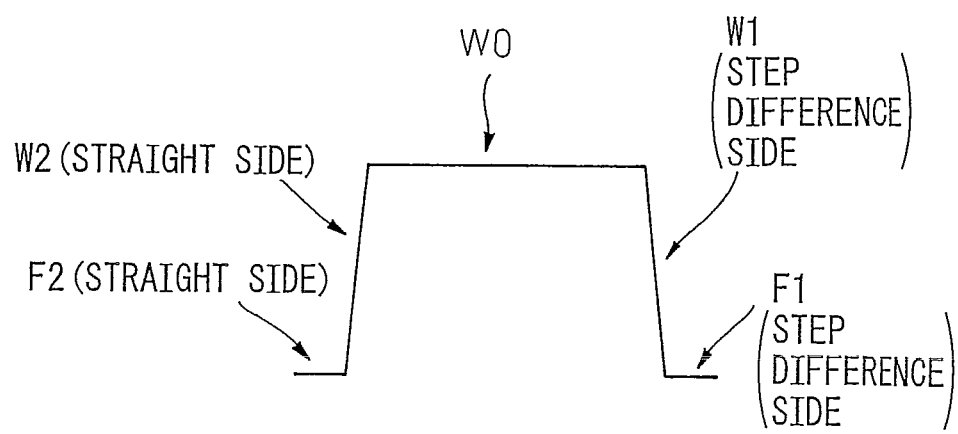

Fig.20
(a)
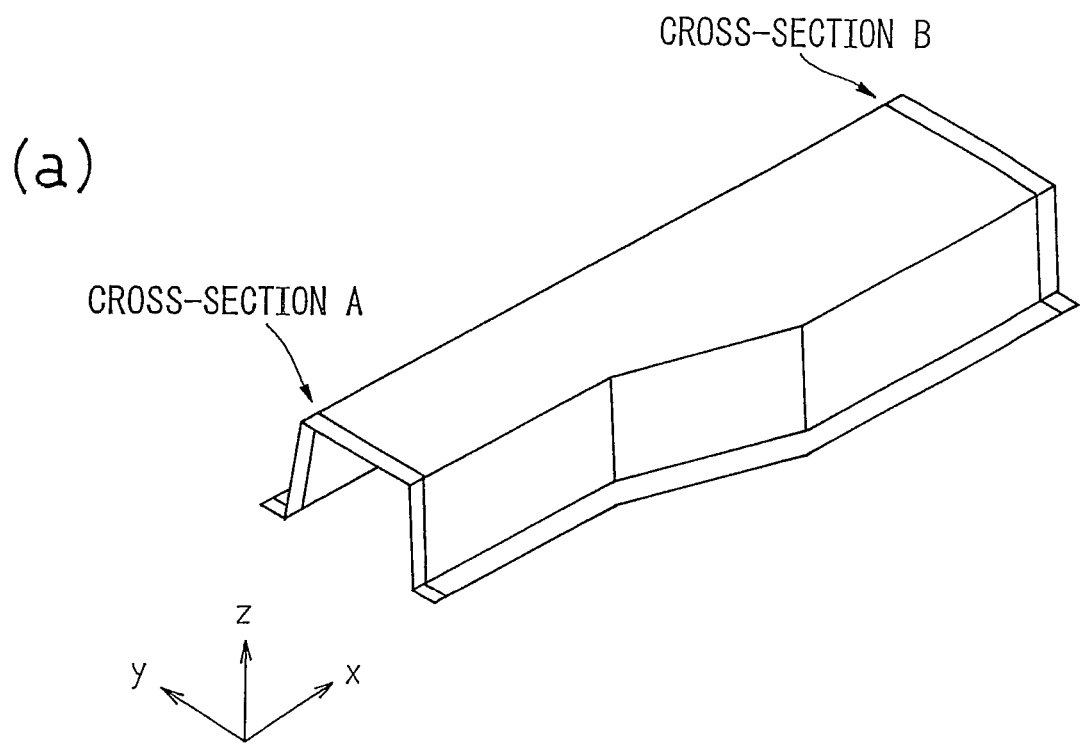
CROSS-SECTION B
CROSS-SECTION A
(b)
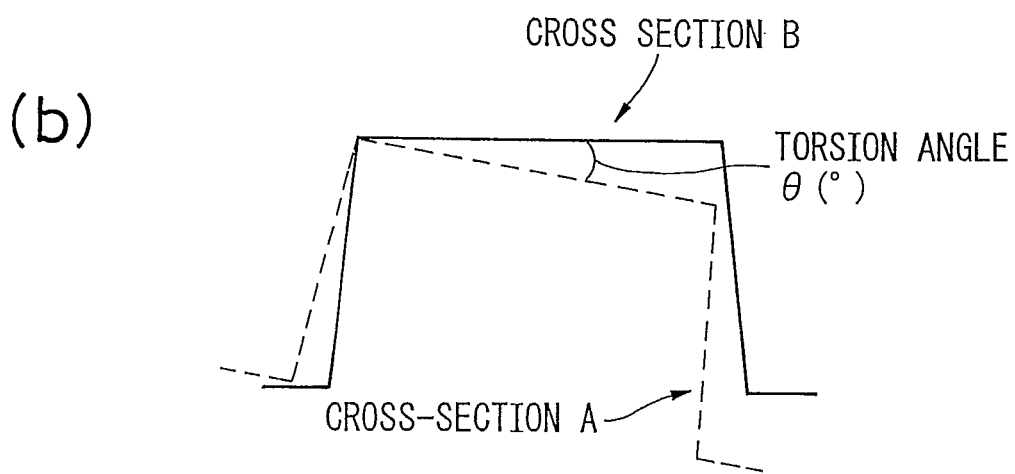
CROSS SECTION B
TORSION ANGLE θ (°)
CROSS-SECTION A Fig.21
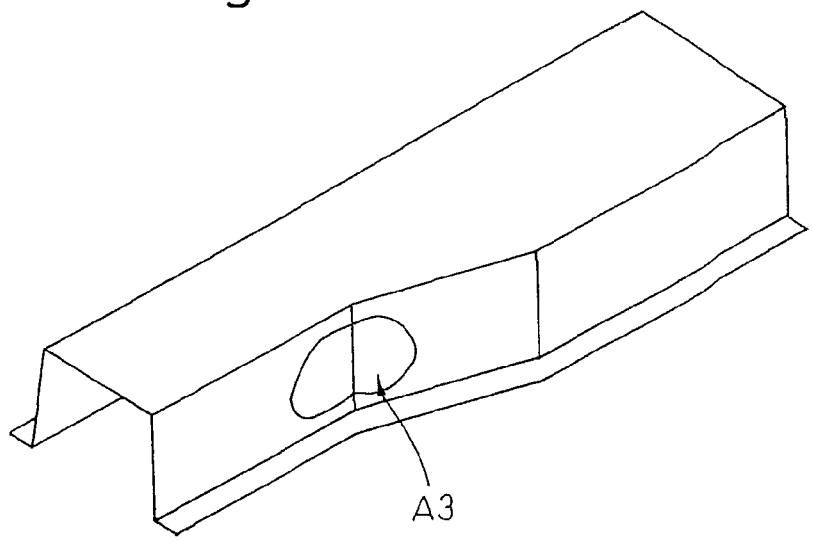
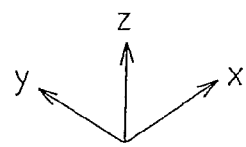
Fig.22
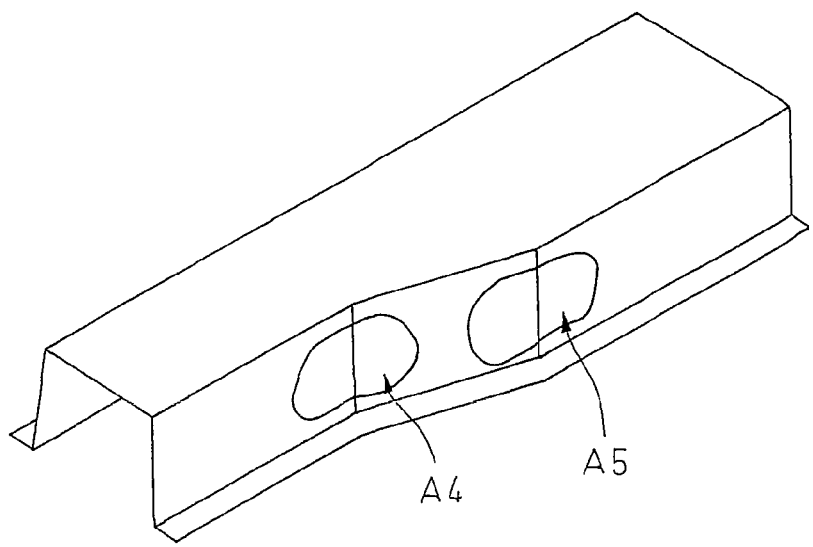
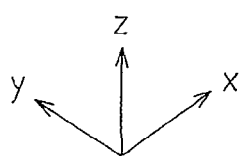

Fig.24
(a)
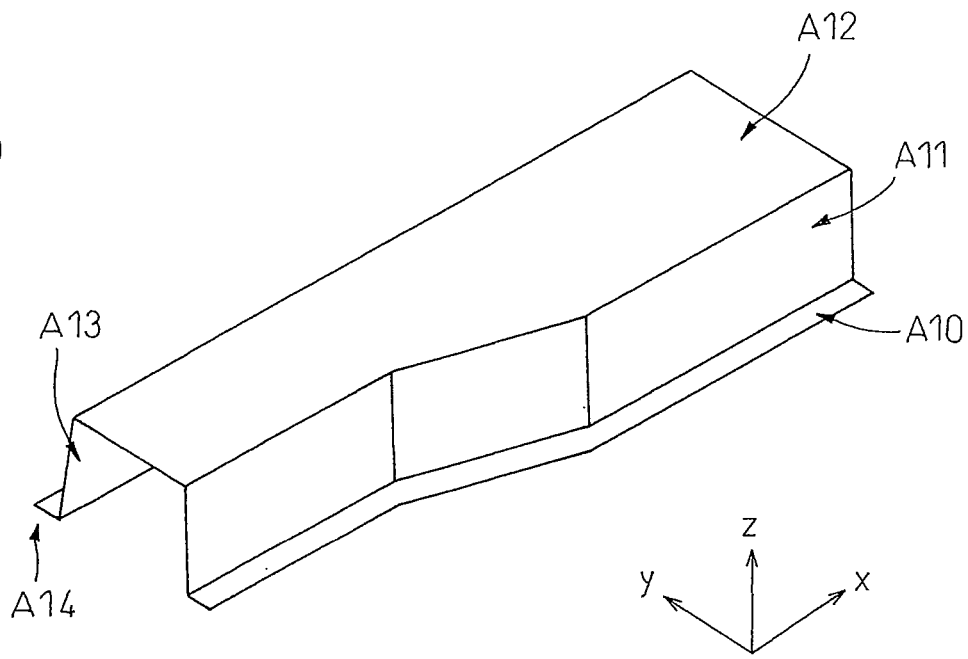
(b)
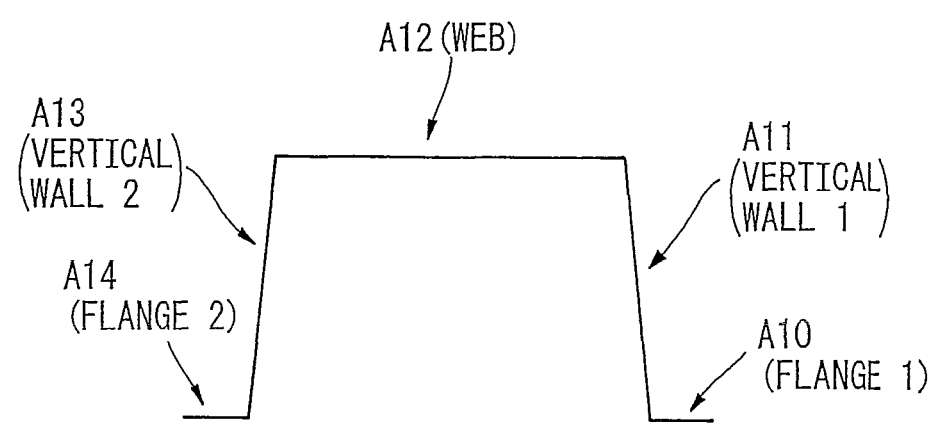

Fig. 36
(a) 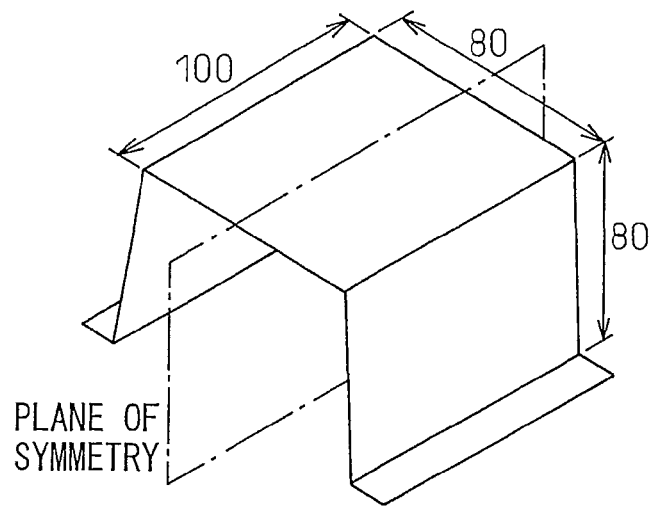
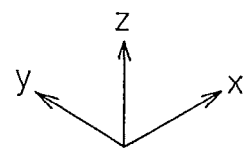
(b) 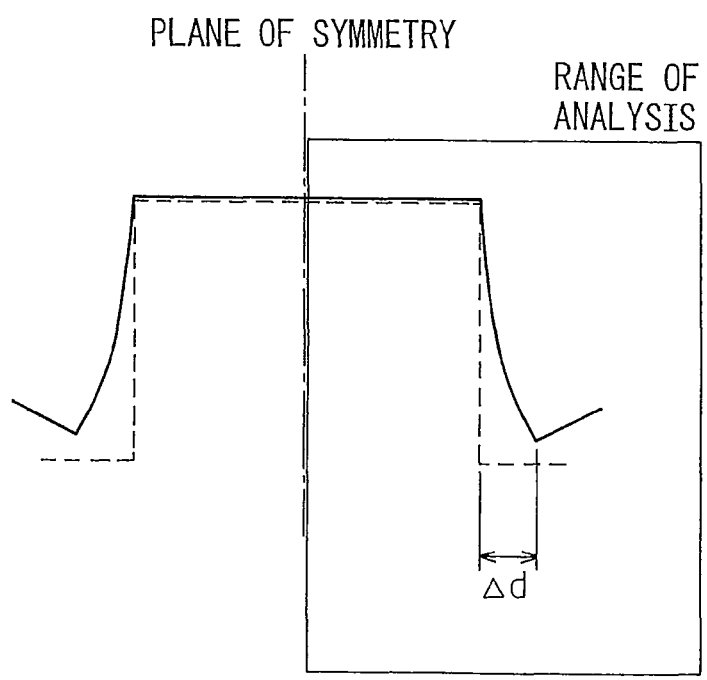

Fig. 39
(a) 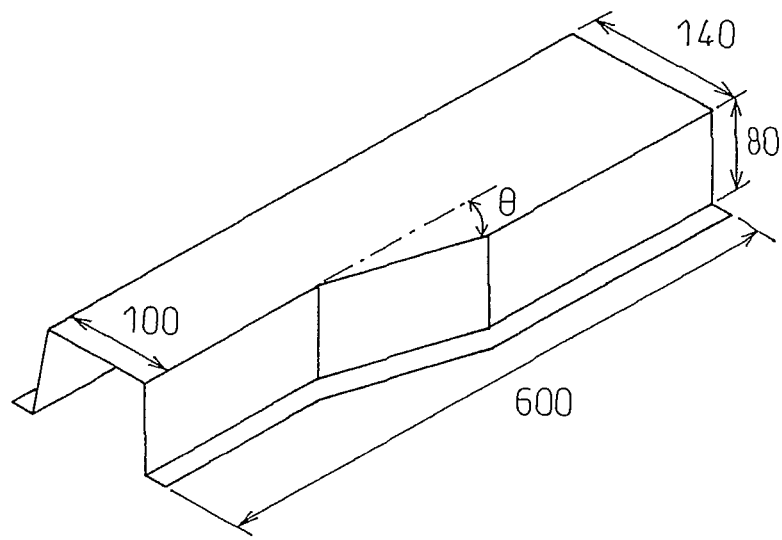
(b) 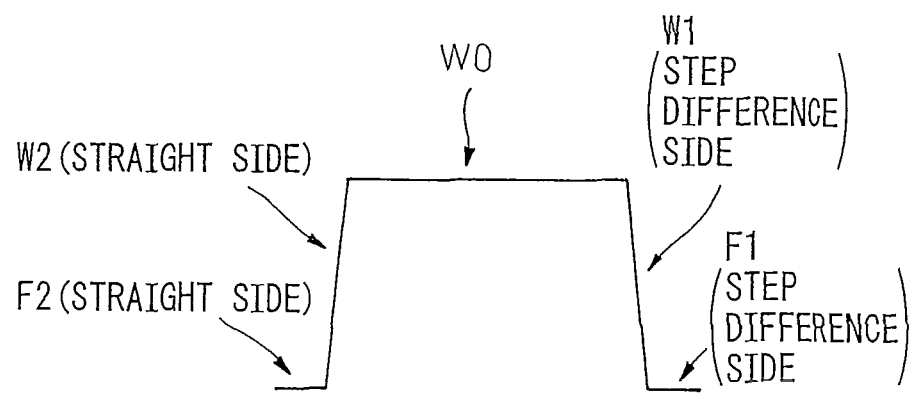

Fig. 40
(a)
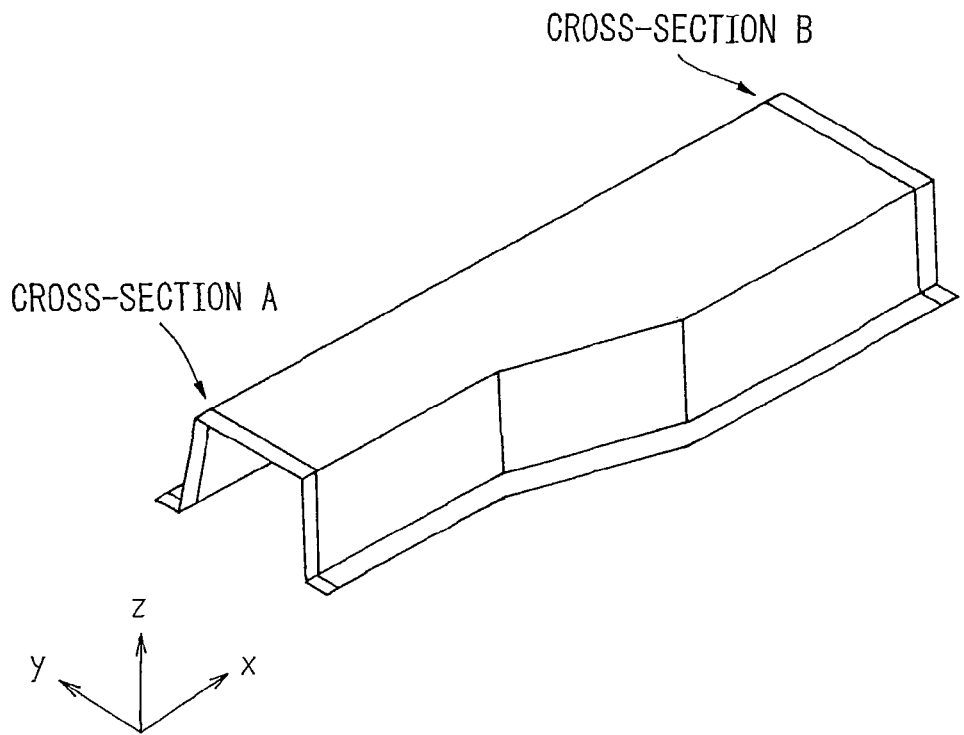
(b)
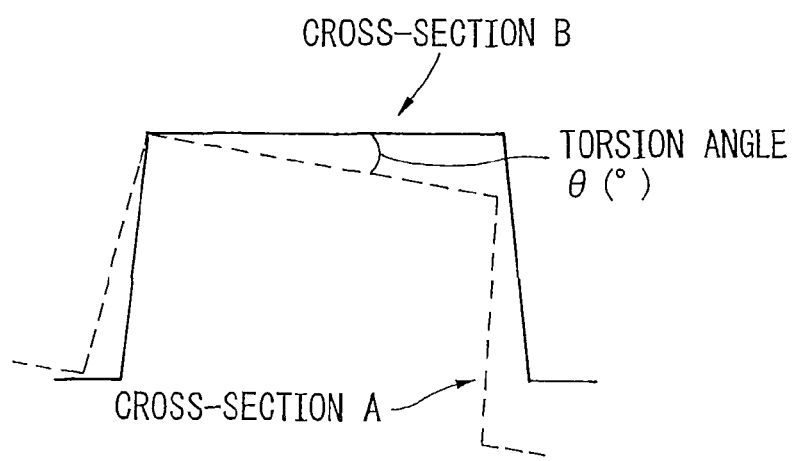

Fig. 49
(a) 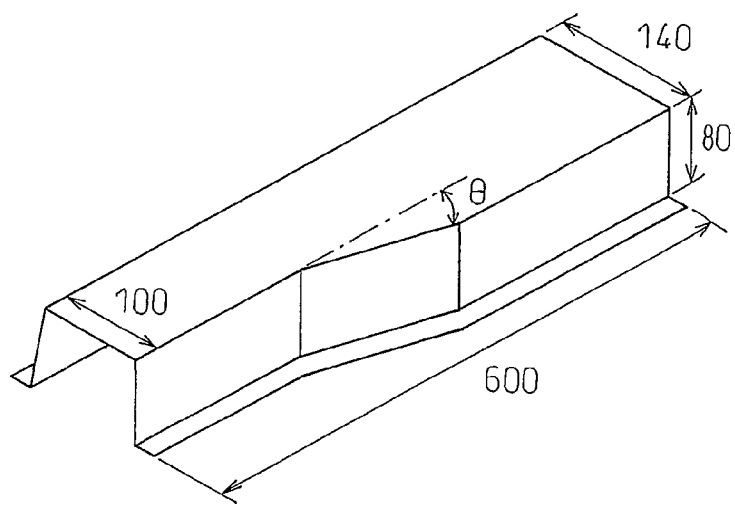
(b) 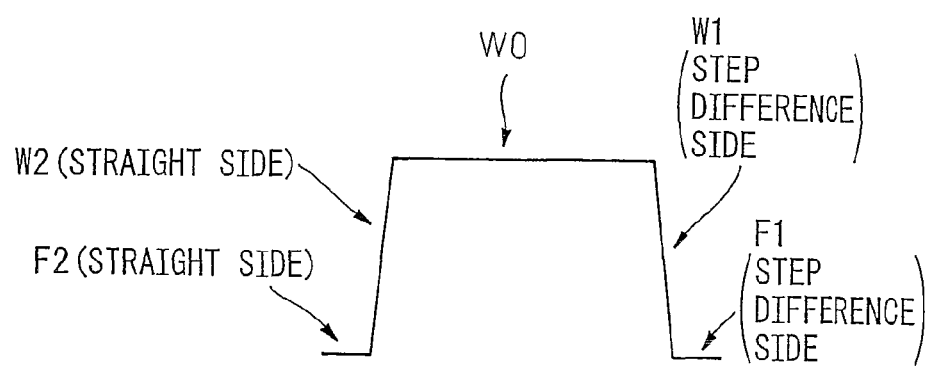

Fig.50
(a) 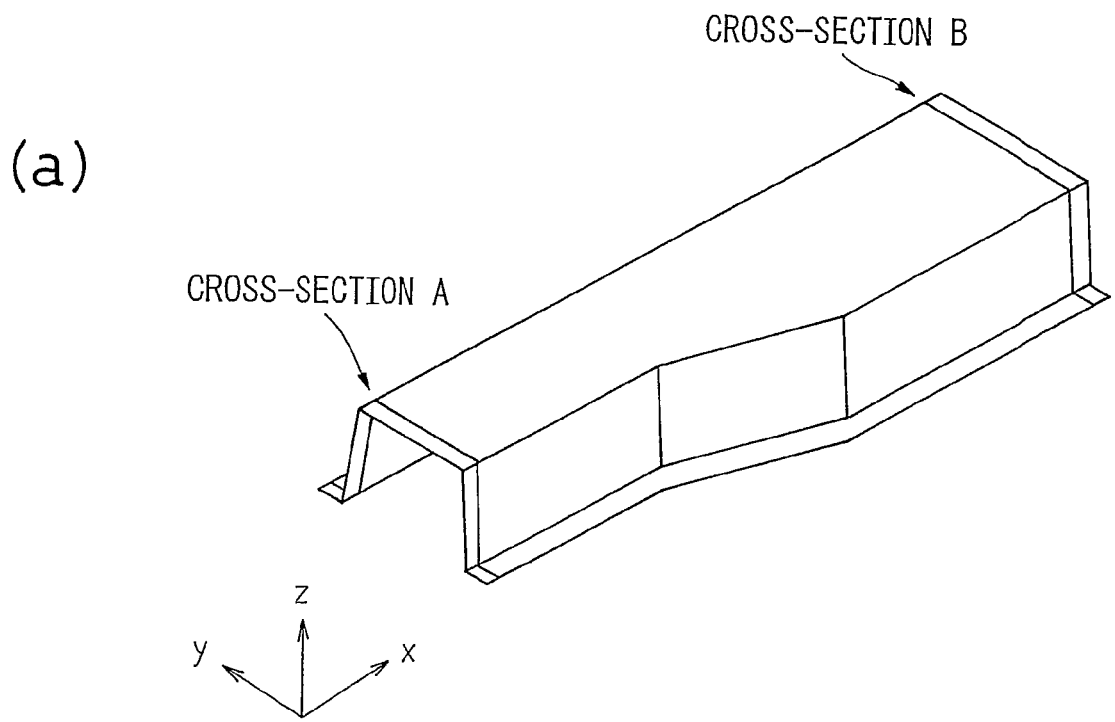
(b) 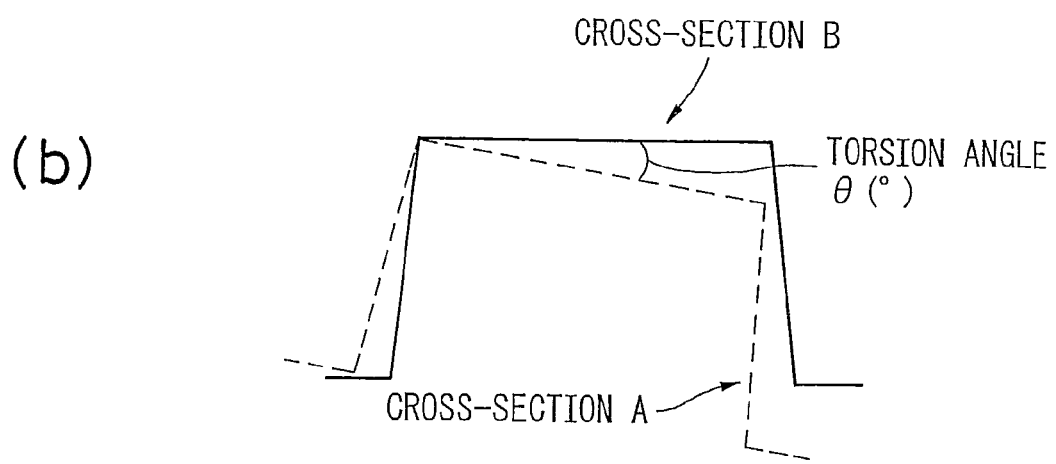

Fig. 58
(a)
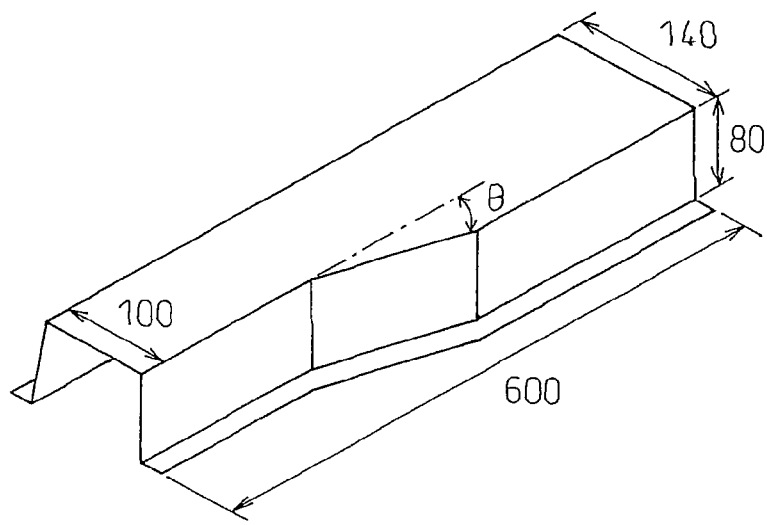
(b)
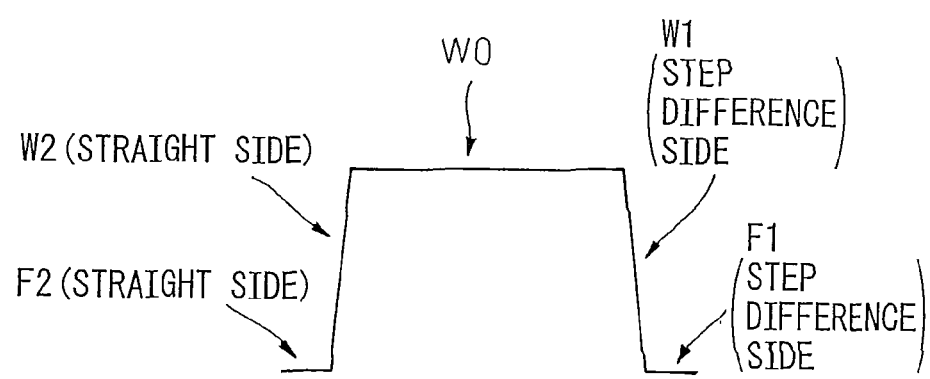

Fig.59
(a)
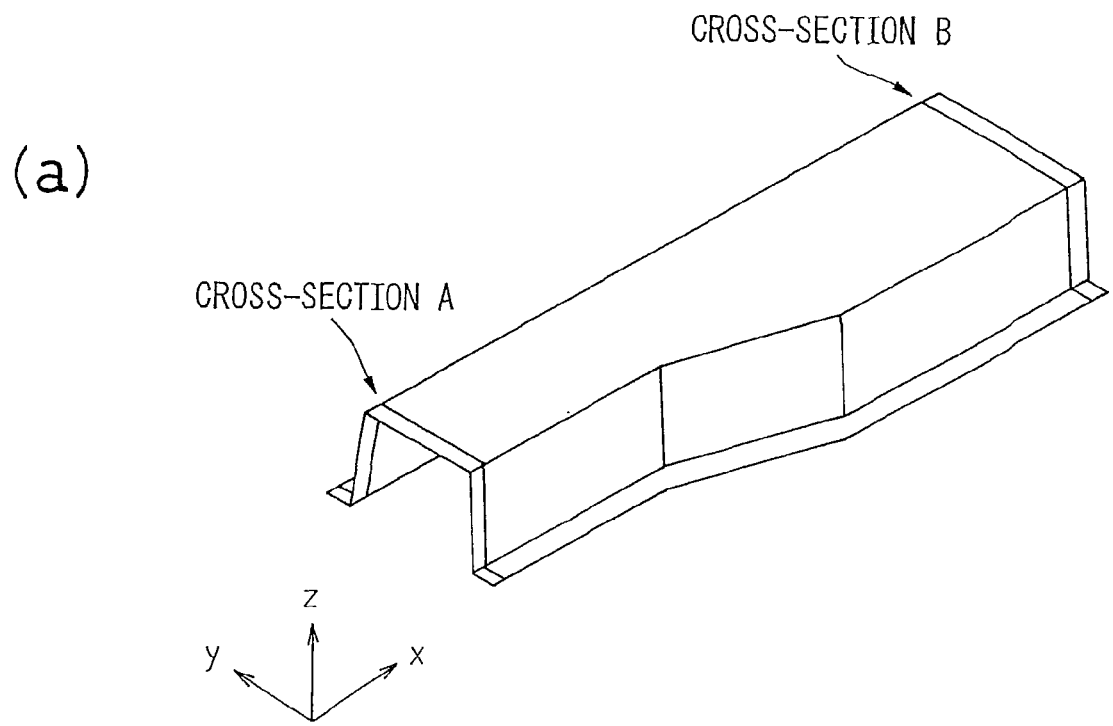
(b)
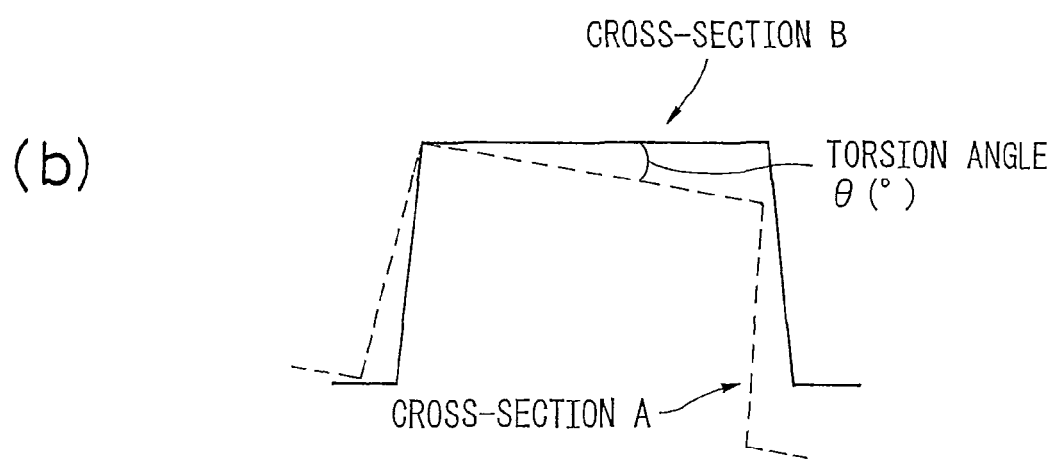

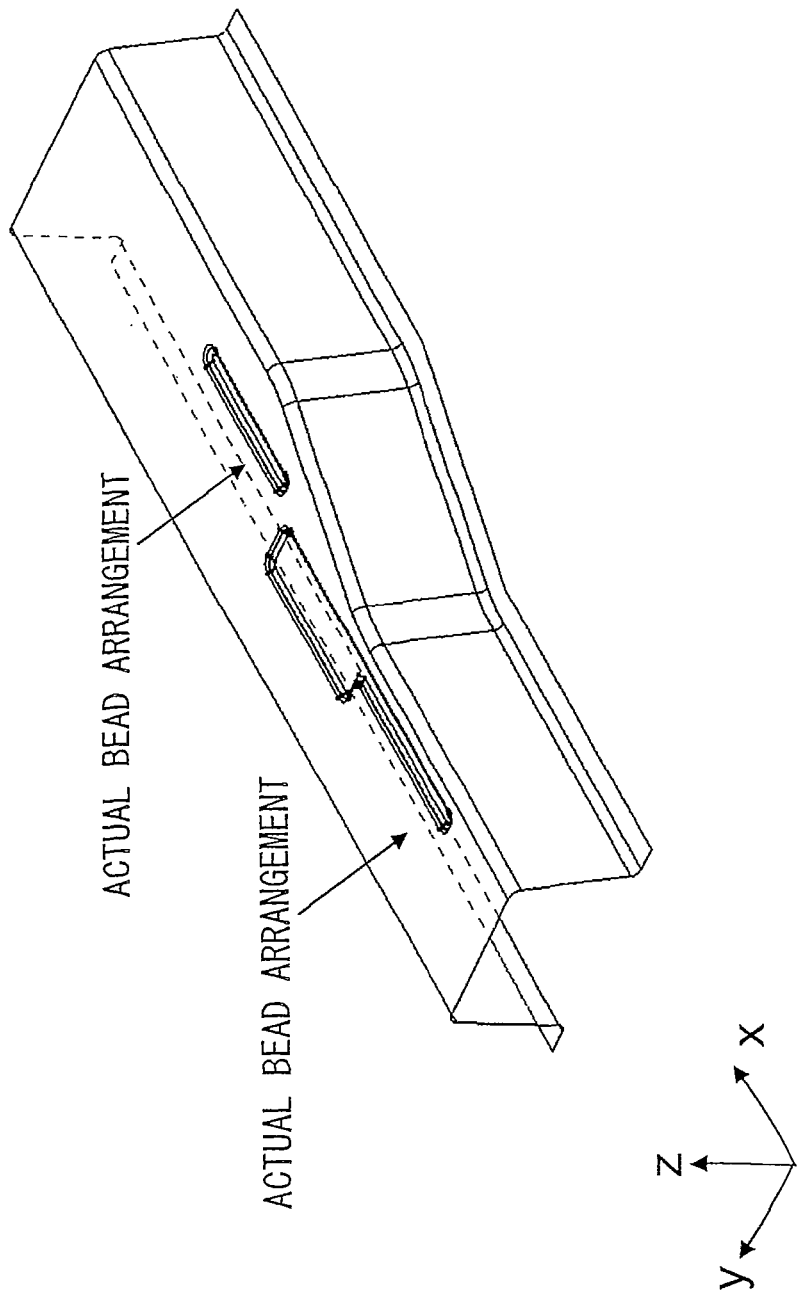

METHOD OF IDENTIFICATION OF CAUSE AND/OR LOCATION OF CAUSE OF OCCURRENCE OF SPRINGBACK

TECHNICAL FIELD

The present invention relates to a method of identification of a cause of occurrence of springback occurring in a press formed product when press forming an automobile member etc. from steel sheet, steel bars, and other steel materials and also aluminum, magnesium, titanium, or other metals and a method of display of the degree of effect, a method of identification of the location of a cause of occurrence, and a method of identification of the position of a measure of the same, apparatuses of these, and programs of these.

BACKGROUND ART

Doors, bumpers, and numerous other automobile members, members for home electrical appliances, building materials, etc. are produced by press forming steel sheet. In recent years, demands have arisen for reducing the weight of these members. To meet these demands, high strength steel materials are being used to reduce the thickness of the steel materials etc.

However, along with the higher strength of steel sheet, stricter control has become necessary to secure the product form by press forming. One of the important items in this control is the deformation when an elastically deformed part of steel sheet elastically recovers driven by the residual stress occurring in the steel sheet at the time of press forming, that is, the springback.

In particular, recently, to reduce the work and cost in development of automobiles etc., the trend has been to start the mechanical design stage of studying the method of forming the formed members at the same time as the conceptual design stage. Changes in conceptual design in the conceptual design stage cause changes in the formed members at the mechanical design stage, so the work and cost in the mechanical design stage of studying the method of forming the formed members become greater problems in the development process or development costs of automobiles etc.

FIG. 1 gives cross-sectional schematic views of a formed member showing the conventional measure against springback. (a) shows the cross-sectional form of a formed product, (b) shows the springback occurring in a formed product after cold pressing steel sheet by tooling of the same form as the formed product shown in (a), and (c) shows the cross-sectional form of tooling corrected envisioning springback. In this way, to obtain the formed product shown in (a), there is the measure of using the tooling "anticipating" springback as shown in (c) to obtain the desired formed product.

As a method of forming tooling anticipating springback in this way, the method of using the finite element method to analyze the residual stress of steel sheet at bottom dead center when pressed by the tooling and numerically analyzing tooling of the form of the deformation (spring forward) occurring due to the residual stress in an opposite direction to that residual stress so as to form tooling simply considering springback ("Japanese Patent Publication (A) No. 2003-33828" and "Mitsubishi Motors Technical Review (2006, No. 18, p. 126 to 131)").

However, designing tooling completely considering springback by numerical analysis is a nonlinear problem and extremely difficult, so the proposed method forms tooling simply considering springback by the finite element method. Therefore, what measure becomes necessary when the allowable amount of springback cannot be met due to such tooling is difficult to analyze numerically, so no method of solution has been proposed up to now.

Therefore, what sort of measure to take to obtain the desired formed product when the allowable value of springback cannot be satisfied by tooling simply considering springback depends on the experience of the engineer. In the final analysis, trial-and-error tests by tooling obtained by the forming method and the actual steel sheet become necessary.

Further, a method has been proposed of reducing springback by making modifications to relieve residual stress not in the tooling form, but the form of the steel material or the formed product.

FIG. 2 gives perspective views illustrating a conventional method of finding a location becoming a cause of occurrence of deformation due to springback. (a) shows the form of a formed product, (b) shows the case of cutting out a part 1 of a product, (c) shows a case of forming a hole 2 in the product, and (d) shows the case of making slits 3 in part of the product. Such measures are devised, then the springback behavior is observed and measures tested out to reduce the springback.

However, while the measures against the location of occurrence of springback reduce the residual stress causing springback, cutting out parts, forming holes, etc. cause the rigidity of the member itself to fall, so the problem arises that springback ends up occurring due to slight residual stress. The fundamental cause has therefore not been found. Furthermore, this sort of measure in practice requires actual tests by test tooling and steel sheet, so the problem arises of an increase in work and cost in the mechanical design stage.

DISCLOSURE OF THE INVENTION

In view of the above-mentioned problems, the present invention has as its subject the provision of a method using numerical analysis to identify a location becoming a cause of occurrence of springback of a press formed product and numerically analyzing a property of that identified location so as to efficiently and economically shorten the time for studying a method of forming a formed member.

Further, the present invention has as its subject the provision of a formed product maintaining product strength and having a springback value of an allowable value or less by numerical analysis.

Furthermore, the present invention has as its subject the provision of a measure using numerical analysis to reduce the springback value for a location becoming a cause of occurrence of springback of a press formed product.

In order to deal with the above subjects, the present invention provides a method of identification of a cause of occurrence of springback having a press forming analysis step of numerically analyzing forming conditions of press forming to obtain forming data of a press formed part, a processing step of processing at least one of a physical property value and physical property quantity data of part of the regions of said press formed part among forming data of said press formed part, and a springback value calculation step of calculating a springback value based on the results of said processing.

Said a physical property value and physical property quantity may be a sheet thickness, modulus of elasticity, modulus of plasticity, stress component values, and strain component values. The method may repeat said processing step and springback value calculation step while changing said part of the regions so as to identify a region, physical property value, and physical property quantity where said springback value becomes the smallest or where the difference with the springback value when performing the springback analysis while not performing said processing becomes the largest.

Further, the method may have a step of repeating said processing step and springback value calculation step while changing at least one of said physical property value and physical property quantity and/or said processing so as to identify a region, physical property value, and physical property quantity where said springback value becomes the smallest or where the difference with the springback value when performing the springback analysis while not performing said processing becomes the largest.

Further, the part of the regions may be a plurality of regions which can be simultaneously processed. Said processing step may be made a step which divides a part into regions where said springback value becomes the smallest and processes said divided regions for at least one of said physical property value and physical property quantity until the size of the divided regions becomes a predetermined value or less. Further, said part of the regions may be made one or more elements or calculation unit sections. Further, said part of the regions may be made one or more integration points.

Further, the present invention provides an apparatus for identification of a cause of occurrence of springback having a press forming analyzer for numerically analyzing forming conditions of press forming to obtain forming data of a press formed part, a springback analyzer for numerically analyzing said forming data to calculate a springback value, and a processor for processing at least one of a physical property value and physical property quantity data of part of the regions of said press formed part among forming data of said press formed part and making said springback analyzer calculate the springback value based on the results of said processing.

Said physical property value and physical property quantity may be a sheet thickness, modulus of elasticity, modulus of plasticity, stress component values, and strain component values. Said processor may repeatedly calculate the results of said processing and springback value while changing the part of the regions so as to identify a region, physical property value, and physical property quantity where said springback value becomes the smallest or where the difference with the springback value when performing the springback analysis while not performing said processing becomes the largest.

Further, in the apparatus for identification of a cause of occurrence of springback, said processor may repeatedly calculate the results of said processing and springback value while changing said physical property value and physical property quantity and/or said processing so as to identify a region, physical property value, and physical property quantity where said springback value becomes the smallest or where the difference with the springback value when performing the springback analysis while not performing said processing becomes the largest.

Further, said part of the regions may be a plurality of regions and these regions simultaneously processed. Further, in the apparatus for identification of a cause of occurrence of springback, said processor may divide a part into regions where said springback value becomes the smallest and process said divided regions for at least one of said physical property value and physical property quantity until the size of the divided regions becomes a predetermined value or less.

Further, to deal with the above subjects, the present invention provides a method of identification of a cause of occurrence of springback characterized by having a press forming analysis step of numerically analyzing forming conditions of press forming to obtain forming data of a press formed part, a processing step of calculating a curvature and/or angle for said press formed part in forming data of said press formed part, dividing the formed article into regions based on said curvature and/or angle, and processing at least one of a physical property value and physical property quantity at part of the regions from among the divided regions judged to be processed based on said forming data, and a springback value calculation step of calculating a springback value based on the results of said processing.

Said processing step may process at least one of said physical property value/physical property quantity variable of at least one of the integration points of a divided region where said curvature and/or angle is relatively large. Further, said physical property value and physical property quantity may be a sheet thickness, modulus of elasticity, modulus of plasticity, stress component values, and strain component values.

The method of identification of a cause of occurrence of springback may have a step of repeating said processing step and springback value calculation step while changing said part of the regions so as to identify a region, physical property value, and physical property quantity where said springback value becomes the smallest.

Further, the method may have a step of repeating said processing step and springback value calculation step while changing said at least one of a physical property value and physical property quantity and/or said processing so as to identify a region, physical property value, and physical property quantity where said springback value becomes the smallest.

Further, the present invention provides an apparatus for identification of a cause of occurrence of springback characterized by comprising a press forming analyzer numerically analyzing forming conditions of press forming to obtain forming data of a press formed part, a processor calculating a curvature and/or angle for said press formed part in forming data of said press formed part, dividing the formed article into regions based on said curvature and/or angle, and processing at least one of a physical property value and physical property quantity variable at part of the regions from among the divided regions judged to be processed based on said forming data, and a springback analyzer calculating a springback value based on the results of said processing.

The physical property value and physical property quantity at said divided region where said curvature and/or angle is relatively large may be made said physical property value and physical property quantity of at least one integration point of a divided region where said curvature and/or angle is relatively large. Further, said physical property value and physical property quantity may be a sheet thickness, modulus of elasticity, modulus of plasticity, stress component values, and strain component values.

Further, in the apparatus for identification of a cause of occurrence of springback, said processor may repeatedly calculate the results of said processing and springback value while changing said part of the regions so that it identifies a region, physical property value, and physical property quantity where said springback value becomes the smallest. Further, it may repeatedly calculate the results of said processing and springback value while changing at least one of said physical property value and physical property quantity and/or said processing so as to identify a region, physical property value, and physical property quantity where said springback value becomes the smallest.

Further, to deal with the subjects, the present invention provides a method (program) of display of a degree of effect of springback in a computer displaying the degree of effect of springback having a press forming analysis step numerically analyzing forming conditions of press forming to obtain forming data of a press formed part, a processing step (procedure) of processing at least one of a physical property value and physical property quantity data of each region dividing said press formed part in the forming data of said press formed part, a springback value calculation step (procedure) of calculating a springback value based on the results of said processing, and a display step (procedure) of displaying said calculated springback value for each said region.

The processing step (procedure) may process at least one of a physical property value and physical property quantity data of part of the integration points of each region dividing said press formed part in forming data of said press formed part. Further, said physical property value and physical property quantity may be a sheet thickness, modulus of elasticity, modulus of plasticity, stress component values, and strain component values.

Said display step (procedure) may display by a contour diagram the springback value for each region and may display the value of the calculated springback value divided by the area of each region. Further, the display step (procedure) may display the value of the calculated springback value divided by one of a representative length, representative width, representative height, representative sheet thickness, and tensile strength of said press formed part. Further, the display step (procedure) may display the value of said calculated springback value divided by a punch speed or blank holding force for each said region.

Further, the present invention provides an apparatus for display of a degree of effect of springback characterized by having a press forming analyzer numerically analyzing forming conditions of press forming to obtain forming data of a press formed part, a springback analyzer numerically analyzing said forming data to calculate a springback value, a processor processing at least one of a physical property value and physical property quantity data of each region dividing said press formed part in forming data of said press formed part and making said springback analyzer calculate a springback value based on results of said processing, and a display unit displaying said calculated springback value for each said region.

The processor may process at least one of a physical property value and physical property quantity data of part of the integration points of each region dividing said press formed part in forming data of said press formed part and said physical property value and physical property quantity may be a sheet thickness, modulus of elasticity, modulus of plasticity, stress component values, and strain component values.

The display unit may display by a contour diagram the springback value for each region and further may display by a contour diagram the value of said calculated springback value divided by the area of each said region on said display unit for each said region. The display unit may display the value of said calculated springback value divided by one of a representative length, representative width, representative height, representative sheet thickness, and tensile strength of said press formed part on said display unit for each said region. Further, the display unit may display the value of said calculated springback value divided by a punch speed or blank holding force on said display unit for each said region.

The program of the present invention may be a program for display of a cause of occurrence of springback which uses, in addition to the above explained program, a press forming analysis program numerically analyzing forming conditions of press forming to calculate forming data of a press formed part, a springback analysis program numerically analyzing said forming data to calculate a springback value, and a post processing program displaying by a contour diagram said springback value and which can input and output data with these programs, making a computer execute a procedure for acquiring said forming data from said press forming analysis program, a processing procedure for processing at least one of a physical property value and physical property quantity data of each region dividing said press formed part in said forming data, a procedure for outputting the results of said processing to said springback analysis program, and a contour display procedure for making said post processing program display by a contour diagram said springback value calculated by said springback analysis program for each region. The existing springback analysis program calculates the springback value based on the processing data output from the program of the present invention.

Further, to deal with the above subjects, the method (program, hereinafter, parentheses indicate correspondence to the invention of a program) of identification of a location of a cause of occurrence of springback according to the present invention has a press forming analysis step (procedure) of numerically analyzing forming conditions of press forming to obtain forming data of a press formed part, a first springback value calculation step (procedure) of calculating a physical property value and physical property quantity data of a plurality of regions after springback based on forming data of said press formed part, a processing step (procedure) of processing at least one of a physical property value and physical property quantity data of a region when there is a region where at least one of said physical property value and physical property quantity is larger than a predetermined value, and a second springback value calculation step (procedure) of calculating a physical property value and physical property quantity data for each of a plurality of regions after springback based on the results of said processing.

Further, said processing step (procedure) may process at least one of a physical property value and physical property quantity data of a region when there is a region where a difference of at least one of a physical property value and physical property quantity data of a press formed part before and after springback is larger than a predetermined value, and said physical property value and physical property quantity may be a sheet thickness, modulus of elasticity, modulus of plasticity, stress component values, and strain component values.

Further, the apparatus for identification of a location of a cause of occurrence of springback according to the present invention provides a press forming analyzer numerically analyzing forming conditions of press forming to obtain forming data of a press formed part, a springback analyzer numerically analyzing said forming data to calculate a springback value, and a processor performing processing for processing at least one of a physical property value and physical property quantity data of that region when at least one of said physical property value and physical property quantity is larger than a predetermined value and making said springback analyzer calculate a springback value for each of a plurality of regions after springback based on the results of said processing.

Further, said processor may process at least one of a physical property value and physical property quantity data of a region when there is a region where a difference of at least one of a physical property value and physical property quantity data of the press formed part before and after springback is larger than a predetermined value, and said physical property value and physical property quantity may be a sheet thickness, modulus of elasticity, modulus of plasticity, stress component values, and strain component values.

The program of the present invention may be a program for identification of a location of a cause of occurrence of springback which uses, in addition to the above explained program, a press forming analysis program numerically analyzing forming conditions of press forming to calculate forming data of a press formed part and a physical property value and physical property quantity data for each of a plurality of regions and a springback analysis program numerically analyzing said forming data and a physical property value and physical property quantity data for each of a plurality of regions to calculate a springback value and a physical property value and physical property quantity data for each of a plurality of regions after springback and which can input and output data with these programs, making a computer execute a procedure for acquiring a physical property value and physical property quantity data for each of a plurality of regions after springback from said springback analysis program, a processing procedure for processing at least one of a physical property value and physical property quantity data of a region when there is a region where at least one of said physical property value and physical property quantity is larger than a predetermined value, and a procedure for outputting the results of said processing to said springback analysis program. The existing springback analysis program recalculates the springback value based on the processing data output from the program of the present invention.

Further, to solve the above problem, there is provided a method (program, hereinafter, parentheses indicate correspondence to the invention of a program) of identification of a location of a cause of occurrence of springback having a first press forming analysis step (procedure) of numerically analyzing first forming conditions to calculate first forming data, a second press forming analysis step (procedure) of numerically analyzing second forming conditions differing in at least one of said first forming conditions to calculate second forming data, a step (procedure) of processing at least one of a physical property value and physical property quantity data of said first forming data of a region when there is a region where a difference of at least one of a physical property value and physical property quantity data in physical property value and physical property quantity data for each of a plurality of regions of said first and second forming data is larger than a predetermined value, and a springback value calculation step (procedure) of calculating a springback value based on the results of said processing.

Further, said forming conditions may be a form and properties of steel sheet, tooling form, and press conditions. Said physical property value and physical property quantity may be a sheet thickness, modulus of elasticity, modulus of plasticity, stress component values, and strain component values.

Further, an apparatus for identification of a location of a cause of occurrence of springback according to the present invention provides a press forming analyzer numerically analyzing first forming conditions to calculate first forming data and numerically analyzing second forming conditions differing in at least one of said first forming conditions to calculate second forming data, a springback analyzer numerically analyzing said forming data to calculate a springback value, and a processor processing at least one of a physical property value and physical property quantity of said first forming data of a region when there is a region where a difference of at least one of a physical property value and physical property quantity data in physical property value and physical property quantity data for each of a plurality of regions of said first and second forming data is larger than a predetermined value and making said springback analyzer calculate a springback value based on results of said processing.

Further, the forming conditions may be a form and properties of steel sheet, tooling form, and press conditions, while said physical property value and physical property quantity may be a sheet thickness, modulus of elasticity, modulus of plasticity, stress component values, and strain component values.

The program of the present invention may be a program for identification of a location of a cause of occurrence of springback which uses, in addition to the above explained program, a press forming analysis program calculating forming data of a press formed part and a physical property value and physical property quantity data for each of a plurality of regions and a springback analysis program numerically analyzing said forming data and a physical property value and physical property quantity data for each of a plurality of regions to calculate a springback value and a physical property value and physical property quantity data for each of a plurality of regions after springback, which are existing programs, and which can input and output data with these programs, making a computer execute a procedure for acquiring first forming data from said press forming analysis program, a procedure for numerically analyzing second forming conditions differing in at least one of said first forming conditions and acquiring second forming data from said press forming analysis program, a procedure for processing at least one of a physical property value and physical property quantity of said first forming data of a region when there is a region where a difference of at least one of a physical property value and physical property quantity data in physical property value and physical property quantity data for each of a plurality of regions of said first and second forming data is larger than a predetermined value, and a procedure for outputting the results of said processing to said springback analysis program. The existing springback analysis program calculates a springback value based on processing data output from the program of the present invention.

Further, to deal with the above subjects, the method of identification of a position of a measure against springback according to the present invention has a press forming analysis step (procedure) of numerically analyzing form conditions of a press formed part to calculate forming data of a press formed part, a substitute forming data generation step (procedure) of selecting at least part of the regions of the press formed part in the forming data of the press formed part and generating substitute forming data substituting a different form for the form of that selected region and/or substituting a different stress distribution for the stress distribution of that selected region, and a springback value calculation step (procedure) of numerically analyzing said substitute forming data to calculate a springback value.

It is also possible to repeat said substitute forming data generation step and said springback value calculation step (procedure) while changing the positions or number of said selected regions. The method may further have a step (procedure) if judging if said springback value is a predetermined value or less.

Further, it is also possible to substitute that substituted predetermined data for at least one of the form of one or more regions giving a springback value of a predetermined value or less and the stress distribution of that selected region and repeat said substitute forming data generation step (procedure) and said springback value calculation step (procedure) while changing the positions or number of said selected regions.

Further, the method may further have a step (procedure) of dividing forming data of said press formed part by predetermined regions, and said substitute forming data generation step (procedure) may calculate said substitute forming data for all regions divided by said predetermined regions. Further, said predetermined data may differ in at least one of the form and stress distribution for each said selected region.

Further, an apparatus for identification of a position of a measure against springback according to the present invention has a press forming analyzer numerically analyzing forming conditions of a press formed part to calculate forming data of the press formed part, a substitute forming data generator selecting at least part of the regions of the press formed part in the forming data of the press formed part and generating substitute forming data substituting predetermined data for at least one of a form of that selected region and a stress distribution of that selected region, and a springback analyzer numerically analyzing said substitute forming data to calculate a springback value.

Said substitute forming data generator may calculate said substitute forming data and said springback analyzer may repeatedly calculate the springback value while changing the positions and number of said selected regions. Further, said substitute forming data generator may judge if said springback value has become a predetermined value or less.

Said substitute forming data generator may substitute that substituted predetermined data for at least one of the form of one or more regions giving a springback value of a predetermined value or less and the stress distribution of that selected region and said substitute forming data generator may calculate said substitute forming data and said springback analyzer may repeatedly calculate the springback value while changing the positions or number of said selected regions.

Said substitute forming data generator may divide forming data of said press formed part by predetermined regions and calculate said substitute forming data for all of the regions divided by said predetermined regions. Further, said predetermined data may differ in at least one of a form and stress distribution for each said selected region.

The program of the present invention may be a program for identification of a position of a measure against springback which uses, in addition to the above explained program, a press forming analysis program numerically analyzing forming conditions of press forming to calculate forming data of a press formed part and a springback analysis program numerically analyzing said forming data to calculate a springback value, which are existing programs, and which can input and output data with these press forming analysis program and springback analysis program, making a computer execute a procedure for acquiring forming data from said press forming analysis program, a substitute forming data generating procedure for selecting at least part of the regions of a press formed part in forming data of a press formed part and calculating substitute forming data substituting predetermined data for at least one of a form of a selected region and a stress distribution of that selected region, and a procedure for outputting said substitute forming data to said springback analysis program. The existing springback analysis program calculates the springback value based on substitute forming data output from the program of the present invention.

According to the present invention, by changing the identified location covered by analysis as the cause of occurrence of springback of a press formed product and numerically processing the physical property value/physical property quantity of that identified location and minimizing the springback value, there is provided a method which enables identification of the location of the cause of occurrence of springback and accurate derivation the physical property value/physical property quantity of the location of the cause, enables trial and error analysis to confirm the same, and economically and efficiently shortens the time for study of the method of forming a formed member.

Further, according to the present invention, by processing an identified location for analysis as the cause of occurrence of springback of a press formed product for at least one of the data of the physical property value and physical property quantity of each region dividing the press formed product and displaying by a contour diagram the springback value for each region based on the results of processing, there is provided a method which enables trial and error analysis on a computer, economically and efficiently shortens the identification of the location of the cause of occurrence of springback, and economically and efficiently shortens the time for study of the method of forming a formed product.

Furthermore, according to the present invention, by substituting a form and stress distribution different from the selected region for a selected region to be analyzed as the cause of occurrence of springback of the press formed product so as to minimize the springback value, there is provided a method which can identify the location of the cause of occurrence of springback and provide a measure against that location of the cause and thereby economically and efficiently shorten the time for study of the method of forming a formed product.

Furthermore, the present invention can change at least one of the identified location and a physical property value and physical property quantity of the identified location to find the identified location and the physical property value and physical property quantity for making the amount of change of springback within the allowable value without cutting out a part or forming a hole in the actual formed product. Therefore, the thus analyzed formed product can be confirmed as having an amount of change of springback made within the allowable value and maintaining the rigidity and other quality aspects of the product, so measures such as cutting out a part from or forming a hole in an identified location of the formed product, which would sacrifice the product quality, so as to maintain the predetermined amount of change of springback sought in the formed product can be made unnecessary.

Further, the present invention enables the springback value to be made within the allowable value, without cutting out a part from or forming a hole in an actual formed product, by substituting at least one or both of a different form and stress distribution for at least one of the selected regions. Therefore, the thus analyzed formed product can be confirmed as maintaining the springback value within the allowable value and maintaining the rigidity and other facets of product quality, so the predetermined springback value sought from the formed product is maintained and therefore measures sacrificing the product quality such as cutting out a part from or forming a hole in the identified location of the formed product can be made unnecessary.

BRIEF DESCRIPTION OF THE DRAWINGS

The present invention will be explained below with reference to the attached drawings.

FIG. 1 gives cross-sectional schematic views showing a conventional measure against springback, FIG. 2 gives perspective views illustrating the conventional method of searching for a location becoming a cause of occurrence of deformation due to springback, FIG. 6 is a contour diagram displaying blank elements with large curvature according to an example of the present invention, FIG. 21 is a perspective view of an identified region A3 according to an embodiment of the present invention, FIG. 22 is a perspective view of identified regions A4 and A5 according to an embodiment of the present invention, FIG. 75 is a view of arrangement of actual beads at a designated region of a workpiece according to an embodiment of the present invention.

BEST MODE FOR CARRYING OUT THE INVENTION

Figure 3:
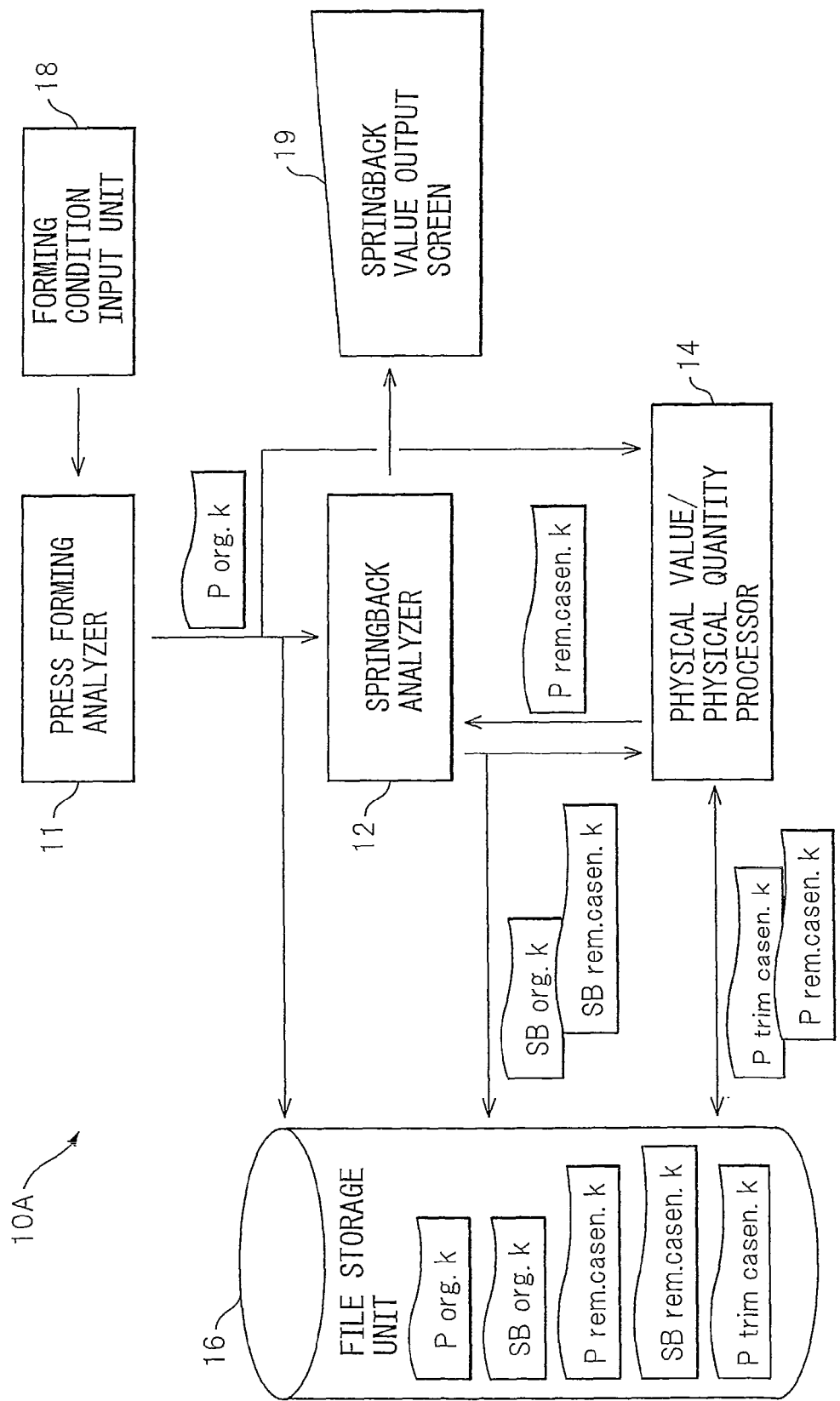
FIG. 3 is a view of the configuration of functions of an apparatus for identification of a location of a cause of occurrence of springback according to an embodiment of the present invention.

FIG. 3 is a functional diagram of an apparatus for identification of a location of a cause of occurrence of springback according to an embodiment of the present invention.

The apparatus for identification of a location of a cause of occurrence of springback 10A has a press forming analyzer 11, springback analyzer 12, physical property value/physical property quantity processor 14, file storage unit 16, forming condition input unit 18, and springback value output screen 19.

The forming condition input unit 18 is an input unit for inputting data for analysis by the later explained press forming analyzer 11 and springback analyzer 12 such as the form data (sheet thickness, length, width, curvature, strain, etc.) and properties (strength, elongation, or other properties and sheet thickness or other forms) of the steel sheet, tooling form (die (tooling) and punch form, curvature, diameter, clearance, lubrication conditions), press conditions (blank holding force, pad load, bead tension, press pressure, temperature), and other forming conditions. Further, it is possible to separately set the data region in the forming analysis, the data region in the physical property value/physical property quantity processor 14, the divided region when displaying on the springback value output screen 19, etc.

The press forming analyzer 11 receives as input information the forming conditions input by the forming condition input unit 18 and uses the elastoplastic finite element method, rigid plastic finite element method, one step finite element method, boundary element method, elementary analysis, or the like to perform numerical analysis to find the stress, strain, sheet thickness, etc. of the press formed workpiece, that is, steel sheet, etc. The press forming analyzer 11 outputs the results of numerical analysis in the form of the sheet thickness of the workpiece, the component values of the stress, the component values of the strain, and other variables and the distribution of the variables. The output data is for example output as the file "P org.k" to the springback analyzer 12 and the later explained physical property value/physical property quantity processor 14 and file storage unit 16.

The numerical analysis by this press forming analyzer 11 uses the finite element method (for example, existing software PAM-STAMP, LS-DYNA, Autoform, OPTRIS, ITAS-3D, ASU/P-FORM, ABAQUS, ANSYS, MARC, HYSTAMP, Hyperform, SIMEX, Fastform3D, Quikstamp) for form analysis based on the form data of the product for press forming (sheet thickness, length, width, curvature, strain, etc.) and the properties of the metal plate used (strength, elongation, and other properties and sheet thickness and other forms) and, if necessary, setting the tooling form (die and punch form, curvature, diameter, clearance, lubrication conditions), press conditions (temperature, pressure), and other forming conditions, so as to numerically obtain the distribution of stress and strain values after forming.

Further, the press forming analyzer 11 can display by a contour diagram the stress distribution, curvature, and other results of analysis obtained by the finite element method using post processing software on the springback value output screen 19.

The springback analyzer 12 uses the output data file "P org.k" of the press forming analyzer 11 and the output data file "P rem.casen.k" of the later explained physical property value/physical property quantity processor 14 as input data for springback analysis. The "springback analysis" comprises calculation of the unloading process based on the results of output of the press forming analyzer 11, that is, the sheet thickness, stress component values, strain component values, and other variables of the workpiece and the distribution of variables using the elastic finite element method, elastoplastic finite element method, one step finite element method, elementary analysis, etc. and numerical analysis of the amount of deformation occurring in the workpiece, that is, the springback value. The springback value is obtained by dividing the workpiece by the finite element method etc. and calculating it for each element of the 3D data coordinates. Note that the amount of deformation occurring in the workpiece, that is, the springback value, is the amount of deformation at any point of the workpiece, the amount of deformation at a maximum displacement point or minimum displacement point in a designated region of a workpiece, the angle formed by any planes or lines in the workpiece, the curvature formed by any plane or line of the workpiece, etc.

The springback analyzer 12 uses the finite element method (for example, existing software PAM-STAMP, LS-DYNA, Autoform, OPTRIS, ITAS-3D, ASU/P-FORM, ABAQUS, ANSYS, MARC, HYSTAMP), inputs the stress distribution described in "P org.k" obtained by the press forming analyzer 11, and runs the springback analysis. The calculation of the springback in the software is for example performed by the content along with the basic equation of finite elastoplastic deformation or discretization technique described in "Nonlinear Finite Element Method" (Corona, Dec. 20, 1994), p. 71 to 127. However, the springback can be calculated by both elastic analysis or elastoplastic analysis.

The output data of the results of springback analysis of the springback analyzer 12 includes the springback value, strain and other forms, properties, stress, etc. at the time of springback, is output to the springback value output screen 19, and is output as output data file "SB org.k" of the result of numerical analysis by the input data file "P org.k" or the output data file "SB rem.casen.k" of the result of numerical analysis by "P rem.casen.k" to the springback analyzer 12 and the later explained physical property value/physical property quantity processor 14 and file storage unit 16.

The physical property value/physical property quantity processor 14 receives as input the output data file "P org.k" of the press forming analyzer 11 and the output data file "SB org.k" or "SB rem.casen.k" of the result of numerical analysis by the springback analyzer 12, processes them, and outputs as the results the "P rem.casen.k" to the springback analyzer 12. Note that the "processing" referred to here means multiplying at least one of said variables by a coefficient, setting a fixed value including zero, performing four arithmetic operations, performing calculations based on functions, and replacing values with any not fixed values. The physical property value/physical property quantity processor 14 can use this processing to judge the variables and identified locations reducing the springback value.

The physical property value/physical property quantity processor 14, when acquiring data of one Workpiece, that is, a press formed product, from the input data, has to perform processing to divide the data of the press formed product into a plurality of regions so as to discover an identified location of the press formed product. One of the methods for division into regions is division of the workpiece into regions by equal dimensions.

The equal dimensions preferably consider measures against an identified location. That is, even if discovering the identified location, if the region is so small that effective measures cannot be taken against that identified location, sometimes the results of analysis cannot be effectively used. For example, if the measure against the identified location is the addition of a 20 mm×100 mm bead, a divided region of 20 mm square may be mentioned.

As one method for determining the divided regions of a formed article, there is also the method of determining the divided regions based on the curvature or elements.

The press forming analyzer 11 can use numerical analysis to obtain coordinate values of nodes as geometric information of a workpiece after forming analysis and objectively calculate the curvature of the elements and the angles between the elements. In the case of a press formed part, the workpiece after deformation has an extremely large curvature at the ridgelines of bends such as the punch shoulder R or the die shoulder R in the direction vertical to the bent ridgeline compared with other locations.

Here, if calculating the maximum curvature of each element and displaying blank elements with a curvature of over a certain threshold value, it becomes possible to judge and separate locations other than the punch shoulder R or die shoulder R (web, vertical walls, flanges) as unconnected separate regions.

FIG. 4 to FIG. 8 show an example of the process from the press forming analysis to the processing.

Figure 4:
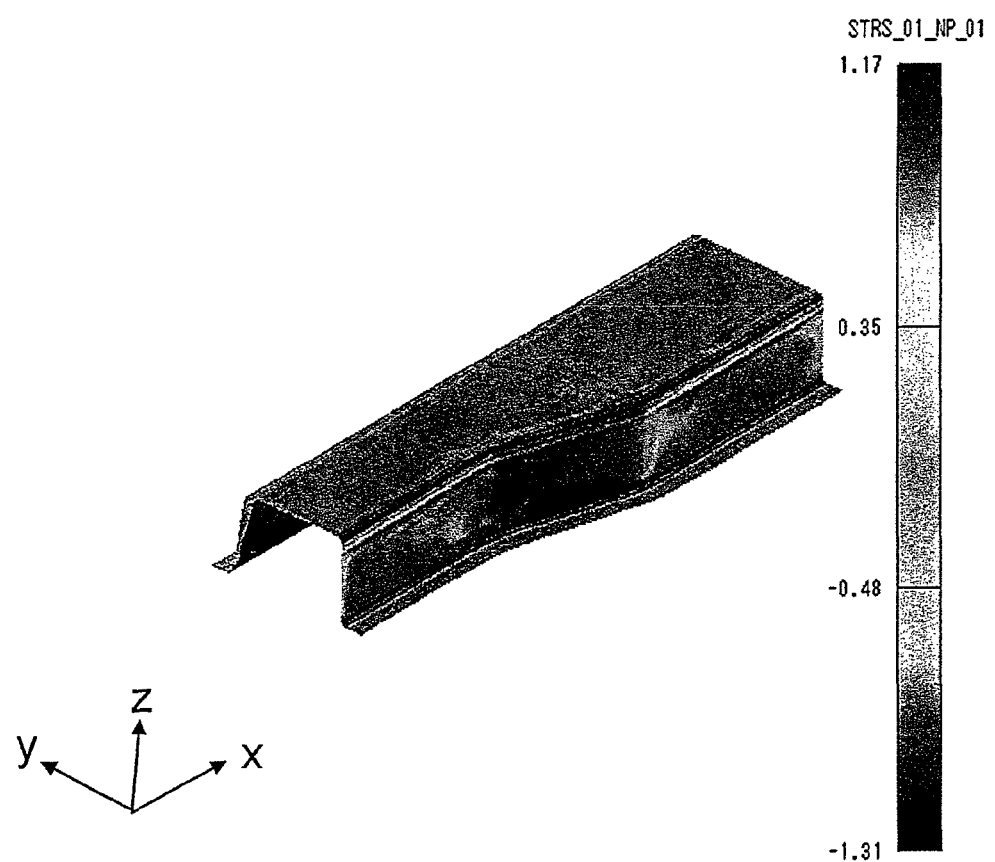
FIG. 4 is a contour diagram showing the stress distribution of the results of analysis of press forming according to an example of the present invention.
Figure 5:
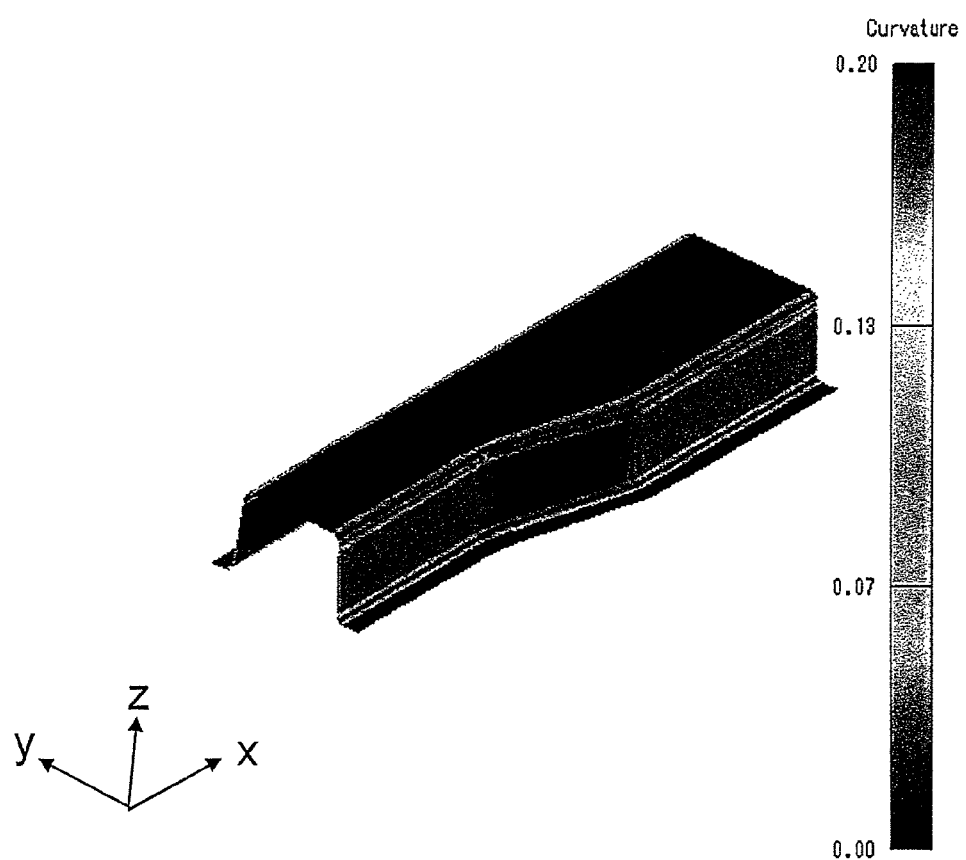
FIG. 5 is a contour diagram showing the curvature of elements according to an example of the present invention.
Figure 7:
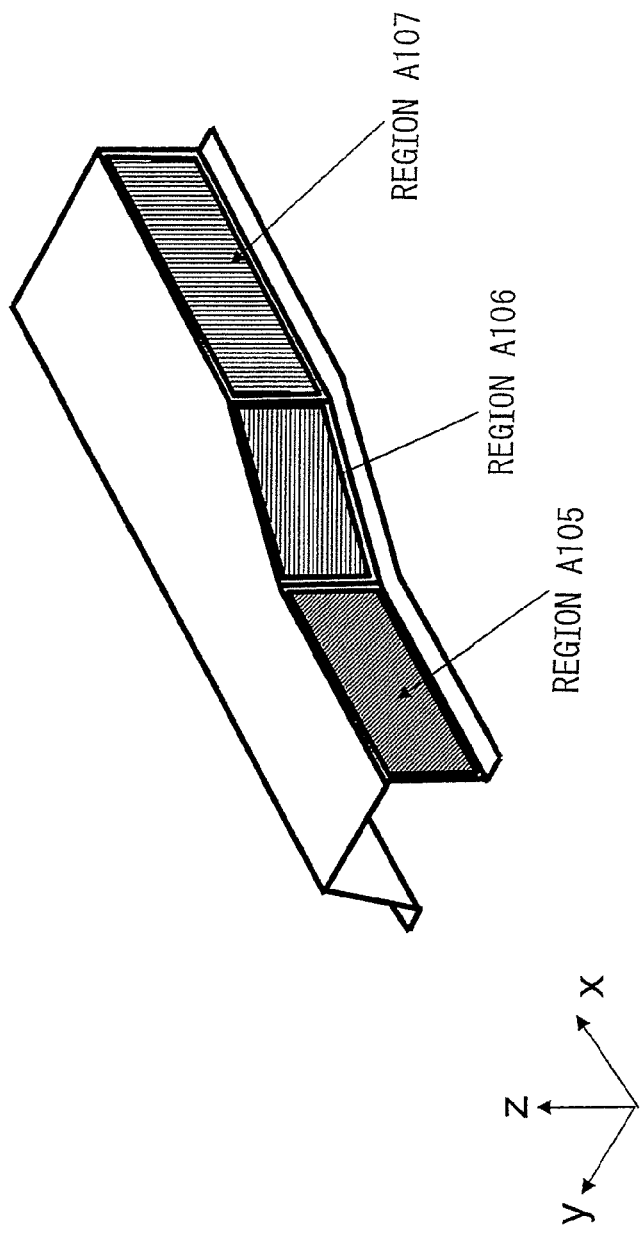
FIG. 7 is a view showing division into regions based on curvature according to an example of the present invention.

FIG. 4 shows the result of press forming analysis. The stress distribution is displayed as a contour diagram. It is learned that the stress level (absolute value) of the step difference-side side wall is high. The elements and curvature of the results of the press forming analysis are shown in FIG. 5. The white to gray display units show the locations with large curvature. The elements with large curvature are displayed blank in FIG. 6. Since the curvature becomes extremely large at the step differences, if displaying blank the elements in the vertical walls with curvatures over the threshold value, division into a plurality of regions at the ridgelines of the step differences becomes possible. By extracting or selecting individual regions, regions based on characterizing forms can be selected. From FIG. 6, it is learned that division into a side wall with a step difference having three surfaces, a web, a vertical wall with no step difference (hidden from view), and flanges at the two sides is possible. Among the regions divided by FIG. 6, the regions judged to be processed as regions of high stress based on the forming data (stress distribution) shown in FIG. 4 are the regions A105 to A107 shown in FIG. 7. The judgment process judges whether to whether to perform the later mentioned processing on the regions divided by the curvature and/or angle based on the forming data. For example, it judges this by the stress level after press forming analysis of each divided region.

Figure 8:
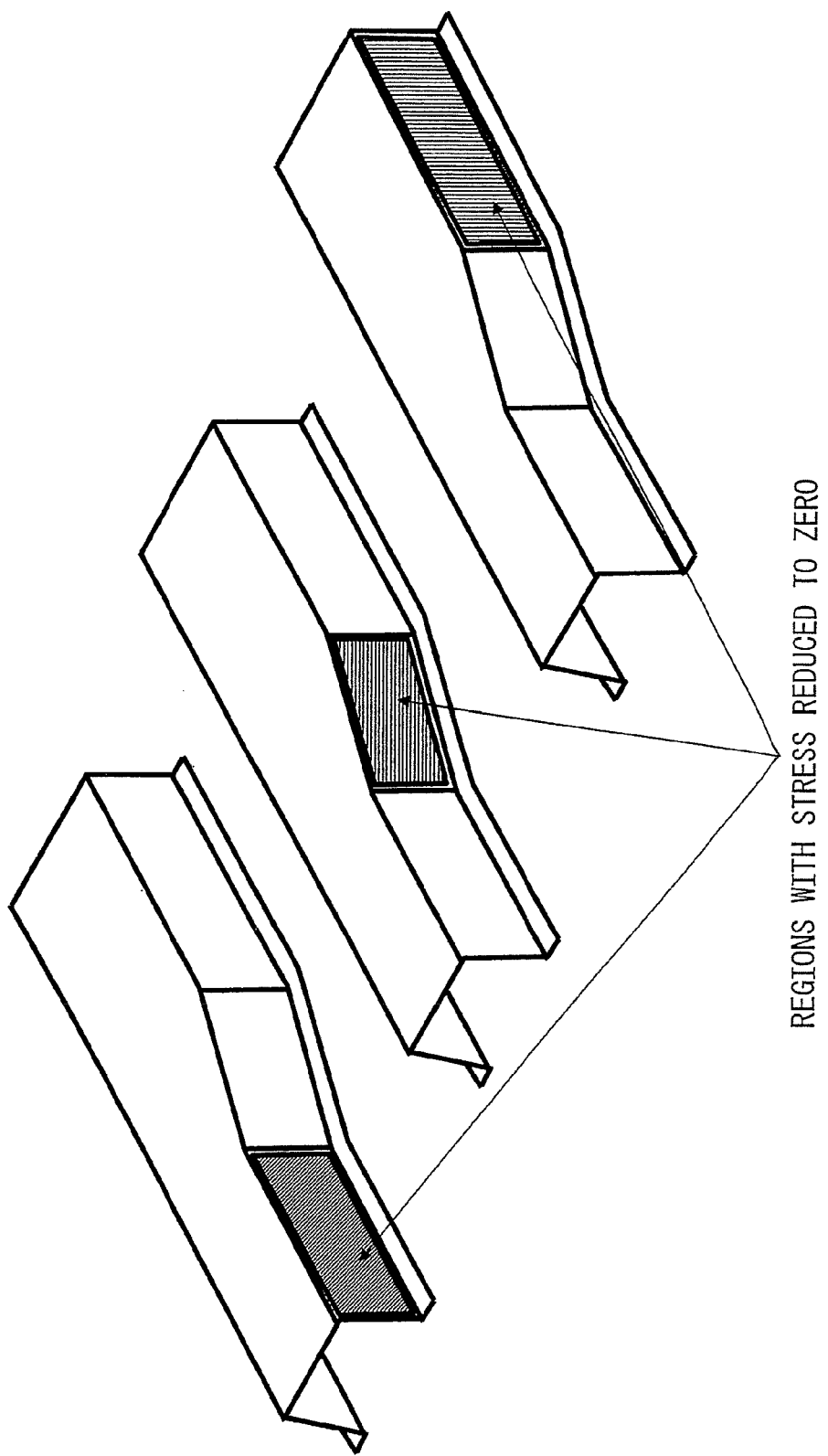
FIG. 8 is a contour diagram when making the stress of part of the regions zero according to an example of the present invention, FIG. 9 gives views showing coordinate systems used in a finite element method according to an embodiment of the present invention.

The state of processing all elements of the regions A105 to A107 to reduce the stress to zero is shown in FIG. 8.

Here, the maximum curvature of the elements was used, but it is possible to similar divide a part into regions using the angle between elements.

Further, if considering a member with a hat cross-sectional form with no step difference, as the divided regions, the web, the vertical walls at the two sides, and the flanges at the two sides can be selected. Further, when the selected region is not a flat surface, it is possible to repeat a similar technique to select more characterizing regions.

In this way, the physical property value/physical property quantity processor 14 can determine the divided regions based on the curvature or elements from the results of analysis of the press forming analyzer 11.

The springback analyzer 12 uses the finite element method (for example, the existing software PAM-STAMP, LS-DYNA, Autoform, OPTRIS, ITAS-3D, ASU/P-FORM, ABAQUS, ANSYS, MARC, HYSTAMP), inputs the stress distribution described in the "P org.k" obtained by the press forming analyzer 11, and runs the springback analysis. The calculation of the springback in the software is for example performed by content along with the basic equation of finite elastoplastic deformation or discretization technique. However, the springback can be calculated by both elastic analysis or elastoplastic analysis.

Further, the springback analyzer 12 can display the results of springback analysis by the finite element method using post processing software on the springback value output screen 19 by a contour diagram. Further, the physical property value/physical property quantity processor 14 can normalize the springback value by dividing it by the divided region area and the representative length, representative width, representative height, representative sheet thickness, tensile strength, etc. of the press formed part so as to make the degree of effect of the divided variables and springback easy to understand and output the data. The output data can be used by post processing software for display by a contour diagram. By this normalization, the relationship between the physical property value/physical property quantity and springback value of a workpiece can be easily visually grasped.

Furthermore, the physical property value/physical property quantity processor 14 can divide the springback value by the punch speed or blank holding force or other press forming conditions to find the normalized values and use post processing software for display by a contour diagram so as to enable the relationship between the press forming conditions and the springback value to be easily visually grasped. This normalization of the springback value and display by a contour diagram of its numerical values can economically and efficiently shorten the identification of the location of the cause of occurrence of springback and can economically and efficiently shorten the time for studying the method of forming a formed product.

The file storage unit 16 is a storage unit for storing the results of output of the press forming analyzer 11, springback analyzer 12, and the later explained physical property value/physical property quantity processor 14, that is, the data file "P org.k", "SB org.k", "P rem.casen.k", "SB rem.casen.k", "P trim.casen.k", etc. However, when these data files etc. are directly input/output among the press forming analyzer 11, springback analyzer 12, and physical property value/physical property quantity processor 14, this file storage unit 16 is not necessarily required.

The physical property value/physical property quantity processor 14 selects part of the regions in the output data file "P org.k" of the press forming analyzer 11 and processes at least one variable among the sheet thickness, modulus of elasticity, modulus of plasticity, stress component values, and strain component values of that part of the regions. Further, it generates the output data file "P rem.case1.k" after processing and outputs it to the springback analyzer 12. This data file can be repeatedly transmitted and received and is sequentially stored in the file storage unit 16. Further, it is possible to transfer data not in the form of a file, but in the form of data input/output of an execution process or thread.

The identified location or the region data for judging the cause of springback used in the finite element method may be made one or more elements in the finite element method, a fine region comprised of a plurality of elements, a set of continuous elements, or other calculation unit sections, part of the points for calculation of the stress or strain in calculation units of the numerical integration technique by the finite element method, that is, integration points (including both part of the points in the sheet thickness direction and part of the points in the plane) etc. The "one or more elements" means units of division into regions of the finite element method, that is, elements, while a "calculation unit section" means one or a continuous set of fine regions forming calculation units in elementary analysis. Further, "integration points" generally means points for approximate integration by the finite element method. "Part of the integration points" means part of the points for calculation of the stress or strain in calculation units of the numerical integration technique by the finite element method and includes both part of the points in the sheet thickness direction and part of the points in the plane.

Further, "at least one variable among the sheet thickness, modulus of elasticity, modulus of plasticity, stress component values, and strain component values" means at least one of the total 18 factors of the sheet thickness, modulus of elasticity (Young's modulus, Poisson's Ratio), modulus of plasticity (yield stress, modulus of plasticity, work hardening index), stress or strain in the x-, y-, and z-direction (total 3 components) when using the 3D coordinate system (x, y, z) for analysis, and shear stress or shear strain in the xy-plane, yz-plane, and zx-plane (3 components each) of part of a workpiece.

FIG. 9 is a view showing the coordinate system used in the finite element method. (a) shows a coordinate system of three dimensions as a whole, while (b) shows a local coordinate system.

At this time, as shown in FIG. 9(a), in addition to the component values of the (x, y, z) coordinate axes, for example, as shown in FIG. 9(b), the total 12 components of the stress, strain, shear stress, and shear strain at the local coordinate system (x1, x2, x3) deeming the plane of the element 31 as the xy-plane are also included. Further, the variables obtained by using the corresponding stress, the corresponding plastic strain, elastic energy (elastic work), plastic energy (plastic work), and other stress components or strain components and the component values calculated in the form of a stress increase or strain increase or other increase of the component values are also included.

In general, with finite element method analysis analyzing steel sheet, the physical property value/physical property quantity of the sheet is divided into 2 mm to 4 mm square finite elements. However, the unit of division of elements is made a length whereby the physical property value/physical property quantity becomes approximately fixed, so is not necessarily limited to 2 mm to 4 mm squares. That is, a location with a large residual stress sometimes has to be divided further smaller by finite elements. Further, the elements are defined by 3D coordinate planes, while the angles or curvatures of the surfaces of finite elements are defined by comparison with other surfaces.

In this way, to identify a location of a cause of occurrence of springback, it is possible to divide a member into regions based on the angle or curvature and process parts with high residual stress levels so as to greatly reduce the amount of calculations and thereby enable identification of a location of a cause of occurrence of springback faster.

As an example of the processing, the method of multiplying the $\sigma_x$ component values by a coefficient will be explained.

If defining the stress components before processing at the integration points of the selected region as ($\sigma_{x0}$, $\sigma_{y0}$, $\sigma_{z0}$, $\tau_{xy0}$, $\tau_{yz0}$, $\tau_{zx0}$) and the strain components as ($\epsilon_{x0}$, $\epsilon_{y0}$, $\epsilon_{z0}$, $\gamma_{xy0}$, $\gamma_{yz0}$, $\gamma_{zx0}$), the stress components ($\sigma_x$, $\sigma_y$, $\sigma_z$, $\tau_{xy}$, $\tau_{yz}$, $\tau_{zx}$) and strain components ($\epsilon_x$, $\epsilon_y$, $\epsilon_z$, $\gamma_{xy}$, $\gamma_{yz}$, $\gamma_{zx}$) after processing become as follows:

$\sigma_x = K \times \sigma_{x0}$, $\sigma_y = \sigma_{y0}$, $\sigma_z = \sigma_{z0}$, $\tau_{xy} = \tau_{xy0}$, $\tau_{yz} = \tau_{yz0}$, $\tau_{zx} = \tau_{zx0}$
$\epsilon_x = \epsilon_{x0}$, $\epsilon_y = \epsilon_{y0}$, $\epsilon_z = \epsilon_{z0}$, $\gamma_{xy} = \gamma_{xy0}$, $\gamma_{yz} = \gamma_{yz0}$, $\gamma_{zx} = \gamma_{zx0}$ Here, processing is performed changing K in the range of −1000 to 1000. Generally, the sheet thickness is made the value before processing, while the modulus of elasticity and modulus of plasticity are made the values input by the forming condition input unit 18. For illustration, K is shown for only $\sigma_x$, but may be similarly changed for other components as well.

Further, it is also possible to include the material properties (sheet thickness, modulus of elasticity, and modulus of plasticity) in the processing. For example, the physical property value/physical property quantity processor 14 selects part of the regions of a workpiece obtained from the press forming analyzer 11 and multiplies for example the Young's modulus of the selected region by a coefficient in the processing. In this case, if designating the sheet thickness to, Young's modulus $E_0$, Poisson's Ratio $v_0$, modulus of plasticity $F_0$, $a_0$, $n_0$ (in the case of $\sigma = F_0(\epsilon + a_0)^{n_0}$) before processing of the selected region, the sheet thickness t, Young's modulus E, Poisson's Ratio v, modulus of plasticity F, a, and n (in the case of $\sigma = F(\epsilon + a)^n$) after processing become as follows:

t=$t_0$, E=K×$E_0$, v=$v_0$, F=$F_0$, a=$a_0$, n=$n_0$

Here, K may be changed in the range of −1000 to 1000. For illustration, K is shown only for E, but may be similarly changed for other material properties as well.

Further, the physical property value/physical property quantity processor 14 can select and process a region by changing the file outputting the status variable, obtained from the press forming analyzer 11, by direct editing. For example, it is also possible to display the content of a file by Workpad® or another software having a text editing function, directly rewrite a region component value desired to be processed by operation of the forming condition input unit 18, and change component values by cutting and pasting.

Due to this, what kind of effect a processed variable (component) of a selected region has on the springback can be quantitatively evaluated.

For example, when the springback analyzer 12 displays the distribution of displacement of the finite element nodes by a contour diagram or when it displays the cut cross-section of the form, diagrams of the results for each of the processed variables (components) of the selected region can be arrayed and compared on the springback value output screen 19 or output by a not shown printer and compared. Further, when confirming the coordinate values (X, Y, Z) of the node of any designated position by software or file output, it is possible to compare the numerical values for each processed variable (component) of the selected region or use spreadsheet software etc. for graphing and comparison.

The contour diagram displayed on the springback value output screen 19 is obtained by repeating the physical property value/physical property quantity processing by the physical property value/physical property quantity processor 14 and the springback value calculation by the springback analyzer 12 and accurately identifying the location or variable causing the springback.

Furthermore, by changing the identified region of the physical property value/physical property quantity processor 14 by selection or by multiplying the selected region component value by the coefficient of not only $\sigma x$, but also $\sigma y$, $\tau xy$, or another component value as processing, then having the springback analyzer 12 run the springback analysis and having the springback value output screen 18 display the location or variable causing the springback and comparing the amount of change of displacement due to the springback, it is possible to accurately identify the location or variable causing the springback.

Further, by having the physical property value/physical property quantity processor 14 select a plurality of regions at part of a workpiece and simultaneously performing the processing on the selected regions, it is possible to reduce the analysis work required for identification of the cause.

Figure 10:
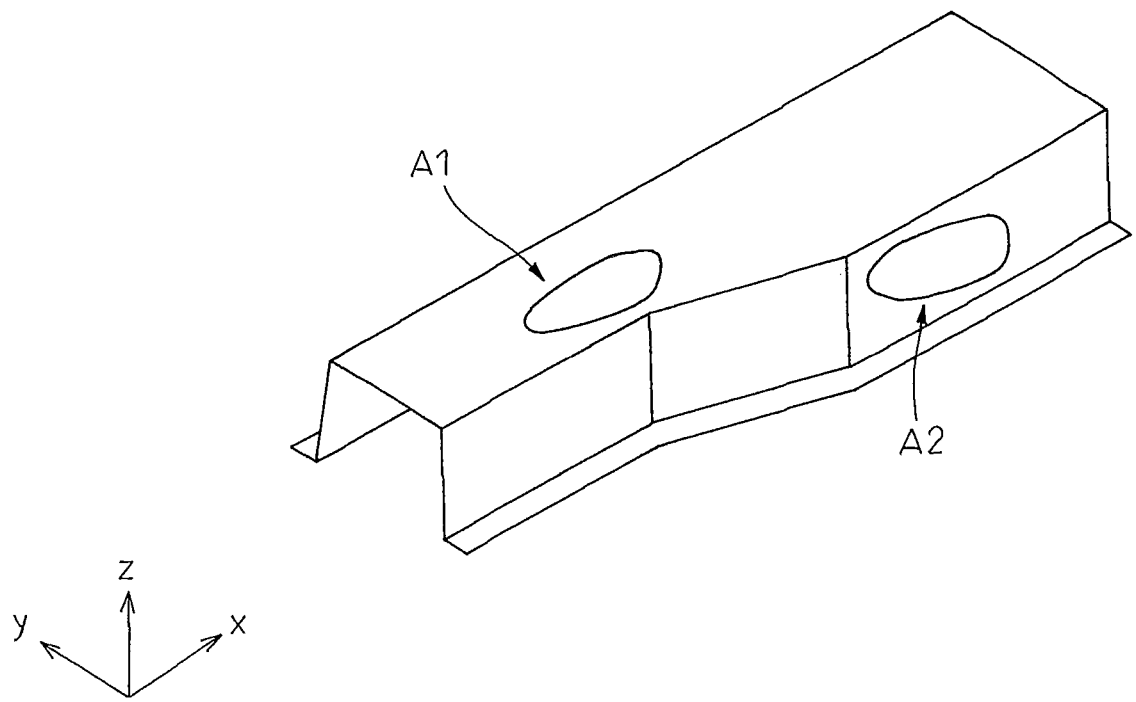
FIG. 10 is a perspective view showing an example of selection of regions of a workpiece according to an embodiment of the present invention.

FIG. 10 is a perspective view showing an example of selection of a region of a part of a hat-formed cross-section according to an embodiment of the present invention.

For example, when the workpiece obtained by the press forming analyzer 11 is a part of a hat-formed cross-section as shown in FIG. 5, the physical property value/physical property quantity processor 14 simultaneously selects a plurality of regions A1 and A2 with a stress after forming larger than a predetermined value as shown in FIG. 10, processes the selected regions A1 and A2 by multiplying them by the coefficient σx, and has the springback analyzer 12 use the results of processing for springback analysis.

From the results of the springback analysis, it is possible to investigate the amount of change of the displacement due to the springback and evaluate how much the stress component value σx applied to the regions A1, A2 affects the springback by just a single processing without processing for each side.

Further, by redividing the regions changing the most in springback value after performing the springback analysis by the springback analyzer 12, judging them until the size of the redivided regions becomes a predetermined value or less, processing the redivided regions at the physical property value/physical property quantity processor 14, and having the springback analyzer 12 again perform the springback analysis, it is possible to identify the region where the springback value changes the most as the cause of occurrence of springback and efficiently identify the cause. Note that the physical property value/physical property quantity processor 14 can calculate the convergence by changing the physical property value and physical property quantity as operational variables so that the amount of change of springback becomes within the allowable value and simultaneously calculate the convergence by changing the divided regions of the identified region as an operational variable.

Further, when the press forming analyzer 11 for example performs forming analysis using the finite element method and numerically obtains the distributions of stress and strain values after forming, the physical property value/physical property quantity processor 14 can select one or more elements and use them as the regions for processing when selecting the regions. The finite element method, an analytical technique for solving the place problem, is characterized by treating a continuous object divided into finite elements. The elements are connected at the finite number of nodes positioned on the sides. The displaced portions in the elements are unambiguously determined from the form function defined for the individual elements and the displacement of the nodes. For example, it is possible to display the distribution of the stress components σx obtained by the press forming analyzer 11 and use the element with the largest σx value as the selected region or use the group of the elements with the largest σx value and the elements adjoining that element as the selected regions.

Further, when the press forming analyzer 11 for example performs forming analysis using the elementary analysis technique and numerically obtains the distributions of stress and strain values after forming, the physical property value/physical property quantity processor 14 can select one or more calculation unit sections and use them as the regions for processing when selecting the regions.

Further, when the press forming analyzer 11 for example performs forming analysis using the finite element method and numerically obtains the distributions of stress and strain values after forming, the physical property value/physical property quantity processor 14 can select one or more integration points and use them as the regions for processing when selecting the regions. For example, in the finite element analysis of the press forming analyzer 11, the workpiece is analyzed by shell elements having five integration points in the sheet thickness direction (from the rear surface to the front surface of the plate, 1, 2, 3, 4, and 5). The physical property value/physical property quantity processor 14 need use only the integration point 1 closest to the rear surface of the plate of selected element and 5 furthest from the rear surface of the plate as regions for processing. Due to this, it is possible to isolate and evaluate the effects of bending deformation received at the time of contact with and deformation by a part of tooling having curvature.

Figure 11:
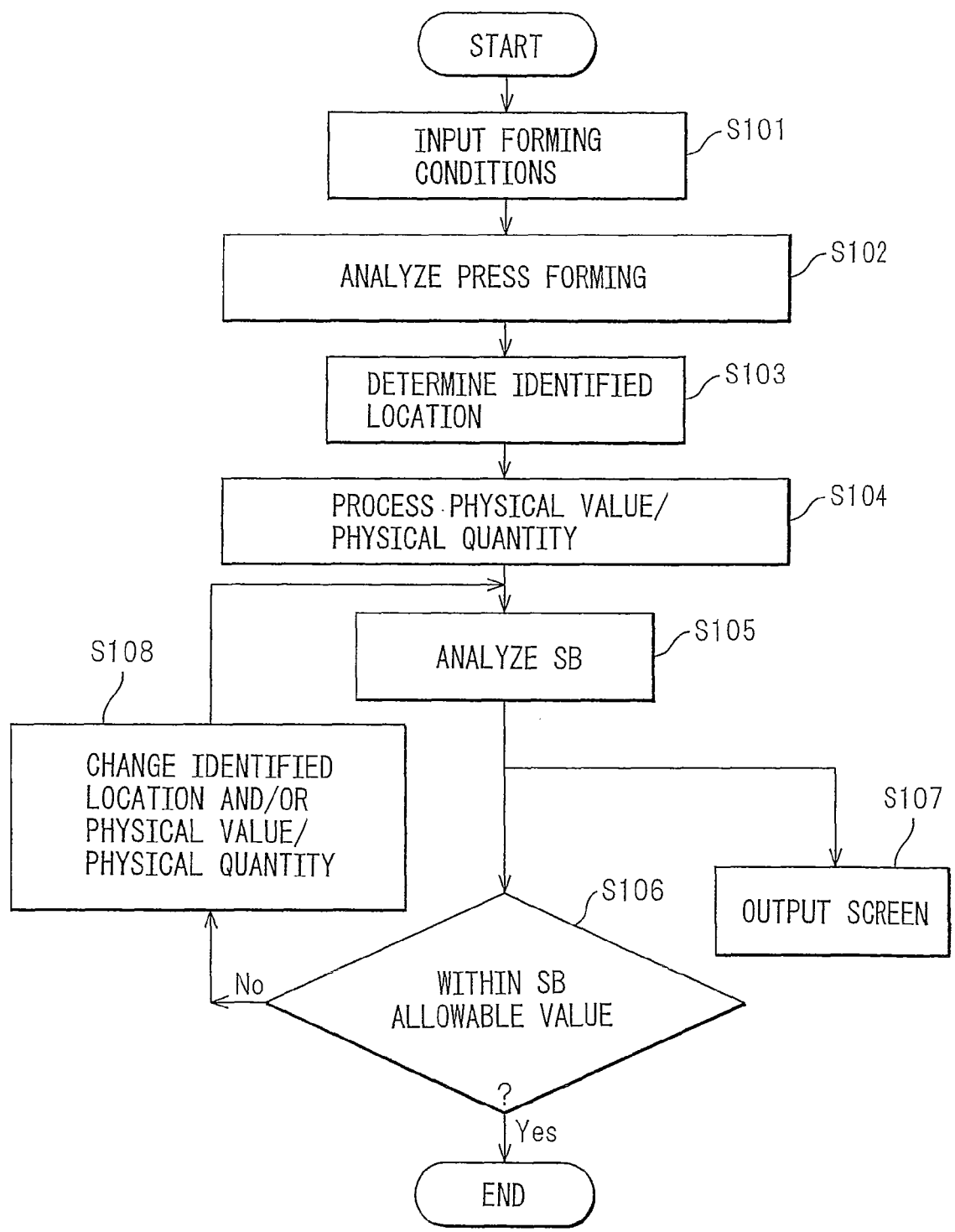
FIG. 11 is a flowchart of processing for identification of a location of a cause of occurrence of springback according to an embodiment of the present invention.

FIG. 11 is a flowchart of the processing for identification of a cause of occurrence of springback according to an embodiment of the present invention.

At step S101, the forming condition input unit 18 receives as input the forming conditions. Next, the procedure proceeds to step S102.

At step S102, the press forming analyzer 11 numerically analyzes the workpiece defined by the forming conditions and calculates the distribution of the stress and strain values after forming of the press formed product. Next, the procedure proceeds to step S103.

At step S103, the physical property value/physical property quantity processor 14 determines the identified location becoming the converted region. This identified location calculates the curvature and/or angle for the press formed part, divides the formed article into regions based on said curvature and/or angle, judges the divided regions based on the forming data, and determines the regions for the later mentioned processing. Next, the procedure proceeds to step S104.

At step S104, the above-mentioned processing is performed for converting at least one of a physical property value and physical property quantity at the part of the regions judged to be processed at S103. Next, the procedure proceeds to step S105.

At step S105, the springback value is calculated based on the converted physical property value and physical property quantity of the workpiece at the time of press forming. Next, the procedure proceeds to step S106. Simultaneously, at step S107, the results of the springback value are displayed on the screen by a contour diagram etc.

At step S106, it is judged if the allowable value of the springback is within an allowable value. If within the allowable value, the processing is ended. If over the allowable value, the procedure proceeds to step S108. Note that step S106 and step S108 may also be performed by a human worker manually designating the identified location while viewing the amount of change of springback.

At step S108, the identified location and physical property value/physical property quantity of the workpiece are changed. Here, it is possible to change only the identified location, possible to change only the physical property value/physical property quantity, and possible to simultaneously change both. Further, the procedure returns to step S105. The processing of step S105, step S106, and step S108 can be performed by convergence calculation so that the amount of change of springback becomes within an allowable value and is repeated until becoming the threshold value or less.

Note that when limiting the number of times of repetition of this processing and exceeding the limited number of times of repetition, the processing may be ended. In this case, the output data file "SB rem.casen.k" of the springback analyzer 12 stored in the file storage unit 16 is studied by a human worker. The human worker can view the springback value output screen 19 and search for the optimum identified location.

Figure 12:
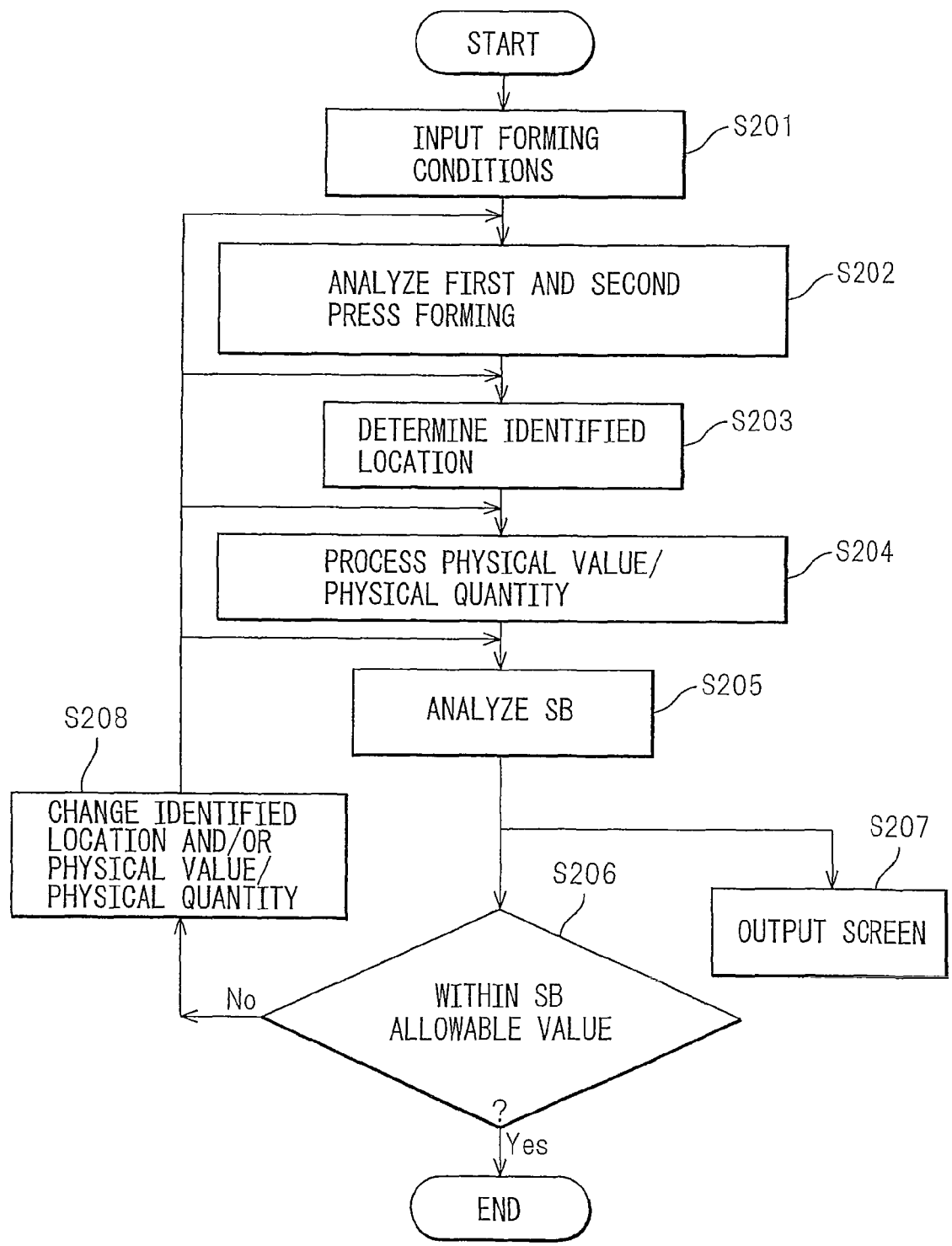
FIG. 12 is a flowchart of processing for identification of a location of a cause of occurrence of springback according to an embodiment of the present invention.

FIG. 12 is a flowchart of the processing for identification of the location of a cause of springback according to an embodiment of the present invention.

At step S201, the forming condition input unit 18 receives as input the first forming conditions. Next, the procedure proceeds to step S202.

At step S202, the press forming analyzer 11 numerically analyzes the press formed part defined by the first forming conditions and calculates the distribution of the stress and strain values after forming of the product by press forming. Furthermore, the press forming analyzer 11 numerically analyzes a workpiece defined by second forming conditions changed in at least one of said first forming conditions and calculates the distribution of stress and strain values of the press formed product after forming (physical property value and physical property quantity). Next, the procedure proceeds to step S203.

At step S203, the physical property value/physical property quantity processor 14 determines the identified location becoming the converted region. This identified location is determined by calculating the difference of the physical property value and physical property quantity for each region of the press formed part calculated under the first forming conditions and the physical property value and physical property quantity for each region of the press formed part calculated under the second forming conditions and judging if the difference value is larger than a predetermined value. When there is a differential value larger than the predetermined value, the region having that differential value is determined as the identified location and the procedure proceeds to step S204.

At step S204, processing is performed to convert at least one of a physical property value and physical property quantity at the region determined at S203. Next, the procedure proceeds to step S205.

At step S205, the springback value is calculated based on the processed physical property value and physical property quantity. Next, the procedure proceeds to step S206. Simultaneously, at step S207, the results of the springback value are displayed on a screen by a contour diagram etc.

At step S206, it is judged if the allowable value of the springback is within the allowable value. If within the allowable value, the processing is ended. If over the allowable value, the procedure proceeds to step S208.

At step S208, when changing the condition making the second forming conditions different from the first forming conditions in step S202, the procedure returns to step S202, when changing the physical property value/physical property quantity for determination of the identified location or the predetermined value for judgment at step 203, the procedure returns to step S203, and when changing the processing of step S204, the procedure returns to step S204. Note that step S208 may also be performed by a human worker making the judgment while viewing the results of the screen output etc. The processing of step S202 to S208 may be performed by convergence calculation making the amount of change of springback within the allowable value and repeated until becoming within the springback allowable value.

Note that when limiting the number of times of repetition of this processing and exceeding the limited number of times of repetition, the processing may be ended. In this case, the output data file "SB rem.casen.k" of the springback analyzer 12 stored in the file storage unit 16 is studied by a human worker. The human worker can view the springback value output screen 19 and search for the optimum identified location.

Figure 13:
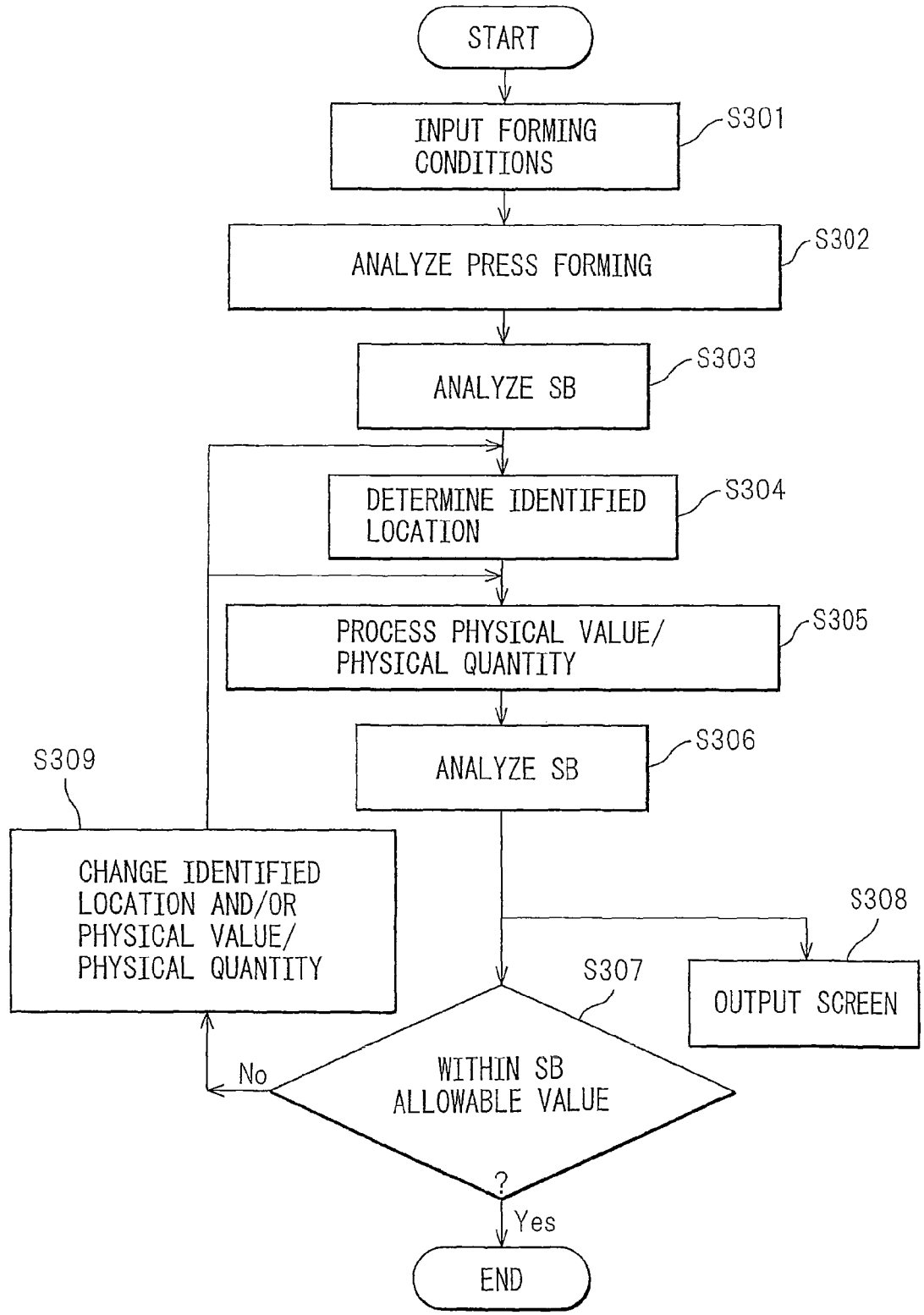
FIG. 13 is a flowchart of processing for identification of a location of a cause of occurrence of springback of an apparatus for identification of a location of a cause of springback according to an embodiment of the present invention.

FIG. 13 is a flowchart of the processing for identification of the location of a cause of springback according to an embodiment of the present invention.

At step S301, the forming condition input unit 18 receives as input the forming conditions. Next, the procedure proceeds to step S302.

At step S302, the press forming analyzer 11 numerically analyzes the workpiece defined by the forming conditions to calculate the physical property value and physical property quantity after forming the press formed product. Next, the procedure proceeds to step S303.

At step S303, the springback analyzer 12 analyzes the press formed workpiece to calculate the first springback value. Next, the procedure proceeds to step S304.

At step S304, it is judged if there is a region where at least one of a physical property value and physical property quantity after springback of the press formed product is larger than a predetermined value. If there is such a region, it determines that region as an identified region. Alternatively, it is judged if there is a region where the difference of the physical property value and physical property quantity before and after springback is larger than a predetermined value. If there is such a region, it determines that region as an identified region. Next, the procedure proceeds to step S305.

At step S305, at least one of a physical property value and physical property quantity data of the determined identified location is processed. Next, the procedure proceeds to step S306.

At step S306, a second springback value is calculated based on the processed physical property value and physical property quantity data of the identified location. Next, the procedure proceeds to step S307. Simultaneously, at step S308, the result of the first or second springback value is displayed on a screen by a contour diagram etc.

At step S307, it is judged if the second springback value is within the allowable value. If within the allowable value, the processing is ended. If over the allowable value, the procedure proceeds to step S309.

At step S309, the physical property value and physical property quantity variable or processing for determination of the identified location is changed. When changing the method of determination of the identified location, the variables of the physical property value and physical property quantity to be determined are changed and said predetermined value is changed by returning to step S304. When changing the variables etc. performed by the processing, the procedure returns to step S305. Note that step S309 may also be performed by a human worker making a judgment while viewing the screen output and other results. The processing of step S304 to S309 may be repeated by convergence calculation until within the springback allowable value.

Note that when a convergence solution cannot be obtained in the relationship with the springback allowable value, it is also possible to limit the number of repetitions of the processing and end the processing at the limited number of repetitions. In this case as well, the output data file "SB UVC.casen.k" of the springback analyzer 12 stored in the file storage unit 16 can be studied by a human worker. The human worker can view the springback value output screen 19 and find the optimum identified location.

Figure 14:
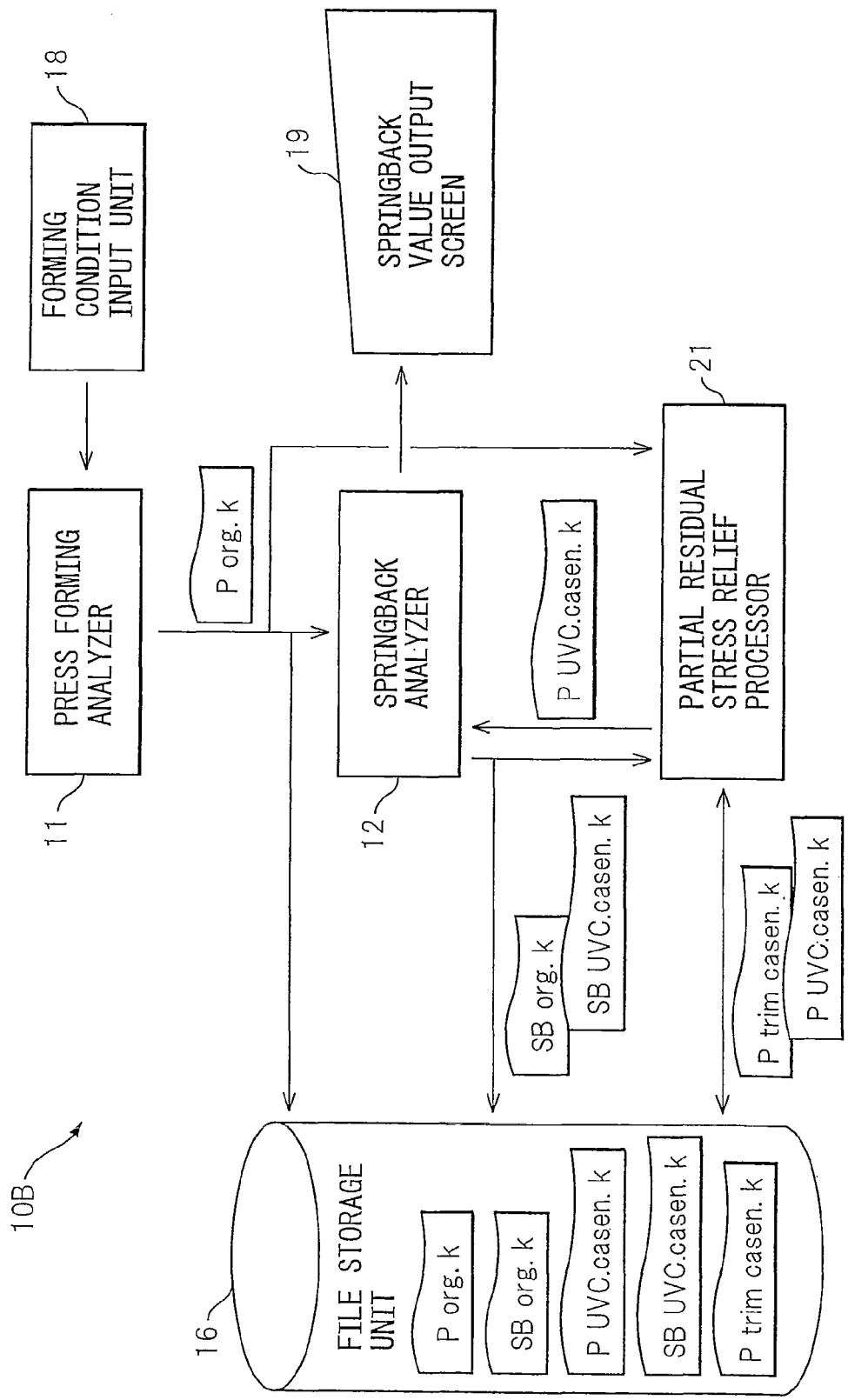
FIG. 14 is a functional diagram of an apparatus for identification of a location of a cause of occurrence of springback according to an embodiment of the present invention.

FIG. 14 is a functional diagram of an apparatus for identification of a location of a cause of occurrence of springback according to another embodiment of the present invention.

The apparatus for identification of a location of a cause of occurrence of springback 10B shown in FIG. 14, compared with the apparatus for identification of a location of a cause of occurrence of springback 10A shown in FIG. 3, has a partial residual stress relief processor 21 instead of the physical property value/physical property quantity processor 21.

The partial residual stress relief processor 21 is a processor for performing processing to relieve residual stress from the location believed to be the cause of occurrence of springback, that is, the identified location.

The identified location, in the same way as above, is determined by calculating the curvature and/or angles for a press formed part, dividing the formed article into regions based on said curvature and/or angles, judging the divided regions based on said forming data, and determining the region for the later mentioned processing. Further, the regions may be selected by a human worker using a forming condition input unit 18 (for example, a mouse, keyboard, etc.) based on the forming data (stress distribution etc.) and designating a range by coordinate values etc. while viewing the curvature and/or angles displayed on the springback value output screen 19. Furthermore, a plurality of identified locations may also be set.

Further, the identified location may be found by calculation based on the residual stress distribution of the data file "P org.k" or based on the springback value of the data file "SB org.k" and "SB UVC.casen.k" and/or residual stress distribution obtained by the springback analyzer 12.

That is, a location of concentration of residual stress at bottom dead center of the press forming may be made the identified location, a location of concentration of residual stress at the time of springback may be made the identified location, or a location of the maximum springback value may be made the identified location.

Furthermore, the partial residual stress relief processor 21 can judge the amount of change of springback due to relief of residual stress without changing the physical property value in the forming data of the formed article, so can find a state of the formed product suppressing springback while maintaining the strength of the formed product.

These identified locations may be judged by automatically producing various combined cases and calculating the springback value when the springback allowable value is not satisfied. In general, the part with the maximum springback value is usually at the outside circumference of the formed product, so it is preferable to make the location of concentration of residual stress the identified location with priority. For example, it is possible to define the location with the greatest concentration of residual stress as the highest priority selection candidate of the identified location, a part where even if the residual stress is not maximum, the residual stress is large to a certain degree and the springback value becomes maximum as the second highest priority selection candidate, and the location with the second greatest concentration of residual stress as the third highest priority selection candidate for the identified location.

The partial residual stress relief processor 21 receives as input data the output file "SB org.k" of the springback analyzer 12, determines the identified location as explained above, and makes the residual stress of the identified location zero or a more reduced value. Further, the data file where the residual stress of this identified location is changed is defined as the "P trim case1.k", the corresponding identified location in the "P org.k" is substituted by the data of "P trim case1.k", and the substituted file is made "P UVCcase1.k".

The partial residual stress relief processor 21 outputs "P UVCcase1.k" to the springback analyzer 12 and makes the springback analyzer 12 calculate the springback value. At this time, the springback analyzer 12 stores the results of calculation, that is, the data file "SBUVC.Case1.k", in the file storage unit 16 and displays the springback value shown in the data file on the springback output screen 19.

Further, the partial residual stress relief processor 21 compares the springback value before relief of residual stress in the "SB org.k" stored in the file storage unit 16 and the springback value after first relief of residual stress in the "SB UVC.Case1.k" and judges if the springback value has been reduced and has fallen to a threshold value or less.

When the springback value is within the allowable value, the processing is ended. When the springback value is outside a certain allowable value, for processing to further reduce the residual stress of the residual stress location, the partial residual stress relief processor 21 can perform partial residual stress processing at another identified location and/or by another residual stress value. As the other identified location, as explained above, a location of concentration of residual stress at bottom dead center of press forming, a location of a residual stress of a predetermined value or more and a maximum springback value, a location of concentration of residual stress at the time of springback, etc. become candidates. The springback value may be automatically calculated for these alone or in various combinations. A file of the position coordinate data and stress data of the identified location produced at that time, that is, "P trim casen.k", is produced for each of n number of cases.

The partial residual stress relief processor 21 may receive as input data the "P UVC.casen.k" produced corresponding to the "P trim casen.k" produced for each of a plurality of cases and store the springback calculated "SB UVC.Casen.k" in the file storage unit 16.

Figure 15:
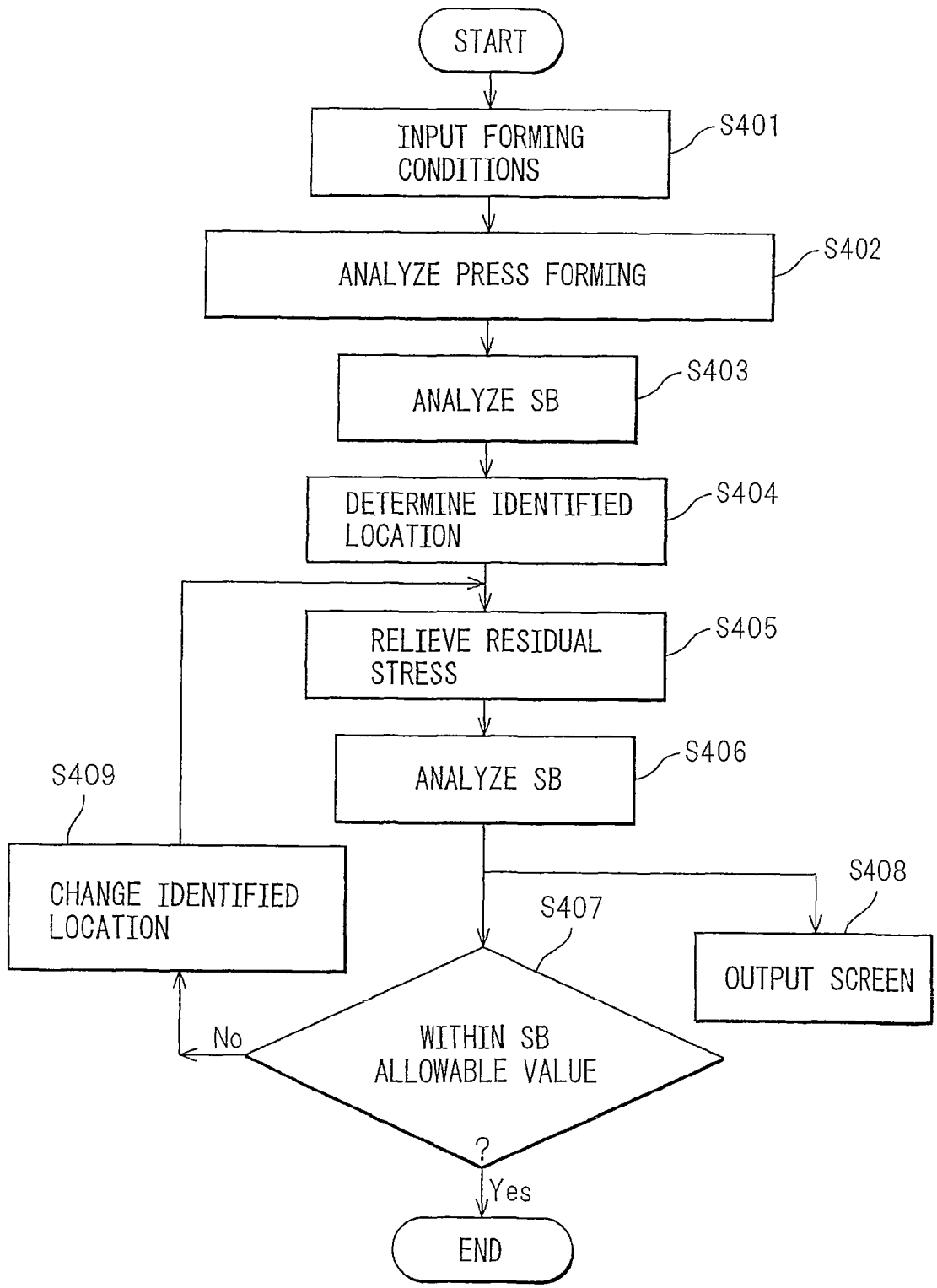
FIG. 15 is a flowchart of processing for identification of a location of a cause of occurrence of springback according to an embodiment of the present invention.

FIG. 15 is a flowchart of the processing for identification of a location of a cause of springback according to an embodiment of the present invention.

At step S401, the forming condition input unit 18 receives as input the forming conditions. Next, the procedure proceeds to step S402.

At step S402, the press forming analyzer 11 numerically analyzes the workpiece defined by the forming conditions and calculates the distribution of the stress and strain values after forming the press formed product. Next, the procedure proceeds to step S403.

At step S403, the springback analyzer 12 analyzes the springback value of the press formed workpiece. Next, the procedure proceeds to step S404.

At step S404, the identified location for relief of the residual stress is determined. This identified location is determined by calculating the curvature and/or angles for a press formed part, dividing the regions of the formed article based on said curvature and/or angles, and determining the region for the relief of the residual stress (S405) explained later by judgment based on the forming data for each divided region. This determination is performed based on the residual stress at the time of press forming or at the time of springback or the springback value etc. when the residual stress is a predetermined value or more. Next, the procedure proceeds to step S405.

At step S405, processing is performed to reduce the residual stress of the identified location or make it zero. Next, the procedure proceeds to step S406.

At step S406, the springback value is calculated based on the form or properties at the time of press forming where the residual stress of the identified location is reduced or made zero. Next, the procedure proceeds to step S407. Simultaneously, at step S408, the results of the springback value are displayed on a screen.

At step S407, it is judged if the allowable value of the springback is within the allowable value. If within the allowable value, the processing is ended. If outside the allowable value, the procedure proceeds to step S409. Note that step S407 and step S409 may also be performed by a human worker manually designating the identified location while viewing the amount of change of springback.

At step S409, the identified location is changed. The identified location is changed by selection of one or more identified locations based on the parts of concentrations of residual stress at the time of press forming or at the time of springback, the parts of the maximum springback value when the residual stress is over a predetermined value, and other judgment matter. At this step, the identified location may also be manually selected through the forming condition input unit 18. Further, the procedure returns to step S405, where the above-mentioned processing is repeated until the result becomes within the springback allowable value of step S407.

Note that when a convergence solution cannot be obtained in the relationship with the springback allowable value, it is also possible to limit the number of repetitions of the processing and end the processing at the limited number of repetitions. In this case as well, the output data file "SB UVC.casen.k" of the springback analyzer 12 stored in the file storage unit 16 can be studied by a human worker. The human worker can view the springback value output screen 19 and find the optimum identified location.

Figure 16:
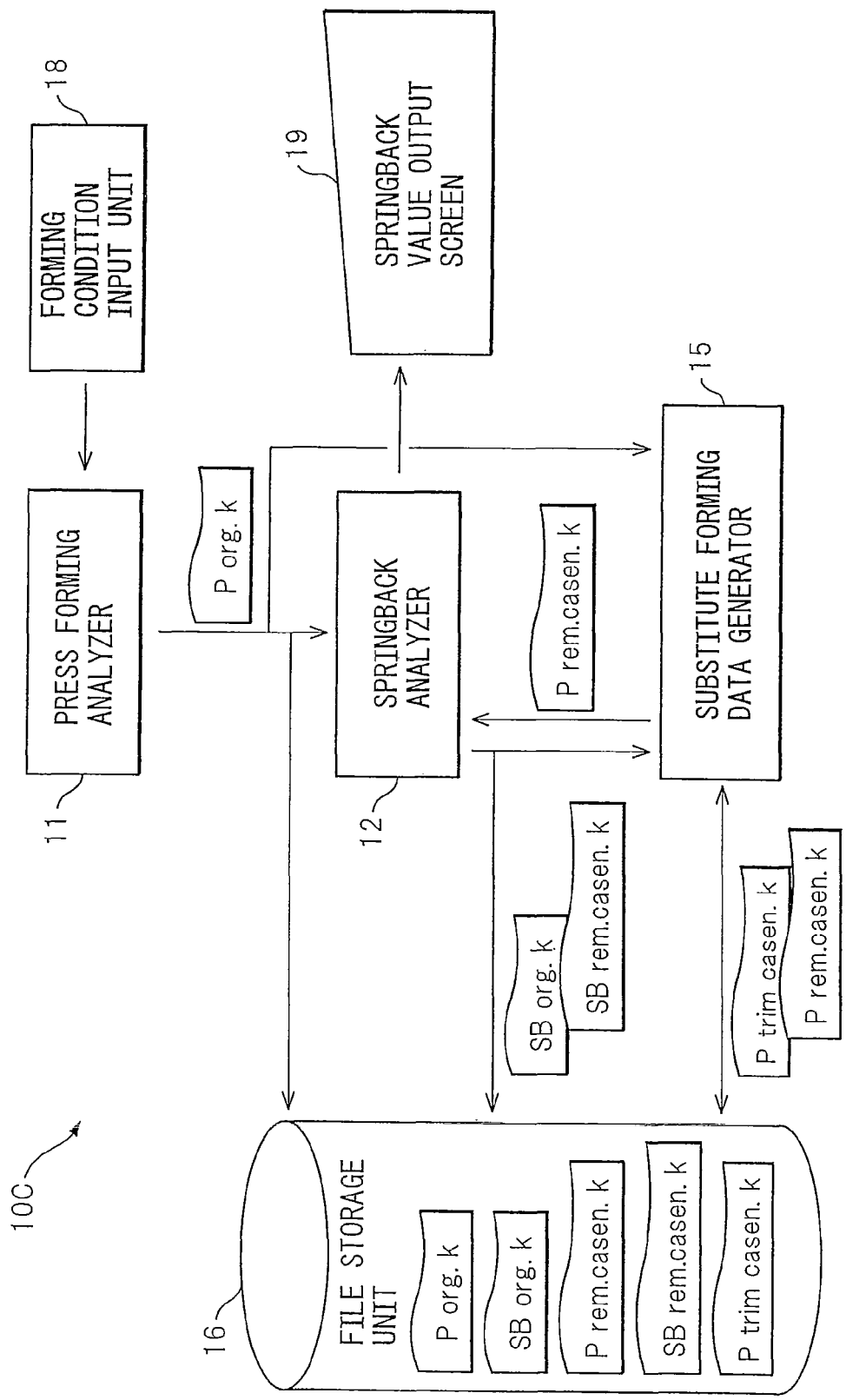
FIG. 16 is a functional diagram of an apparatus for identification of a position of a measure against springback according to an embodiment of the present invention.

FIG. 16 is a functional diagram of an apparatus for identification of a position of a measure against springback according to an embodiment of the present invention.

The apparatus for identification of a position of a measure against springback 10C has a press forming analyzer 11, springback analyzer 12, substitute forming data generator 15, file storage unit 16, forming condition input unit 18, and springback value output screen 19.

The output data of the press forming analyzer 11 is, for example, output as the file "P org.k" to the springback analyzer 12, the later explained substitute forming data generator 15, and the file storage unit 16.

The springback analyzer 12 uses the output data file "P org.k" of the press forming analyzer 11 and the output data file "P rem.casen.k" of the substitute forming data generator 15 as input data for performing springback analysis.

The output data of the springback analyzer 12 is output as the output data file "SB org.k" of the result of numerical analysis by the input data file "P org.k" or the output data file "SB rem.casen.k" of the result of numerical analysis by the later explained "P rem.casen.k" to the springback analyzer 12, substitute forming data generator 15, and file storage unit 16.

The substitute forming data generator 15 fetches the output data file "P org.k" of the press forming analyzer 11 and determines the allowable range of measures (beads etc.) and the divided regions of the allowable range of measures from the position data of the members included in the output data file. The substitute forming data generator 15 further acquires the data "P trim.casen.k" of the bead form and stress distribution from the form stress data table T1 (not shown) defined by the various formed beads and stress distribution defined in the file storage unit 16, substitutes the above-mentioned divided regions and their bead forms and stress distribution, and generates the substitute forming data "P rem.casen.k".

The substitute forming data generator 15 repeats the processing for substituting different form and stress distribution data for the divided regions so that the springback value becomes within a predetermined value. This repeated processing generates substitute forming data by substituting different form and stress distribution data for all data in the form stress data table T1 for all divided regions. Therefore, a plurality of substitute forming data "P rem.casen.k" is generated for each case no. n.

Further, the substitute forming data generator can substitute predetermined substitute data for at least one of the form of one or more regions giving a predetermined value or less of springback value and the stress distribution of that selected region (measure for reducing first springback value) and change the positions or number of said selected regions to calculate substitute forming data. Based on this substitute forming data, the springback analyzer can repeatedly calculate the springback value so as to reduce the first springback value and also reduce the second springback value, so the springback value can be reduced.

Further, for the above-mentioned divided regions as well, all sorts of cases of substitute forming data are generated for changing the size of the divided regions and making the springback value within a predetermined value in accordance with the selected form and stress distribution data.

Furthermore, the substitute forming data generator 15 can divide the springback value by the punch speed or blank holding force or other press forming conditions to find normalized values. Post processing software can be used to enable the relationship between the press forming conditions and the springback value to be easily visually grasped by a contour diagram. This normalization of the springback value and display by a contour diagram of its numerical values can economically and efficiently shorten the identification of the location of the cause of occurrence of springback and can economically and efficiently shorten the time for studying the method of forming a formed product.

The file storage unit 16 is a storage unit for storing the results of output of the press forming analyzer 11, springback analyzer 12, and the later explained substitute forming data generator 15, that is, the data file "P org.k", "SB org.k", "P rem.casen.k", "SB rem.casen.k", "P trim.casen.k", etc. However, when these data files etc. are directly input/output among the press forming analyzer 11, springback analyzer 12, and substitute forming data generator 15, this file storage unit 16 is not necessarily required.

The contour diagram displayed on the springback value output screen 19 enables visual judgment of the results of a measure against springback of substituting the form and stress distribution while repeatedly calculating the springback value by the springback analyzer 12 based on the substitute forming data by the substitute forming data generator 15.

Figure 17:
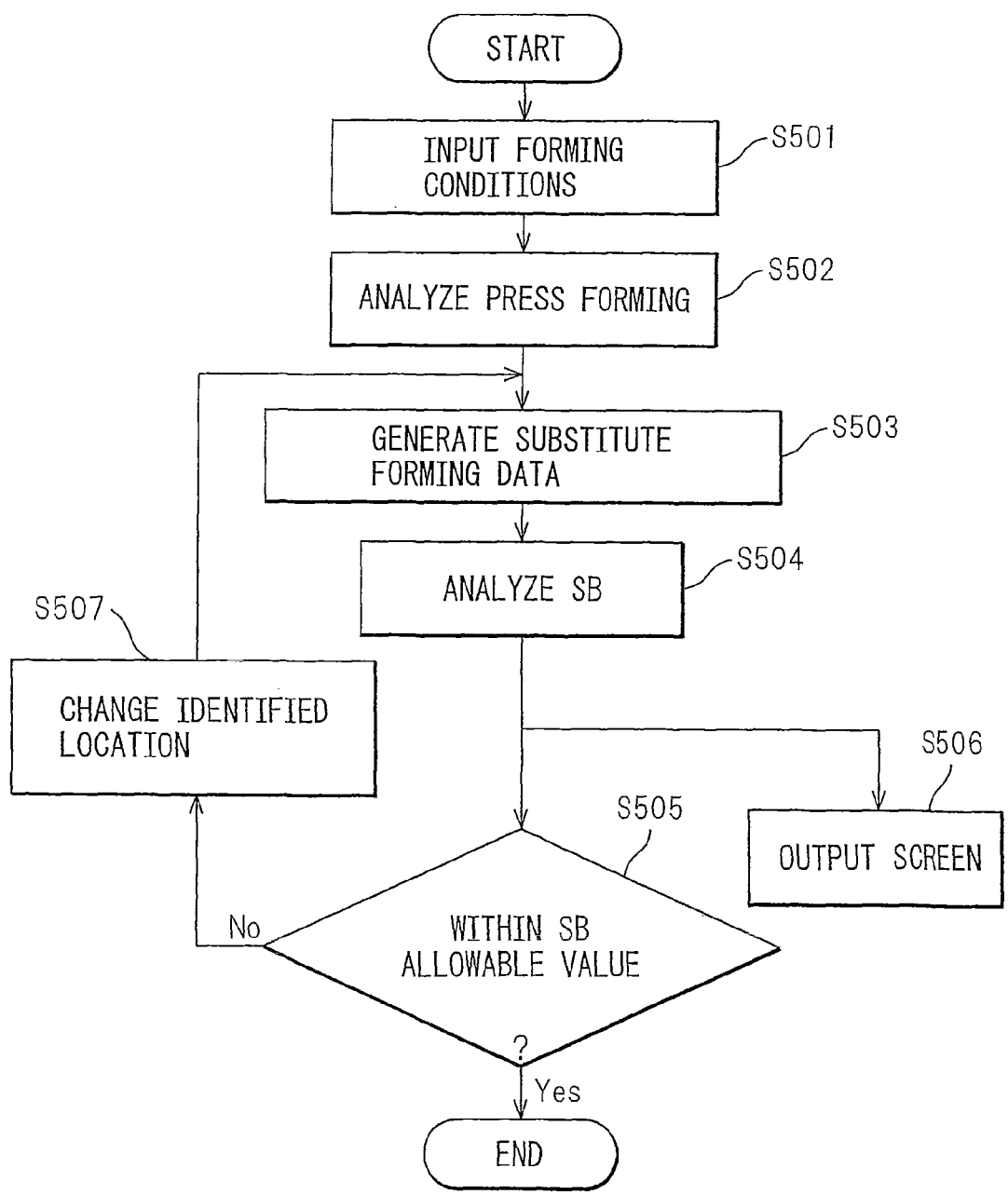
FIG. 17 is a flowchart of processing for identification of a location of a cause of occurrence of springback according to an embodiment of the present invention.

FIG. 17 is a flowchart of processing for identification of a location of a cause of occurrence of springback according to an embodiment of the present invention.

At step S501, the forming condition input unit 18 receives as input the forming conditions. Next, the procedure proceeds to step S502.

At step S502, the press forming analyzer 11 numerically analyzes the workpiece defined by the forming conditions to calculate the distribution of the stress and strain values after forming the press formed product. Next, the procedure proceeds to step S503.

At step S503, the substitute forming data generator 15 determines a region becoming the region for substitution in the workpiece in the forming data. The region for substitution is made a region having a sufficient size for substitution of the form or stress distribution. Further, the substitute forming data generator 15 selects the form or stress distribution data for substitution from the form stress distribution data table T1, substitutes the form or stress distribution data for the region for substitution of forming data, and transfers the substitute forming data 15 to the springback analyzer 12. Next, the procedure proceeds to step S504.

At step S504, the springback value is calculated for the substitute forming data 15. Next, the procedure proceeds to step S505. Simultaneously, at step S507, the result of the springback value is displayed on a screen by a contour diagram etc.

At step S505, it is judged if the springback value is within the allowable value. If within the allowable value, the processing is ended. If over the allowable value, the procedure proceeds to step S507.

At step S507, at least one of the region for substitution and the substituted form data or stress distribution is changed. Here, only the region for substitution may be changed, only the form data or stress distribution may be changed, or both may be simultaneously changed. Further, the procedure returns to step S503. The processing of step S503 to S507 can be performed by convergence calculation so that the springback value becomes within the allowable value and is repeated until it becomes within the allowable value.

Note that this processing does not limit the allowable value of the springback value in advance. It is also possible to calculate the case giving the minimum springback value by performing the springback analysis of step S504 for all combined cases of the region for substitution and substitute form data and stress distribution.

Further, the above explanation concerned convergence calculation using the springback value as the target variable and using the region for substitution, form data, and stress distribution as the operational variables, but if the number of these operational variables becomes extremely large, the solution space becomes extremely large, so it sometimes becomes difficult to find the optimum solution or a solution within the allowable value. In such a case, it is possible to use a genetic algorithm, neural net, or other well known algorithm to find the optimum solution etc.

Figure 18:
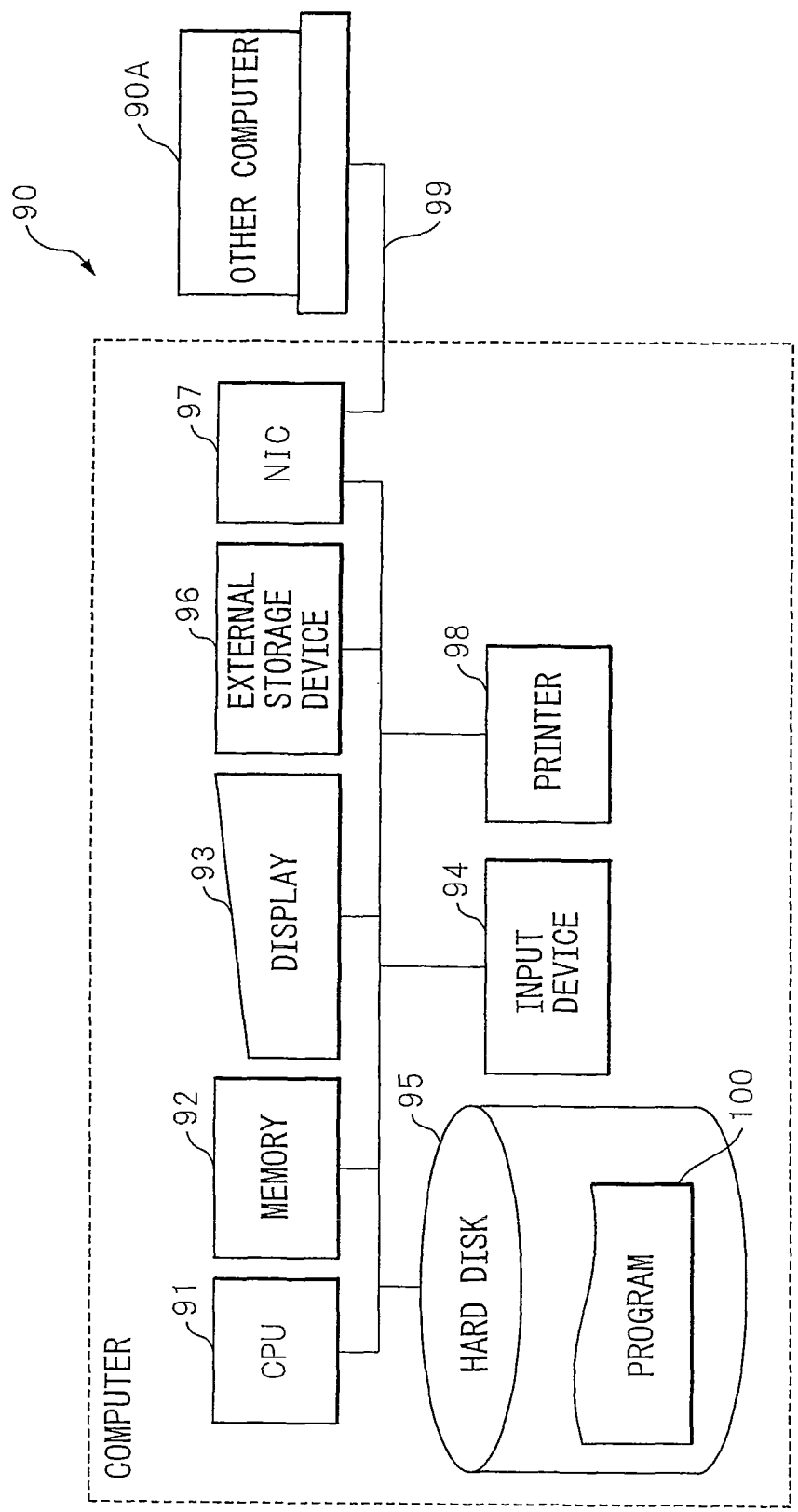
FIG. 18 is a hardware diagram of processing for identification of a location of a cause of occurrence of springback according to an embodiment of the present invention, FIGS. 19($a$), ($b$) are views showing a part of a hat-formed cross-section covered by springback analysis according to an embodiment of the present invention, FIGS. 20($a$), ($b$) are views showing cross-sectional positions and a torsion angle of a part of a hat-formed cross-section according to an embodiment of the present invention.

FIG. 18 shows a hardware diagram of an apparatus for identification of a location of a cause of occurrence of springback according to an embodiment of the present invention. The processings of the above-mentioned press forming analyzer 11, springback analyzer 12, physical property value/physical property quantity processor 14, substitute forming data generator 15, and partial residual stress relief processor 21 are defined in the program 100. This program 100 may also be run by a computer 90. The computer 90 is provided with a CPU 91 for executing the necessary processing, a memory 92 for storing the result of the processing (for example, a RAM (random access memory)), display 93, input device 94 such as a keyboard or mouse, hard disk 95, external storage device 96 such as a CD/DVD drive, NIC (network interface card) 97, and printer 98. The computer 90 can be connected with another computer 90A through a network 99 comprised by an Ethernet® cable connected to the NIC 97.

The program 100 is stored in a storage medium, loaded from an external storage device 96, or downloaded from another computer 90A through a network 99 and stored under the control of the CPU 91 in a hard disk 95 of the computer 90. Next, the stored program 100 is run by the CPU 91 and stored as an executed process or thread in the memory 92. For example, the processing in the press forming analyzer 11, springback analyzer 12, physical property value/physical property quantity processor 14, substitute forming data generator 15, or partial residual stress relief processor 21 becomes an executed process or thread. The above data file or data is input/output between the executed processes or threads. Further, these executed processes or threads are present dispersed in the other computer 90A. The processings may be performed dispersed by the computer 90 and other computer 90A.

Further, the forming condition input unit 18 and springback value output screen 19 shown in FIG. 3 may be an input device 94 and display 93. The above-mentioned file storage unit 16 may be a hard disk 95. The program 100 may also be stored in the hard disk 95. Further, the above-mentioned contour diagram output to the display 93 may be output to a printer 98.

Example 1

Examples will be used to explain the present invention in more detail.

FIG. 19 gives views showing a part of a hat-formed cross-section covered by the springback analysis according to an embodiment of the present invention, wherein (a) is a perspective view and (b) is a cross-sectional view of the same. This is comprised of a web W0, side walls W1 and W2, and flanges F1 and F2.

For the numerical analysis performed by the press forming analyzer 11 and springback analyzer 12, the existing plating forming simulation analysis software PAM-STAMP based on the finite element method was used. For the springback analysis, elastic analysis by the static implicit method was used.

The forming conditions used were data of high strength steel sheet having, as properties of the metal plate, a sheet thickness of 1.6 mm and a tensile strength of the 780 MPa class. Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input and a blank holding force of 60 tons was set.

FIG. 20 gives views showing the cross-sectional positions and torsion angle of a part of a hat-formed cross-section according to an embodiment of the present invention, wherein (a) is a perspective view and (b) is a cross-sectional view of the same.

The obtained results were processed by the post processing software to obtain the coordinate values of the points forming the cross-sections at the positions A and B shown in FIG. 20 and find the angle θ formed by the webs of the cross-sections. The "springback value" here is made the angle θ.

FIG. 21 is a perspective view showing an identified region A3 according to an embodiment of the present invention.

FIG. 22 is a perspective view showing identified regions A4 and A5 according to an embodiment of the present invention.

Figure 23:
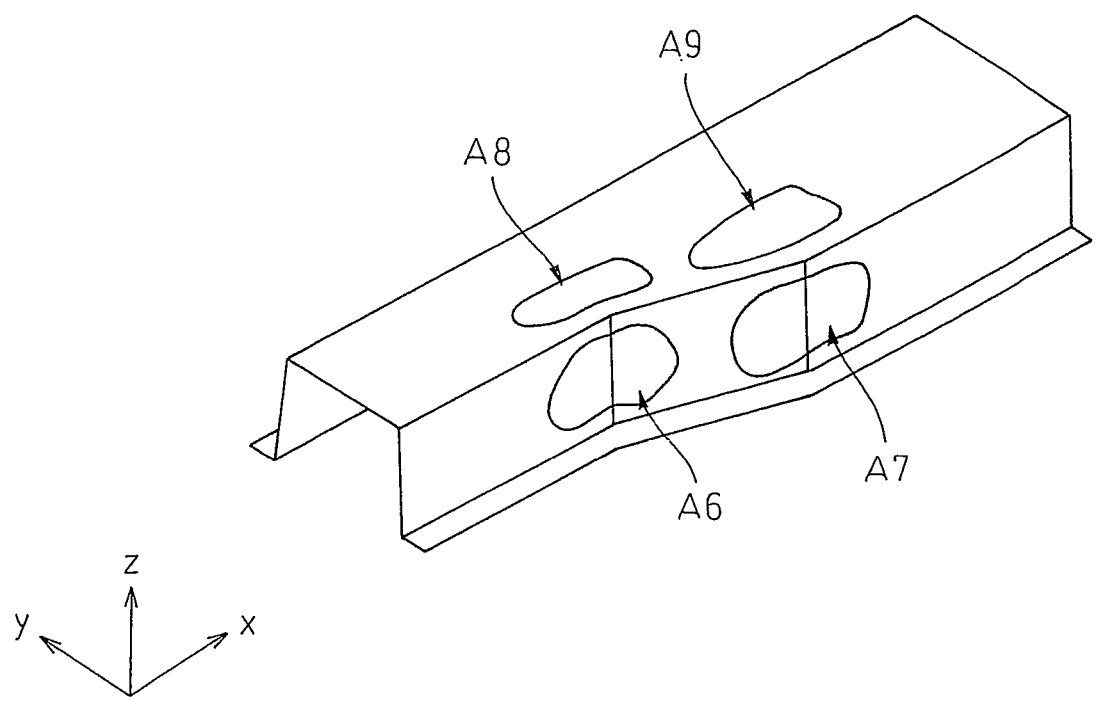
FIG. 23 is a perspective view of identified regions A6 to A9 according to an embodiment of the present invention, FIG. 24($a$) is a perspective view showing identified regions A10 to A14 according to an embodiment of the present invention, (b) is a cross-sectional view showing identified regions A10 to A14 according to an embodiment of the present invention.

FIG. 23 is a perspective view showing identified regions A6 to A9 according to an embodiment of the present invention.

FIG. 24(*a*) is a perspective view showing identified regions A10 to A14 according to an embodiment of the present invention, FIG. 24(*b*) is a cross-sectional view showing the identified regions A10 to A14 according to an embodiment of the present invention.

Figure 25:
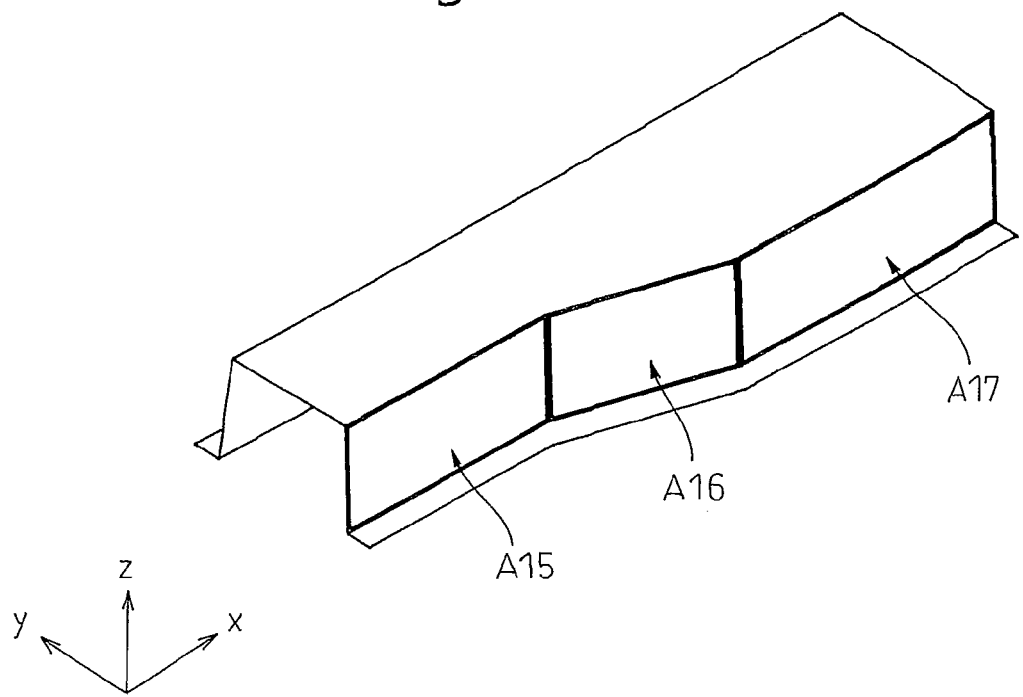
FIG. 25 is a perspective view showing identified regions A15 to A17 according to an embodiment of the present invention.

FIG. 25 is a perspective view showing identified regions A15 to A17 according to an embodiment of the present invention.

Figure 26:
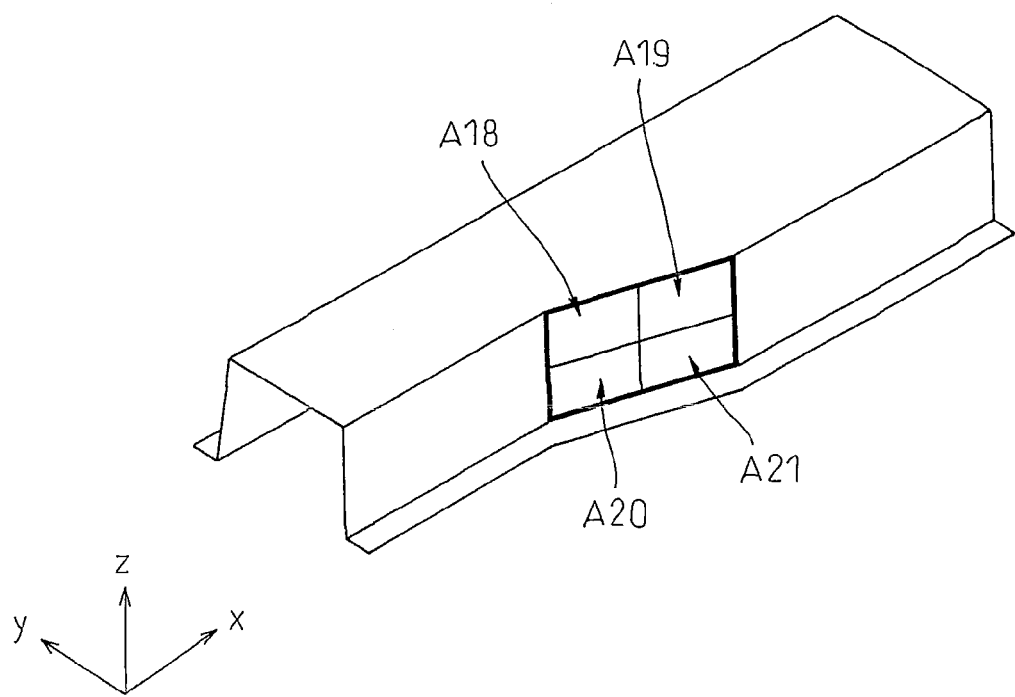
FIG. 26 is a perspective view showing identified regions A18 to A21 according to an embodiment of the present invention.

FIG. 26 is a perspective view showing identified regions A18 to A21 according to an embodiment of the present invention.

Figure 33:
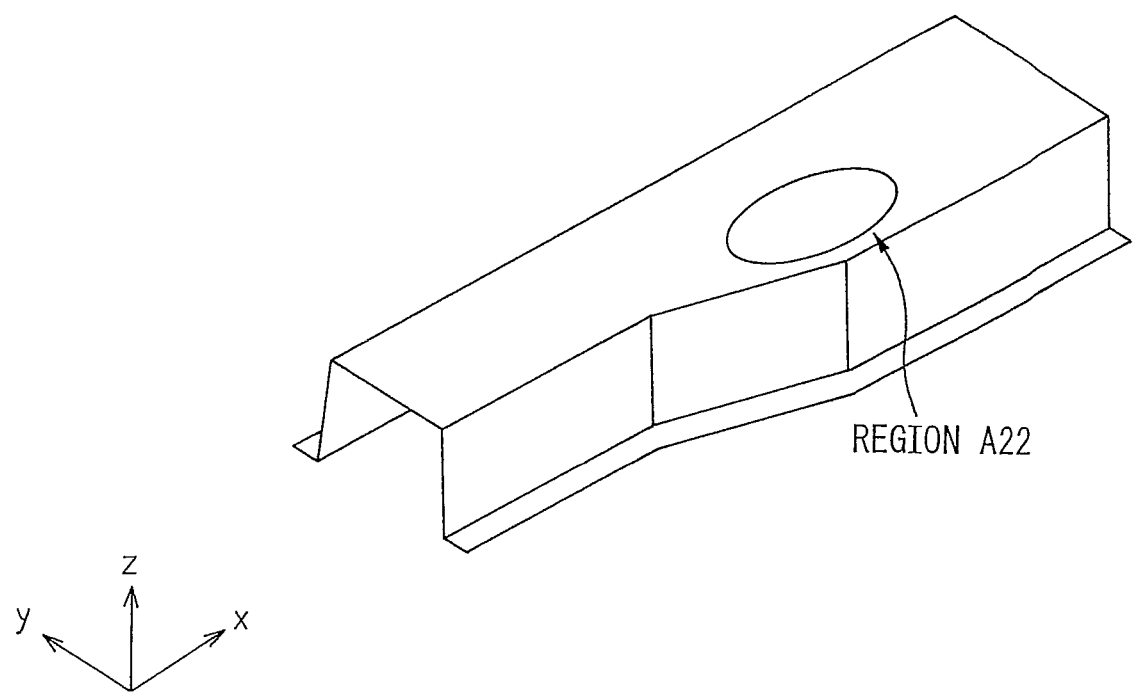
FIG. 33 is a perspective view showing an identified region A22 according to an embodiment of the present invention.

FIG. 33 is a perspective view showing an identified region A22 according to an embodiment of the present invention.

The results of changing the stress components and processing the springback for the identified regions A3 to A21 shown in FIG. 21 to 25 will be explained below.

The stress components before processing at the integration points of the selected region are made ($\sigma_{x0}$, $\sigma_{y0}$, $\sigma_{z0}$, $\tau_{xy0}$, $\tau_{yz0}$, $\tau_{zx0}$), the strain components are made ($\epsilon_{x0}$, $\epsilon_{y0}$, $\epsilon_{z0}$, $\gamma_{xy0}$, $\gamma_{yz0}$, $\gamma_{zx0}$), the stress components after processing are made ($\sigma_x$, $\sigma_y$, $\sigma_z$, $\tau_{xy}$, $\tau_{yz}$, $\tau_{zx}$) and the strain components are made ($\epsilon_x$, $\epsilon_y$, $\epsilon_z$, $\gamma_{xy}$, $\gamma_{yz}$, $\gamma_{zx}$).

The sheet thickness is made the value before processing used as it is, while the modulus of elasticity and the modulus of plasticity are made the input values of the press forming analyzer 11 used as they are. The processed stress and strain values are output as a processing result file.

Table 1 shows case studies for analysis of the relationship between the processed variables of identified regions and the torsion angle. Table 1 shows the identified regions and the variables for making changes in the processing.

TABLE 1

| Case study | Identified region | Processed variable |
|---|---|---|
| 1 | A3 | $\sigma x = 2 \times \sigma x0$ |
| 2 | A4 | $\sigma x = 2 \times \sigma x0$ |
|   | A5 | $\sigma x = 2 \times \sigma x0$ |
| 3 | A6, A9 | $\sigma x = \sigma x0 - 0.7[GPa]$ |
|   | A7, A8 | $\sigma x = \sigma x0 + 0.7[GPa]$ |
| 4 | A10 | $\sigma x = 0$, $\sigma y = 0$, $\sigma z = 0$, $\tau xy = 0$, $\tau yz = 0$, $\tau zx = 0$ |
|   | A11 | $\sigma x = 0$, $\sigma y = 0$, $\sigma z = 0$, $\tau xy = 0$, $\tau yz = 0$, $\tau zx = 0$ |
|   | A12 | $\sigma x = 0$, $\sigma y = 0$, $\sigma z = 0$, $\tau xy = 0$, $\tau yz = 0$, $\tau zx = 0$ |
|   | A13 | $\sigma x = 0$, $\sigma y = 0$, $\sigma z = 0$, $\tau xy = 0$, $\tau yz = 0$, $\tau zx = 0$ |
|   | A14 | $\sigma x = 0$, $\sigma y = 0$, $\sigma z = 0$, $\tau xy = 0$, $\tau yz = 0$, $\tau zx = 0$ |
| 5 | A15 | $\sigma x = 0$, $\sigma y = 0$, $\sigma z = 0$, $\tau xy = 0$, $\tau yz = 0$, $\tau zx = 0$ |
|   | A16 | $\sigma x = 0$, $\sigma y = 0$, $\sigma z = 0$, $\tau xy = 0$, $\tau yz = 0$, $\tau zx = 0$ |
|   | A17 | $\sigma x = 0$, $\sigma y = 0$, $\sigma z = 0$, $\tau xy = 0$, $\tau yz = 0$, $\tau zx = 0$ |
| 6 | A18 | $\sigma x = 0$, $\sigma y = 0$, $\sigma z = 0$, $\tau xy = 0$, $\tau yz = 0$, $\tau zx = 0$ |
|   | A19 | $\sigma x = 0$, $\sigma y = 0$, $\sigma z = 0$, $\tau xy = 0$, $\tau yz = 0$, $\tau zx = 0$ |
|   | A20 | $\sigma x = 0$, $\sigma y = 0$, $\sigma z = 0$, $\tau xy = 0$, $\tau yz = 0$, $\tau zx = 0$ |
|   | A21 | $\sigma x = 0$, $\sigma y = 0$, $\sigma z = 0$, $\tau xy = 0$, $\tau yz = 0$, $\tau zx = 0$ |
| 7 | A22 | (processing method 1)$\sigma x = 1.5[GPa]$ |
|   | A22 | (processing method 2)$\sigma x = -1.5[GPa]$ |
| 8 | A23 | $\sigma x = 0$, $\sigma y = 0$, $\sigma z = 0$, $\tau xy = 0$, $\tau yz = 0$, $\tau zx = 0$ |
|   | A24 | $\sigma x = 0$, $\sigma y = 0$, $\sigma z = 0$, $\tau xy = 0$, $\tau yz = 0$, $\tau zx = 0$ |

All of the elements belonging to each region were analyzed for springback using the processed variables obtained by the physical property value/physical property quantity processor 14.

The obtained results were processed by the post processing software to obtain the coordinate values of the points forming the cross-section of the positions A and B shown in FIG. 20 and find the angle θ formed by the webs of the cross-sections.

Figure 27:
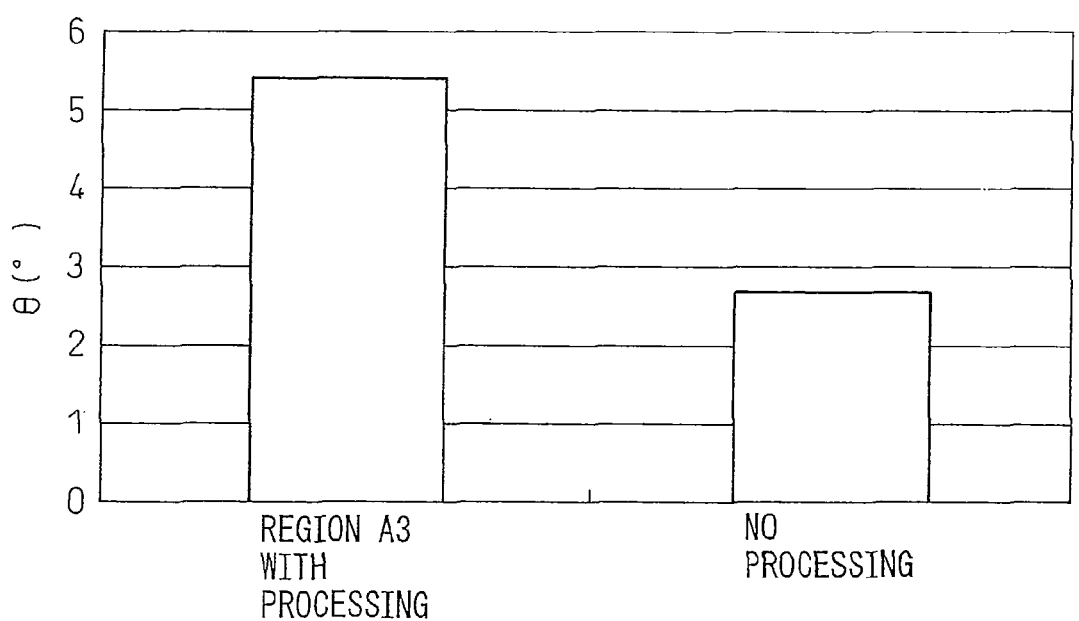
FIG. 27 is a view showing a torsion angle of an identified region A3 according to an embodiment of the present invention.

FIG. 27 is a view showing a torsion angle of the identified region A3 according to an embodiment of the present invention.

The result of processing the σx of the region A3 is larger in θ compared with the result of springback analysis in the case of not performing processing. Due to this, it is learned that the effect of the σx of the region A3 on the θ was large. From the results, it is learned that to make the amount of change of springback the threshold value or less, it is sufficient to change the value of σx of the region A3.

Figure 28:
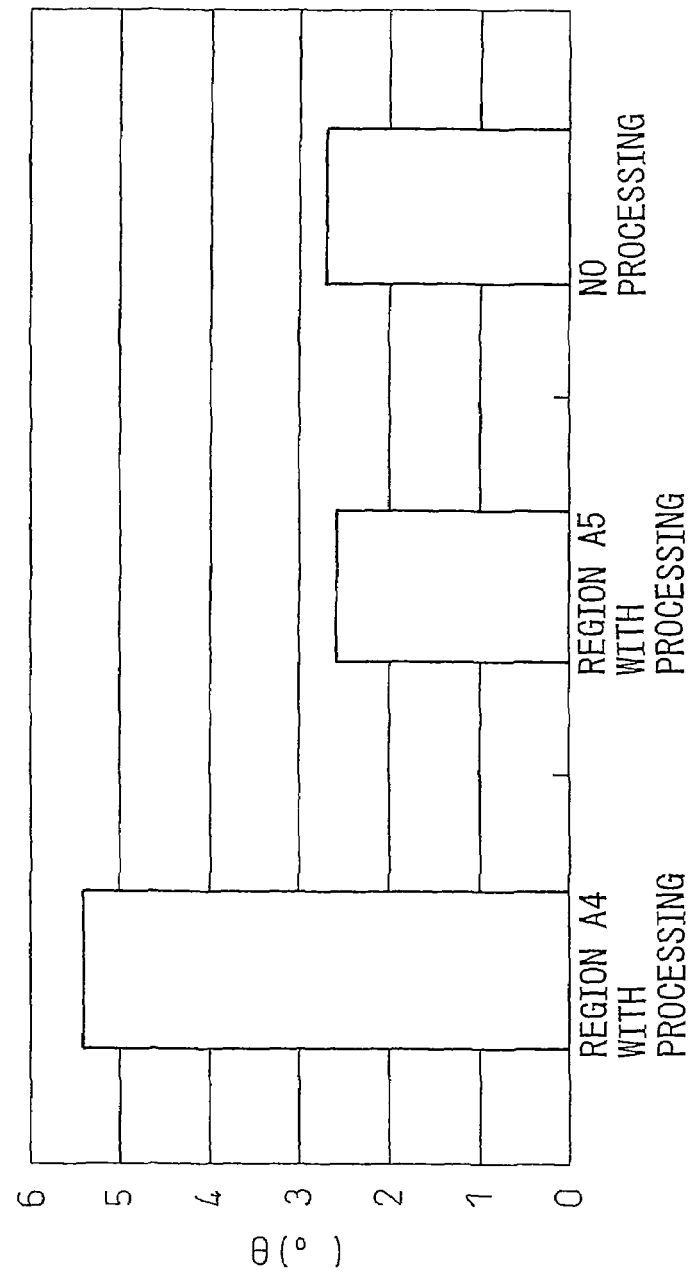
FIG. 28 is a view showing torsion angles of identified regions A4 and A5 according to an embodiment of the present invention.

FIG. 28 is a view showing the torsion angles of the identified regions A4 and A5 according to an embodiment of the present invention.

The result of processing of the region A4 is larger in θ compared with the result of processing of the region A5 and is larger in θ compared with the result of springback analysis in the case of not performing processing as well. Due to this, it is learned that the σx of the region A4 has a larger effect on θ compared with the σx of the region A5. From this result, it is learned that to make the amount of change of springback the threshold value or less, it is sufficient to change the value of σx of the region A4 from the region A5.

Figure 29:
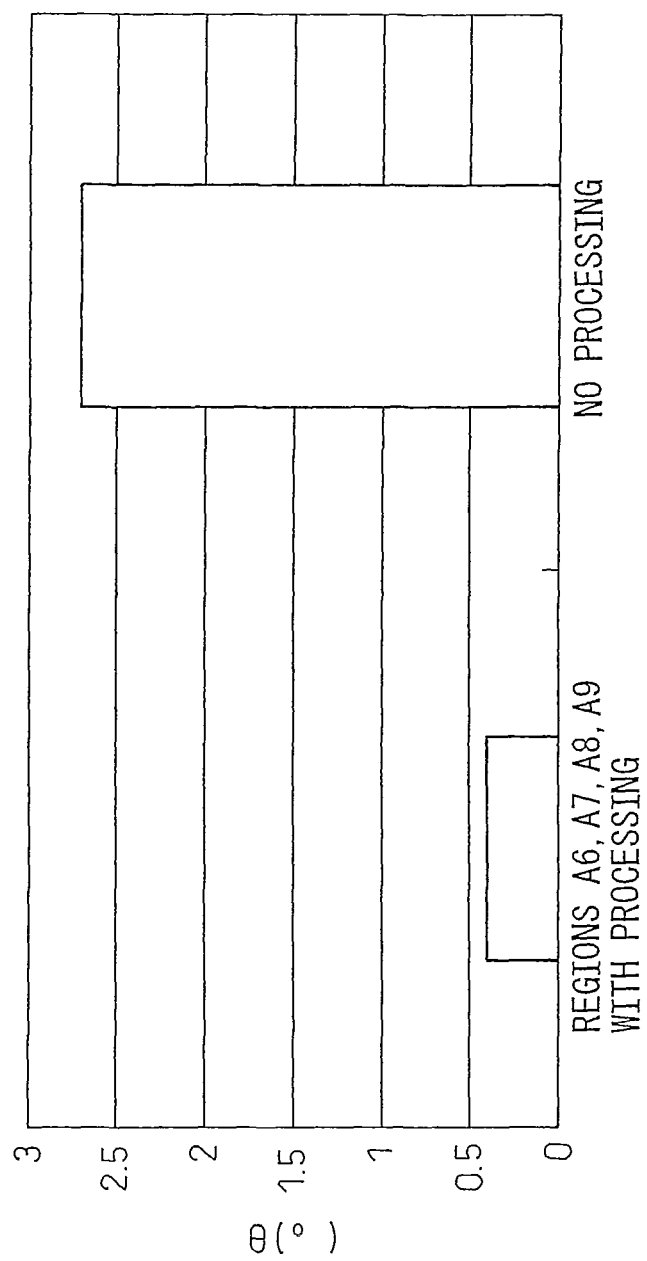
FIG. 29 is a view showing torsion angles of identified regions A6 to A9 according to an embodiment of the present invention.

FIG. 29 is a view showing the torsion angles of the identified regions A6 and A9 according to an embodiment of the present invention.

The results of processing the regions A6, A7, A8, and A9 were smaller in θ and closer to 0 compared with the results of springback analysis in the case of not performing processing. Due to this, it is learned that the effect of the stress σx of the regions A6, A7, A8, and A9 on the θ was large.

Figure 30:
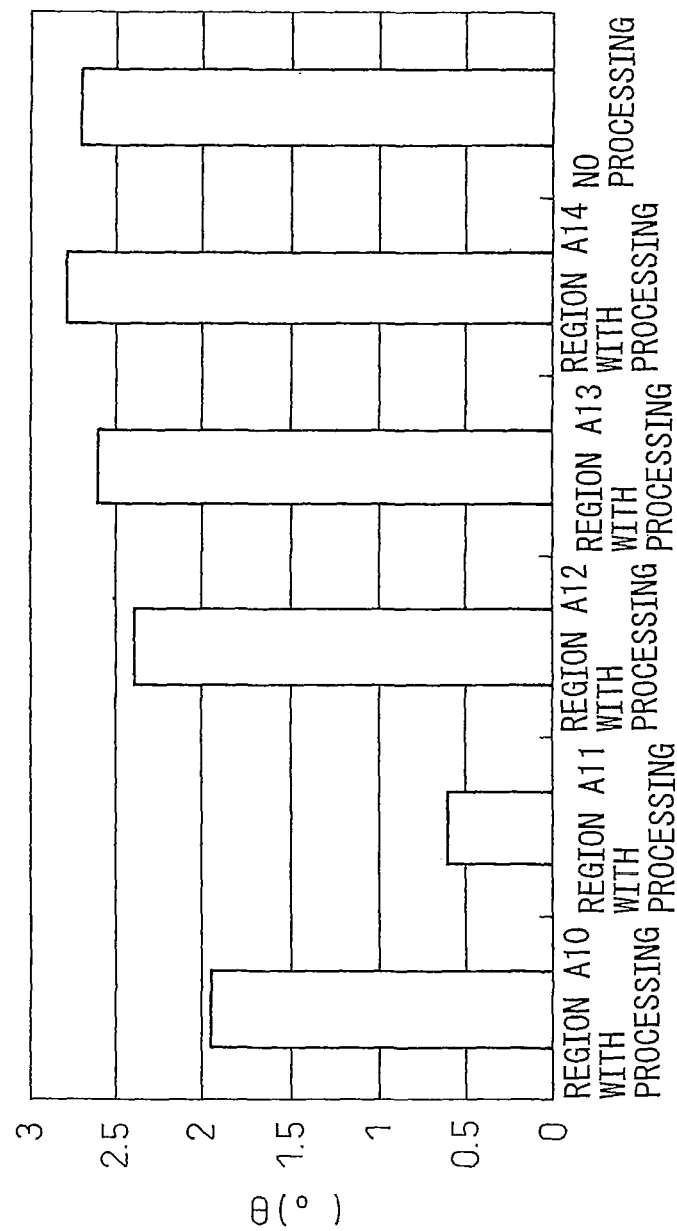
FIG. 30 is a view showing torsion angles of identified regions A10 to A14 according to an embodiment of the present invention.

FIG. 30 is a view showing the torsion angles of the identified regions A10 and A14 according to an embodiment of the present invention. From this, among the results of processing of the regions A10 to A14, in the case of processing the region A11, the θ becomes the smallest compared with the results of springback analysis in the case of not performing processing. From this, it is learned that the effect of the stress of the region A11 on θ is large.

Figure 31:
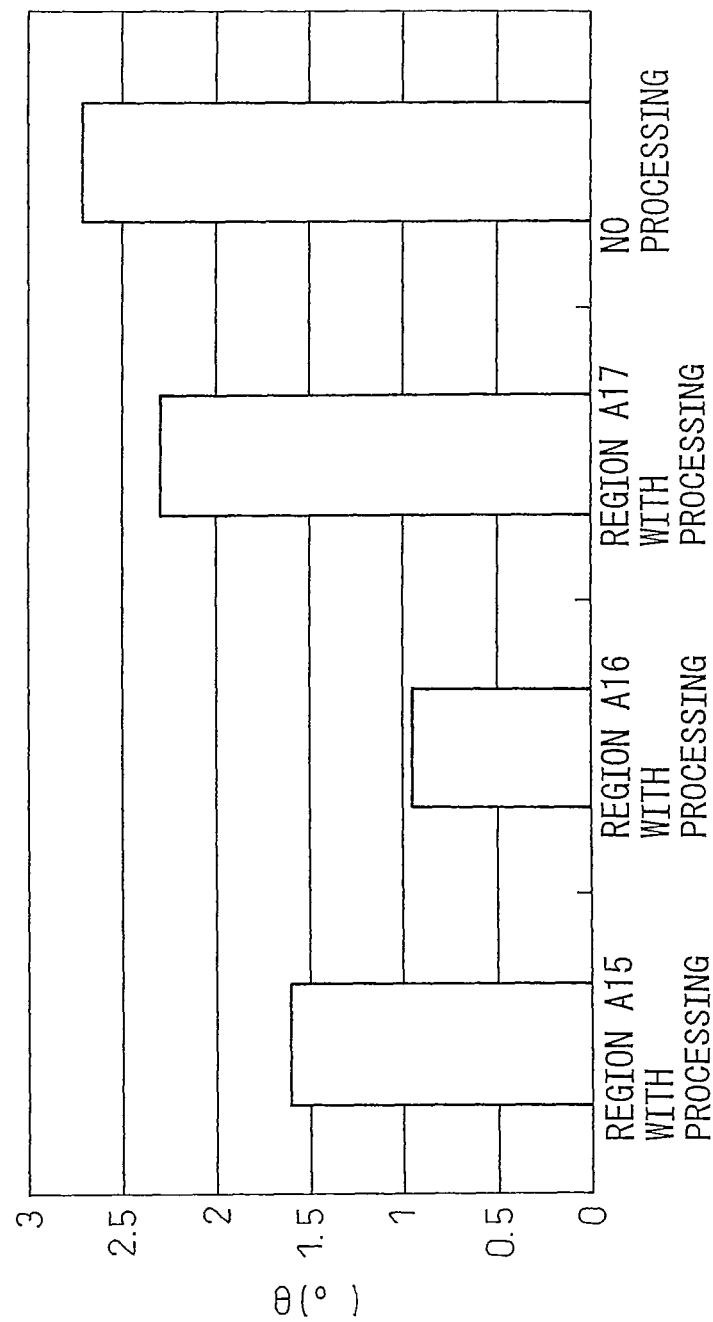
FIG. 31 is a view showing torsion angles of identified regions A15 to A17 according to an embodiment of the present invention.

FIG. 31 is a view showing the torsion angles of the identified regions A15 and A17 according to an embodiment of the present invention. From this, among the results of processing of the regions A15 to A17, in the case of processing the region A16, the θ becomes the smallest compared with the results of springback analysis in the case of not performing processing. From this, it is learned that the effect of the stress of the region A16 on θ is large.

Figure 32:
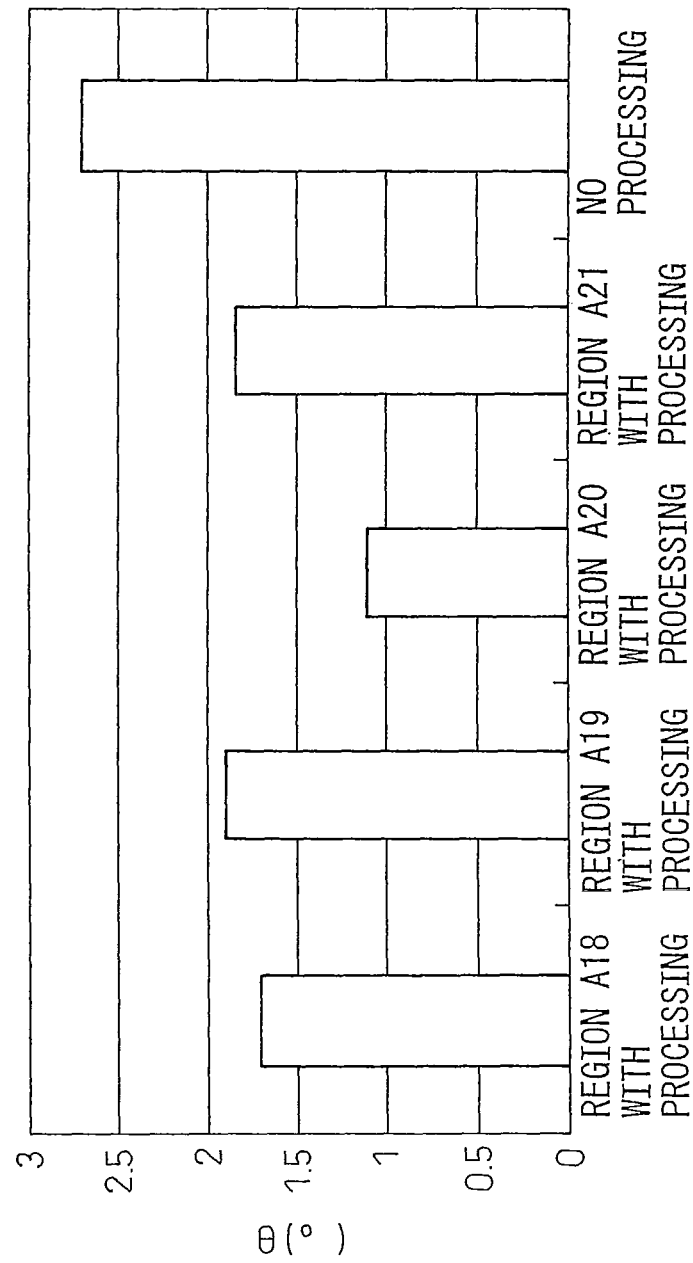
FIG. 32 is a view showing torsion angles of identified regions A18 to A21 according to an embodiment of the present invention.

FIG. 32 is a view showing the torsion angles of the identified regions A18 and A21 according to an embodiment of the present invention. The region A16 was divided into the regions A18, A19, A20, A21 and each divided region was analyzed for springback. From this, among the results of processing of the regions A18 to A21, in the case of processing the region A20, the θ becomes the smallest compared with the results of springback analysis in the case of not performing processing. Due to this, it is learned that the stress of the region A20 has a large effect on the θ. In this way, by identifying a region with a large degree of effect in the large area, dividing the regions and performing processing in that range, and investigating the degree of effect, it is possible to efficiently identify the cause of occurrence of springback.

Figure 34:
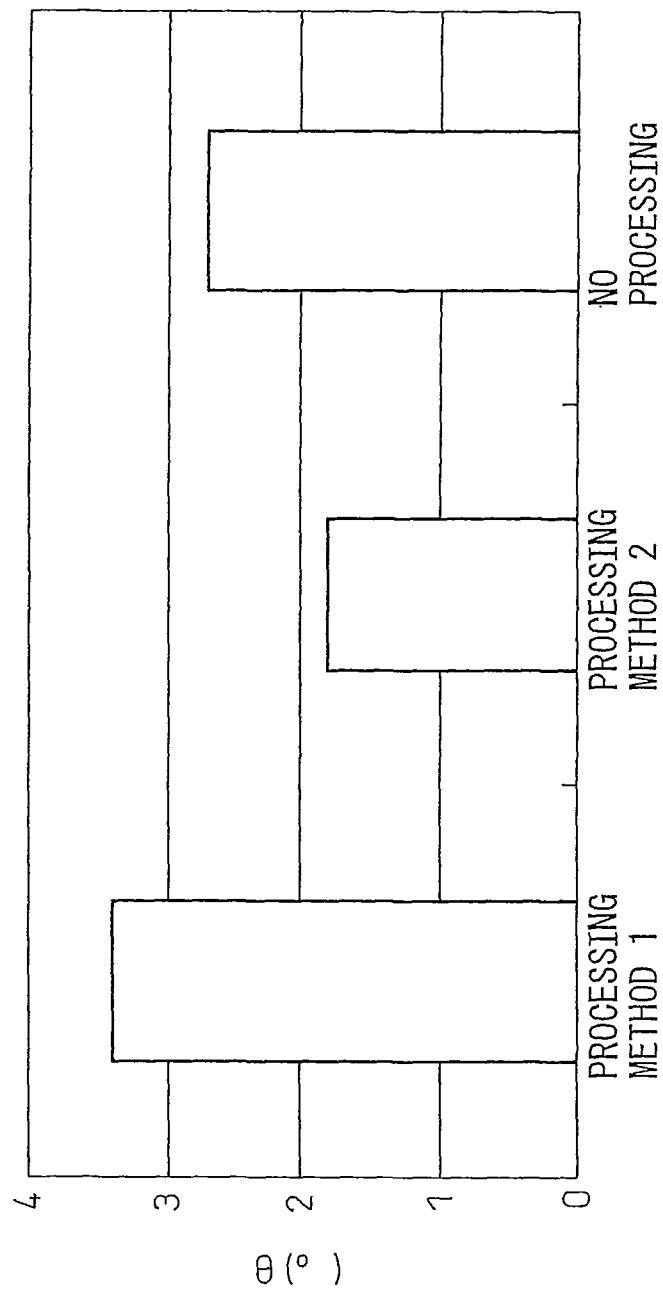
FIG. 34 is a view showing torsion angles in the case of changing a method of computation of an identified region A22 according to an embodiment of the present invention.

FIG. 34 is a view showing the torsion angles when changing the method of computation of the identified region A22 according to an embodiment of the present invention. Due to this, in the case of the processing method 2, the θ becomes the smallest compared with the results of springback analysis in the case of not performing processing or the case of the processing method 1. Due to this, it is learned that θ can be reduced by making the stress distribution approach the σx substituted by the processing method 2 for the selected region A22.

Figure 35:
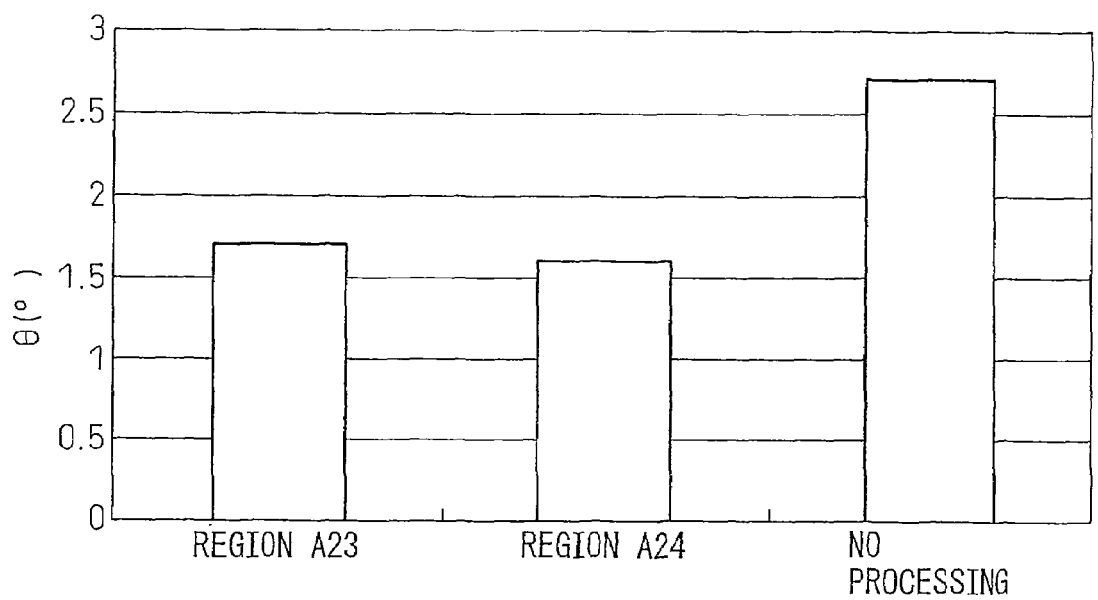
FIG. 35 is a view showing torsion angles of identified regions A23 to A24 according to an embodiment of the present invention, FIGS. 36($a$), ($b$) are views showing a cross-sectional position and amount of opening of a hat bent part according to an embodiment of the present invention.

FIG. 35 is a view showing the torsion angles of the identified regions A23 and A24 according to an embodiment of the present invention. Here, the regions A23 and A24 are made ones designated for the different integration points in the sheet thickness direction. Here, this was studied by analysis using five integration points. The integration points were numbered 1 to 5 in order from the inside surface (punch side) to the outside surface (die side). In the region A11, all of the integration points other than the integration point 3 at the center plane in the sheet thickness direction (integration points 1, 2, 4, 5) were made the region A23. Further, in the region A11, the integration point 3 at the center plane in the sheet thickness direction was made the region A24. According to the results of FIG. 35, the results of springback analysis at the region A23 and the region A24 become substantially equal. The effects of the integration points (1, 2, 4, 5) other than the center plane in the sheet thickness direction and the integration point 3 of the center plane in the sheet thickness direction are substantially equal. In this way, by designating a region for each integration point in the sheet thickness direction, it is possible to investigate the degree of effect separated into the effect of the bending stress in the sheet thickness direction (front-rear) and the effect of the stress in the plane of the center plane in the sheet thickness direction.

Example 2

FIG. 36 gives views showing a part of a hat-formed cross-section covered by springback analysis according to an embodiment of the present invention, wherein (a) is a perspective view and (b) is a cross-sectional view of the same. The hat formed cross-section is a symmetric left-right form. The width of the punch used was made 80 mm, the forming height was made 80 mm, and the width of the workpiece was made 100 mm.

For the numerical analysis performed by the press forming analyzer 11 and springback analyzer 12, the existing plate forming simulation analysis software PAM-STAMP based on the finite element method was used. For the springback analysis, elastic analysis based on the static implicit method was used.

The forming conditions used were data of high strength steel sheet having, as properties of the metal plate, a sheet thickness of 1.6 mm and a tensile strength of the 780 MPa class. Further, considering the hat cross-section symmetrical form, the analysis was conducted under symmetric conditions for half of the region as shown in FIG. 27(b). Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input and a blank holding force of 10 tons was set.

The obtained results were processed by the post processing software to obtain the coordinate values before and after springback analysis of the point of the position shown in FIG. 36(b) to find the cross-sectional opening amount Δd. The "springback value" here means the opening amount Δd.

Table 2 shows cases studies for analysis of the relationship between processed values of identified regions and the opening amounts. Table 2 shows the identified regions and the variables changed in the processing.

TABLE 2

| Case study | Identified region | Processed variable |
|---|---|---|
| 9 | All elements | $\sigma_x = 5 \times \sigma_{x0}$, $\sigma_y = 5 \times \sigma_{y0}$, $\sigma_z = 5 \times \sigma_{z0}$, $\tau_{xy} = 5 \times \tau_{xy0}$, $\tau_{yz} = 5 \times \tau_{yz0}$, $\tau_{zx} = 5 \times \tau_{zx0}$ |
| 10 | Integration point 5 of all elements | $\sigma_x = 5 \times \sigma_{x0}$, $\sigma_y = 5 \times \sigma_{y0}$, $\sigma_z = 5 \times \sigma_{z0}$, $\tau_{xy} = 5 \times \tau_{xy0}$, $\tau_{yz} = 5 \times \tau_{yz0}$, $\tau_{zx} = 5 \times \tau_{zx0}$ |

In Case 9, the single element with the smallest first element no. was used as the identified region, the stress components were changed by processing, and springback analysis was performed. The same analysis was repeated in the order of the smallest element nos. to analyze all elements.

In Case 10, the integration point 5 of the single element with the smallest first element no. was used as the identified region, the stress components were changed by processing, and springback analysis was performed. The same analysis was repeated in the order of the smallest element nos. to analyze the integration points 5 of all elements.

The stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon_x$, $\epsilon_y$, $\epsilon_z$, $\gamma_{xy}$, $\gamma_{yz}$, $\gamma_{zx}$).

The sheet thickness was the value before processing used as it is, while the modulus of elasticity and modulus of plasticity were the input values of the press forming analyzer 11 used as they are. The processed stress or strain values were output as a processing result file.

All elements belonging to each region were analyzed for springback using the processed variables obtained by the physical property value/physical property quantity processor 14.

Figure 37:
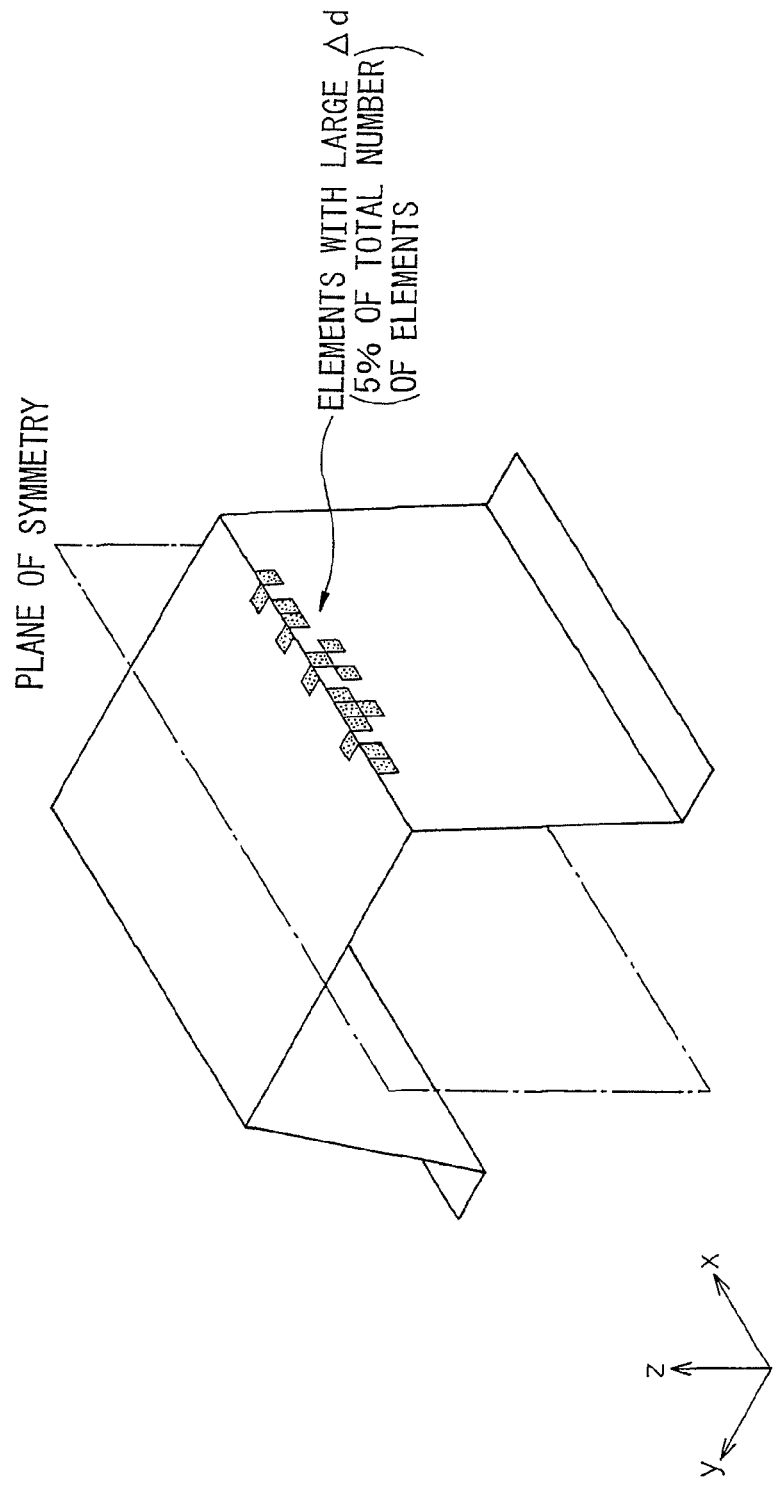
FIG. 37 is a view showing results of a case study 9 according to an embodiment of the present invention.

FIG. 37 displays the elements of 5% of the total number of elements in the order of the larger Δd in the opening amounts Δd of all elements obtained in case study 9 according to an embodiment of the present invention. Due to this, it was learned that the elements greatly affecting the Δd are concentrated in the regions near the punch shoulder R.

Figure 38:
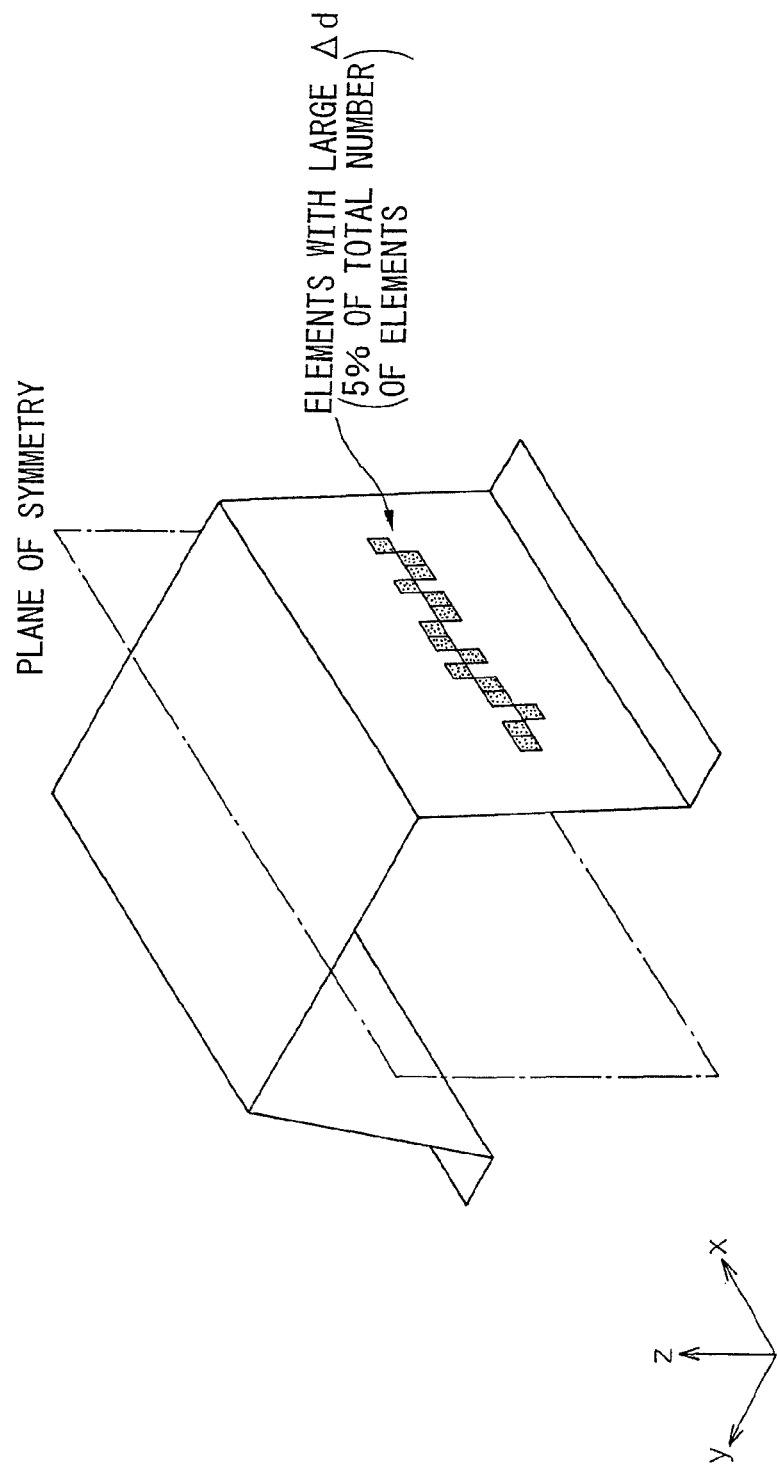
FIG. 38 is a view showing results of a case study 10 according to an embodiment of the present invention, FIG. 39 gives a perspective view and cross-sectional view showing a part of a hat-formed cross-section according to an embodiment of the present invention, FIG. 40 gives views showing cross-sectional positions and a torsion angle of a part of a hat-formed cross-section according to an embodiment of the present invention.

FIG. 38 displays the elements of 5% of the total number of elements in the order of the larger Δd in the opening amounts Δd of all elements obtained in case study 10 according to an embodiment of the present invention. Due to this, it was learned that the elements having the integration points 5 greatly affecting the Δd are concentrated in the regions near the center of the vertical wall.

Example 3

FIG. 39 gives views showing a part of a hat-formed cross-section covered by springback analysis according to an embodiment of the present invention, wherein (a) is a perspective view and (b) is a cross-sectional view of the same. This is comprised of a web W0, side walls W1, W2, and flanges F1, F2.

For the numerical analysis performed by the press forming analyzer 11 and springback analyzer 12, the existing plating forming simulation analysis software PAM-STAMP based on the finite element method was used. For the springback analysis, elastic analysis based on the static implicit method was used.

The forming conditions used were data of high strength steel sheet having, as properties of the metal plate, a sheet thickness of 1.6 mm and a tensile strength of the 780 MPa class. Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input and a blank holding force of 600 kN was set.

FIG. 40 gives views showing the cross-sectional positions and torsion angle of a part of a hat-formed cross-section, wherein (a) is a perspective view and (b) is a cross-sectional view of the same.

The obtained results were processed by the post processing software to obtain the coordinate values of the points forming the cross-section of the positions A and B shown in FIG. 40(*a*) and find the angle θ formed by the webs of the cross-sections. The "springback value" here is made the angle θ.

Figure 41:
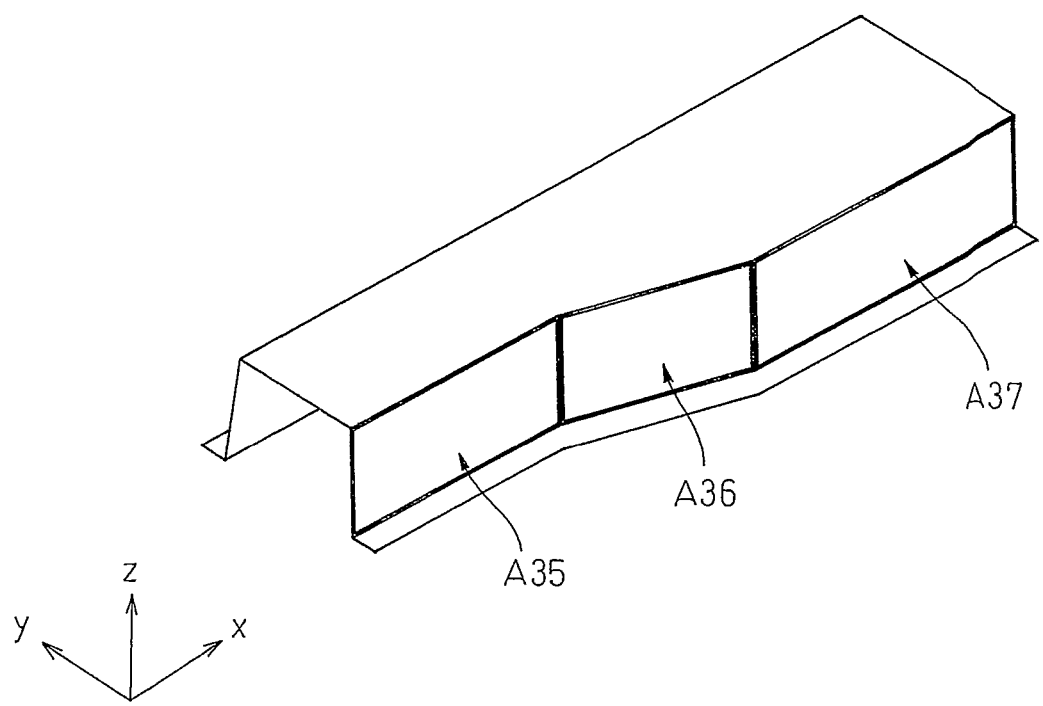
FIG. 41 is a view showing identified regions A35 to A37 according to an embodiment of the present invention.

In the step of determination of the identified location, the regions for processing were selected and divided based on the curvature from the finite element data of the workpiece. By using a curvature calculation program to read the element information and node coordinate values of the workpiece from the results of press forming analysis, calculating the curvature of the workpiece, and displaying blank the elements with a curvature of 0.01 or more, the workpiece was divided into the regions of the flanges, web, and vertical walls. Further, the vertical wall with the step difference was divided into the three regions A35 to A37 as shown in FIG. 41. If viewing the stress levels of the regions after press forming, the stress level of the vertical wall with the step difference is high, so the regions A35 to A37 shown in FIG. 41 were judged and selected for processing.

In the processing process, the file at which the stress or strain obtained from the forming analysis is output is fetched by the processing program having a file input means. Each of the regions A35 to A37 shown in FIG. 41 was processed as follows for the integration points of the elements belonging to the region:

$\sigma_x=0$, $\sigma_y=0$, $\sigma_z=0$, $\tau_{xy}=0$, $\tau_{yz}=0$, $\tau_{zx}=0$
$\epsilon_x=\epsilon_{x0}$, $\epsilon_y=\epsilon_{y0}$, $\epsilon_z=\epsilon_{z0}$, $\gamma_{xy}=\gamma_{xy0}$, $\gamma_{yz}=\gamma_{yz0}$, $\gamma_{zx}=\gamma_{zx0}$ Here, the stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon x$, $\epsilon_y$, $\epsilon_z$, $\gamma_{xy}$, $\gamma_{yz}$, $\gamma_{zx}$). The sheet thickness was made the value before processing used as it is, while the modulus of elasticity and the modulus of plasticity were made the values input at the process of i) used as they are. The processed stress and strain values were output as processing result files by the file output means.

In the springback analysis step, the processing result file obtained by the processing process is input to the existing plating forming simulation analysis software PAM-STAMP for the springback analysis. For the springback analysis, elastic analysis by the static implicit method was used. The processing and springback analysis at the regions were repeated while dividing the regions. The obtained results were processed by the post processing software to obtain the coordinate values of the points forming the cross-section of the positions A and B shown in FIG. 40 and find the torsion angle θ formed by the webs of the cross-sections at the positions A and B as the springback value.

Figure 42:
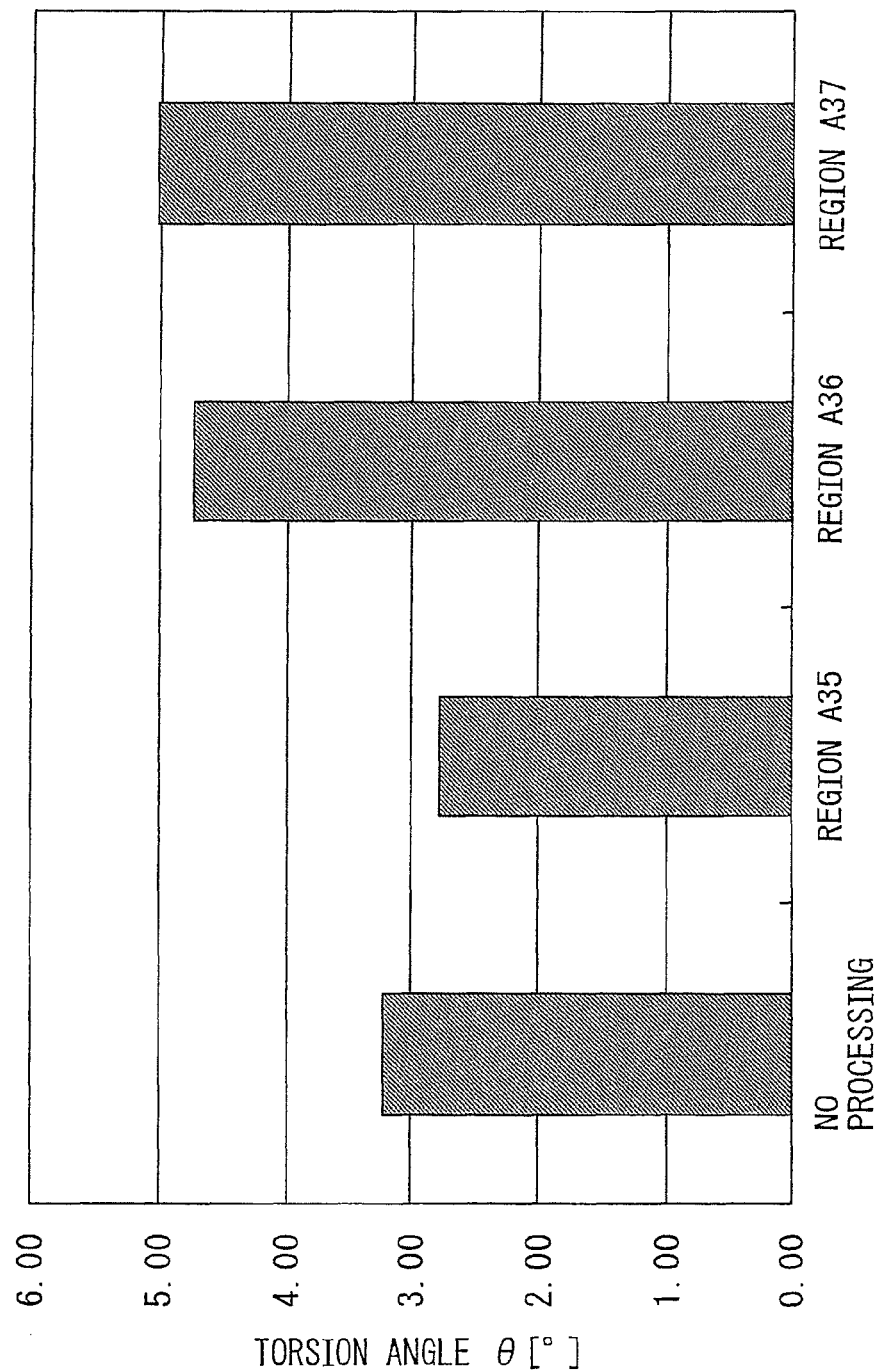
FIG. 42 is a view showing torsion angles of identified regions A35 to A37 (all integration points) according to an embodiment of the present invention.

FIG. 42 shows the results of the torsion angle θ obtained by evaluating the results of springback analysis. Due to this, the torsion angle θ becomes smallest when not performing the processing and when processing the region A35 in the results of processing the regions A35 to A37. From this, it is learned that the effect of the stress of the region A35 on the torsion angle θ is large.

Example 4

Except for the processing, the same calculation as in Example 3 was performed. In the processing process, a file to which the stress or strain obtained from the forming analysis was output was fetched by a processing program having a file input means. The regions A35 to A37 shown in FIG. 41 were processed as follows by the processing means at the frontmost and rearmost integration points of the sheet thickness direction of the elements belonging to the region for each region:

$\sigma_x=0$, $\sigma_y=0$, $\sigma_z=0$, $\tau_{xy}=0$, $\tau_{yz}=0$, $\tau_{zx}=0$
$\epsilon_x=\epsilon_{x0}$, $\epsilon_y=\epsilon_{y0}$, $\epsilon_z=\epsilon_{z0}$, $\gamma_{xy}=\gamma_{xy0}$, $\gamma_{yz}=\gamma_{yz0}$, $\gamma_{zx}=\gamma_{zx0}$ Here, the stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon x$, $\epsilon_y$, $\epsilon_z$, $\gamma_{xy}$, $\gamma_{yz}$, $\gamma_{zx}$). The sheet thickness was made the value before processing used as it is, while the modulus of elasticity and the modulus of plasticity were made the values input at the process of i) as they are. The processed stress and strain values were output as processing result files by the file output means.

Figure 43:
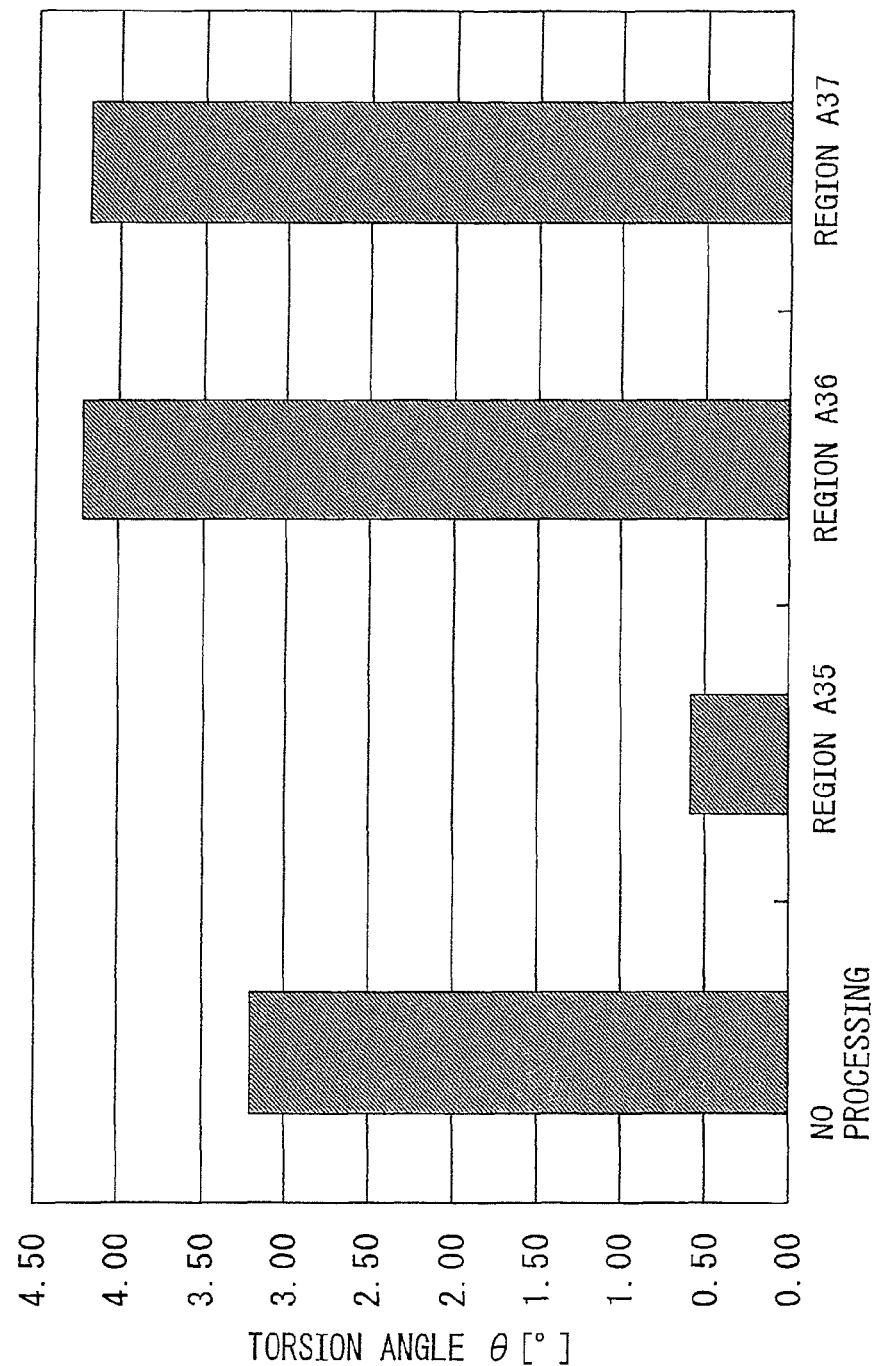
FIG. 43 is a view showing torsion angles of identified regions A35 to A37 (frontmost and rearmost integration points in sheet thickness direction) according to an embodiment of the present invention, FIG. 44 gives a perspective view and cross-sectional view showing an example of a workpiece according to an embodiment of the present invention.

FIG. 43 shows the results of the torsion angle (frontmost and rearmost integration points in sheet thickness direction) θ obtained by evaluation of the cross-section of the results of the springback analysis. The torsion angle θ becomes smaller in the case of not performing processing and the case of processing the region A35 in the results of processing the regions A35 to A37. From this, it is learned that the effect of the stress of the region A35 on the torsion angle θ is large.

Example 5

Figure 44:
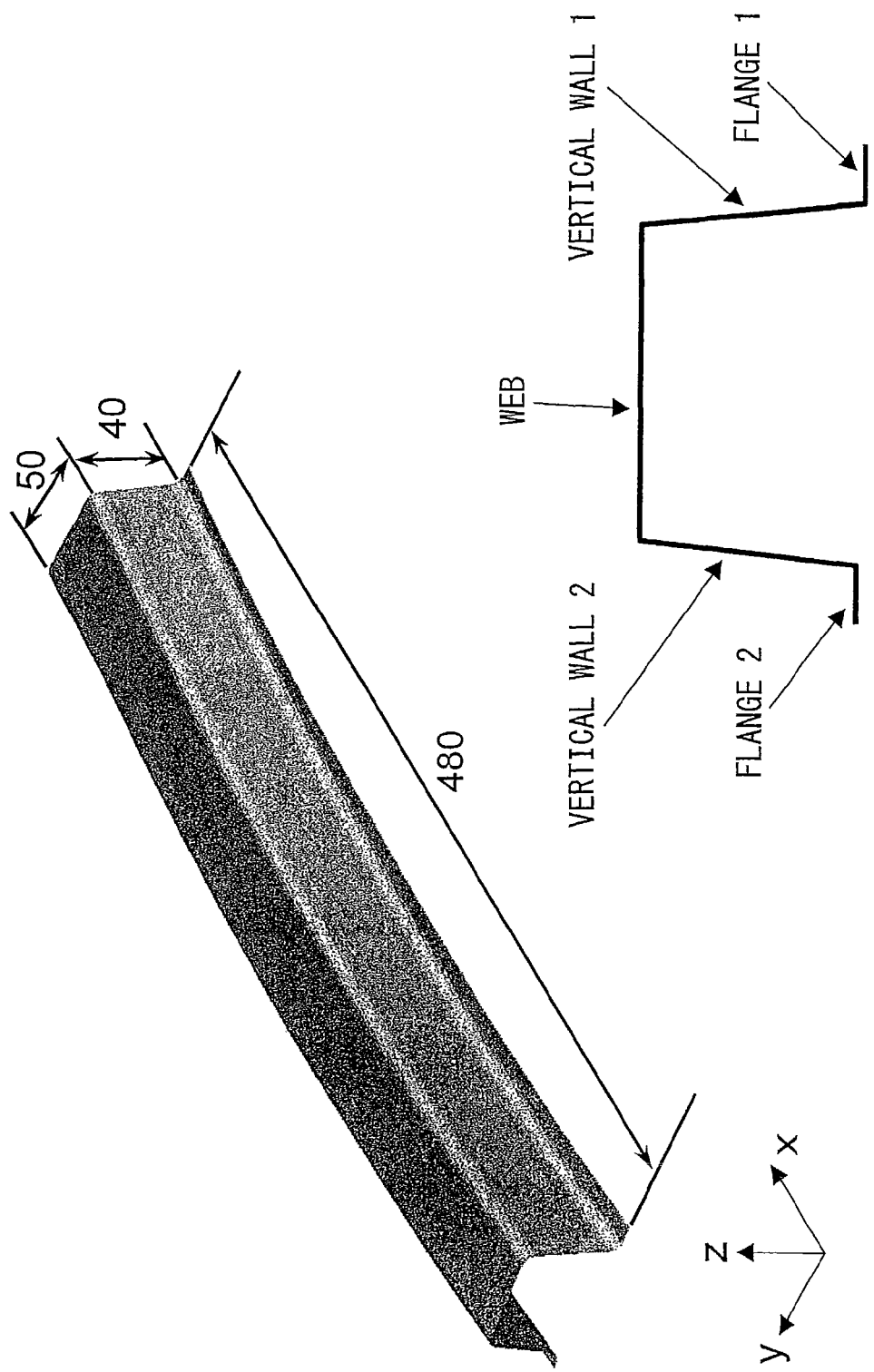

FIG. 44 is a perspective view and cross-sectional view showing an example of a press formed part, that is, a workpiece, according to an embodiment of the present invention. As shown in FIG. 44, the workpiece covered by the analysis is a part of a hat-formed cross-section.

First, as press forming analysis, the existing plating forming simulation analysis software LS-DYNA based on the finite element method was used for analysis. Data of high strength steel sheet having, as properties of the metal plate, a sheet thickness of 1.4 mm and a tensile strength of the 590 MPa class was used. Further, the form of the tooling (die, punch, holder) was modeled by shell elements and analyzed assuming a rigid body. The tooling clearance was made 0 mm. A frictional coefficient of 0.1 was input, while a forming load of 1400 kN was set.

The program for running the physical property value/physical property quantity processing fetches the file to which the stress or strain obtained from the press forming analysis is output as the input information and divides the workpiece into regions for processing.

Figure 45:
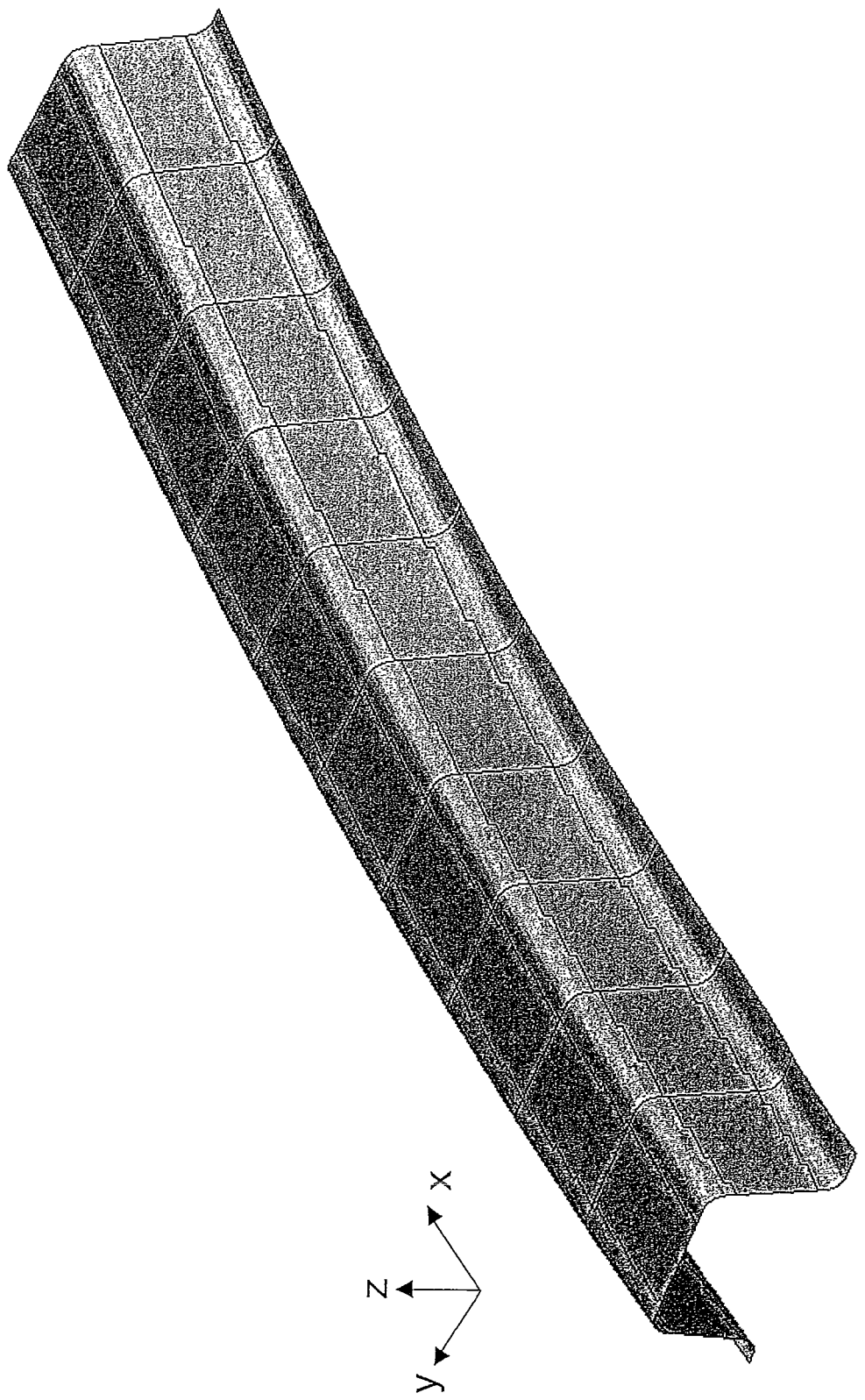
FIG. 45 is a perspective view showing an example of division into regions of a workpiece according to an embodiment of the present invention, FIG. 46 gives a perspective view and cross-sectional view showing a cross-sectional position and noted point of a workpiece according to an embodiment of the present invention.

FIG. 45 is a perspective view showing the divided regions in the case of dividing a workpiece shown in FIG. 44 into 10 equal parts in the X-direction and by a fixed curvature in the Y- and Z-directions according to an embodiment of the present invention. Here, all of the integration points of the elements belonging to each region were processed as follows by a processing means:

$\sigma_x=0$, $\sigma_y=0$, $\sigma_z=0$, $\tau_{xy}=0$, $\tau_{yz}=0$, $\tau_{zx}=0$
$\epsilon_x=\epsilon_{x0}$, $\epsilon_y=\epsilon_{y0}$, $\epsilon_z=\epsilon_{z0}$, $\gamma_{xy}=\gamma_{xy0}$, $\gamma_{yz}=\gamma_{yz0}$, $\gamma_{zx}=\gamma_{zx0}$ Here, the stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon_x$, $\epsilon_y$, $\epsilon_z$, $\gamma_{xy}$, $\gamma_{yz}$, $\gamma_{zx}$). The sheet thickness was made the value before processing used as is, while the modulus of elasticity and the modulus of plasticity were made the values input to the software LS-DYNA in the press analysis used as they are. The processed stress and strain values were output as processing result files by the file output means.

As the springback analysis processing, the above-mentioned software LS-DYNA was used. The results of output of the physical property value/physical property quantity processing execution program were input to the software LS-DYNA for springback analysis. For the springback analysis, elastic analysis based on the static implicit method was used. The processing and springback analysis at each region were repeated while dividing the regions.

Figure 46:
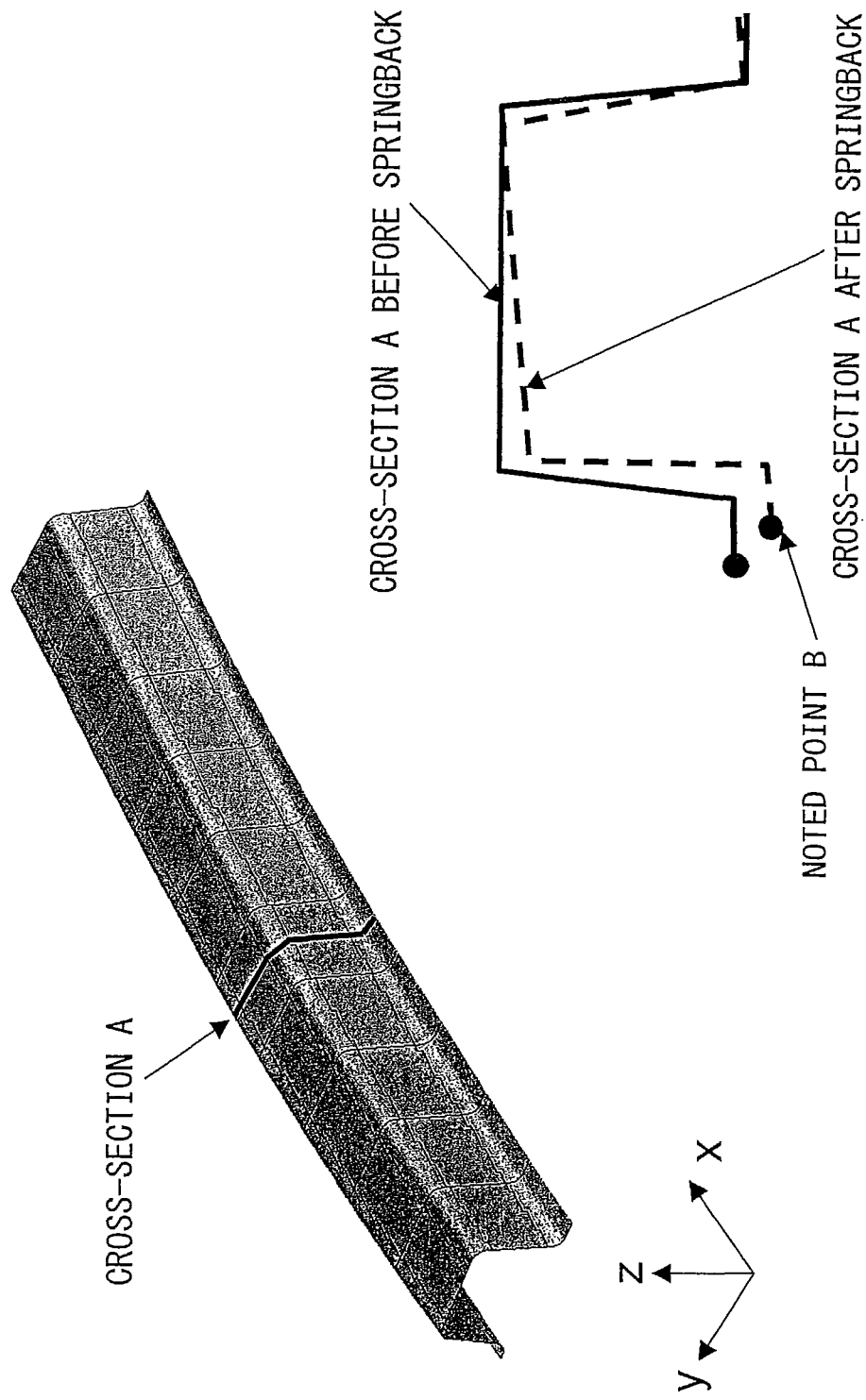
Figure 47:
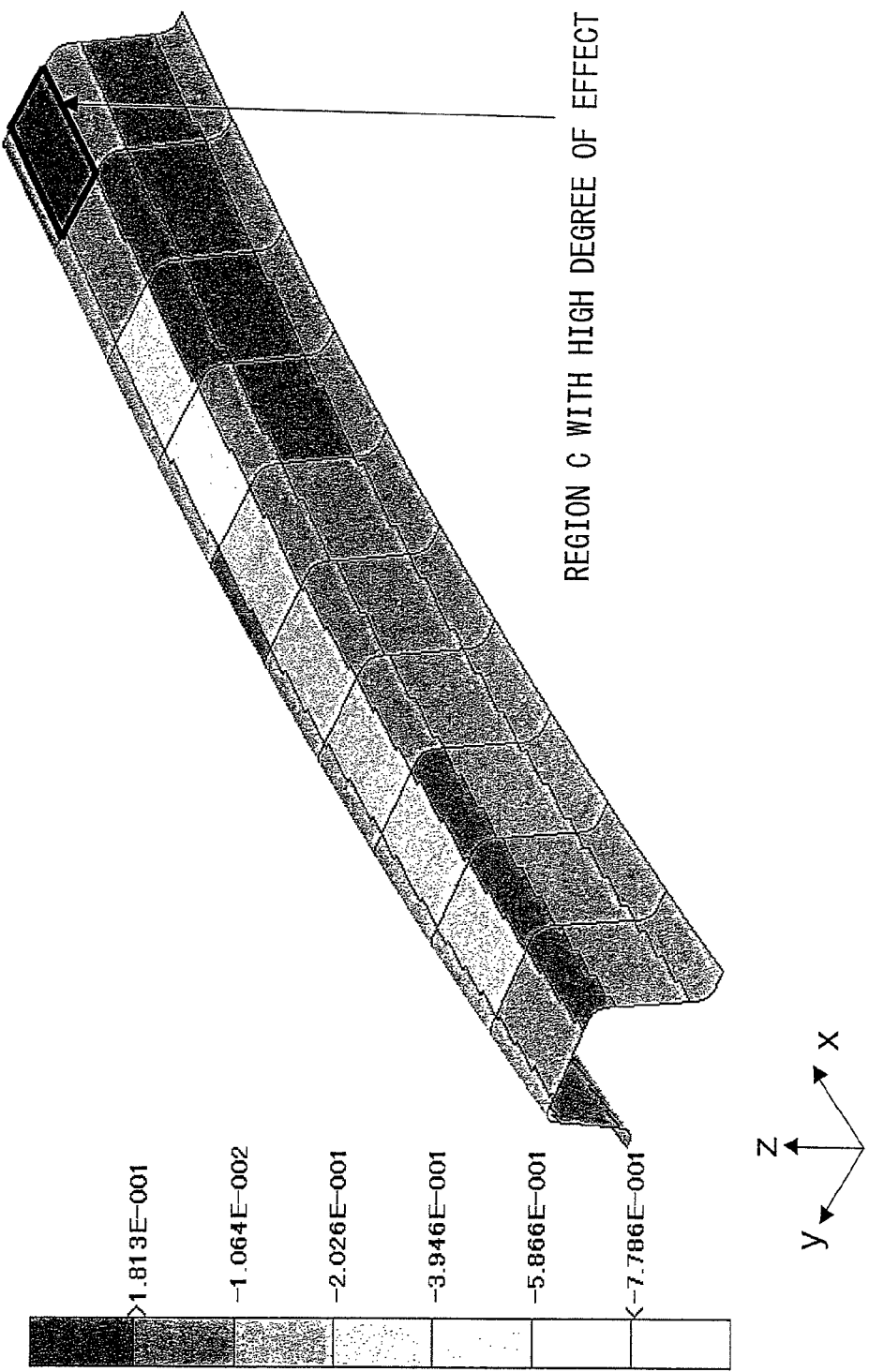
FIG. 47 is a perspective view showing an example showing by a contour diagram a springback value at each region of a workpiece according to an embodiment of the present invention.

FIG. 46 is a view showing the cross-section A before and after springback and the Z-direction displacement of the point being noted B, that is, the springback value, according to an embodiment of the present invention. FIG. 47 is a contour diagram showing the springback value at each region processed according to an embodiment of the present invention. This contour diagram was obtained by post processing software LS-PREPOST by the output data of the software LS-DYNA. From FIG. 47, the region C with the large springback value could be identified as the location of the cause of occurrence of springback.

Example 6

The part covered was made a part of a hat-formed cross-section of the form and dimensions shown in FIG. 44.

First, for the press forming analysis, the above-mentioned software LS-DYNA was used. Data of high strength steel sheet having, as properties of the metal plate, a sheet thickness of 1.4 mm and a tensile strength of the 590 MPa class was used. Further, the form of the tooling (die, punch, holder) was modeled by shell elements and analyzed assuming a rigid body. The tooling clearance was made 0 mm. A frictional coefficient of 0.1 was input. As the forming load, 1400 kN was set.

The program for executing the physical property value/physical property quantity processing fetches a file to which the stress or strain obtained from press forming analysis was output as the input information and divides the workpiece into regions for processing. The workpiece was divided into the regions shown in FIG. 45 and all integration points of the elements belonging to the regions were processed as follows by a processing means:

$\sigma_x=0$, $\sigma_y=0$, $\sigma_z=0$, $\tau_{xy}=0$, $\tau_{yz}=0$, $\tau_{zx}=0$ $\epsilon_x=\epsilon_{x0}$, $\epsilon_y=\epsilon_{y0}$, $\epsilon_z=\epsilon_{z0}$, $\gamma_{xy}=\gamma_{xy0}$, $\gamma_{yz}=\gamma_{yz0}$, $\gamma_{zx}=\gamma_{zx0}$ Here, the stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon_x$, $\epsilon_y$, $\epsilon_z$, $\gamma_{xy}$, $\gamma_{yz}$, $\gamma_{zx}$). The sheet thickness was made the value before processing as it is, while the modulus of elasticity and modulus of plasticity were made the values input by the software LS-DYNA as press forming analysis. The processed stress and strain values were output as processing result files by the file output means.

In the springback analysis, the processing result file obtained by the physical property value/physical property quantity processing execution program was input to the software LS-DYNA again for springback analysis. For the springback analysis, elastic analysis by the static implicit method was used.

Here, the processing by the physical property value/physical property quantity processing program and the springback analysis by the software LS-DYNA were repeated for each region.

Figure 48:
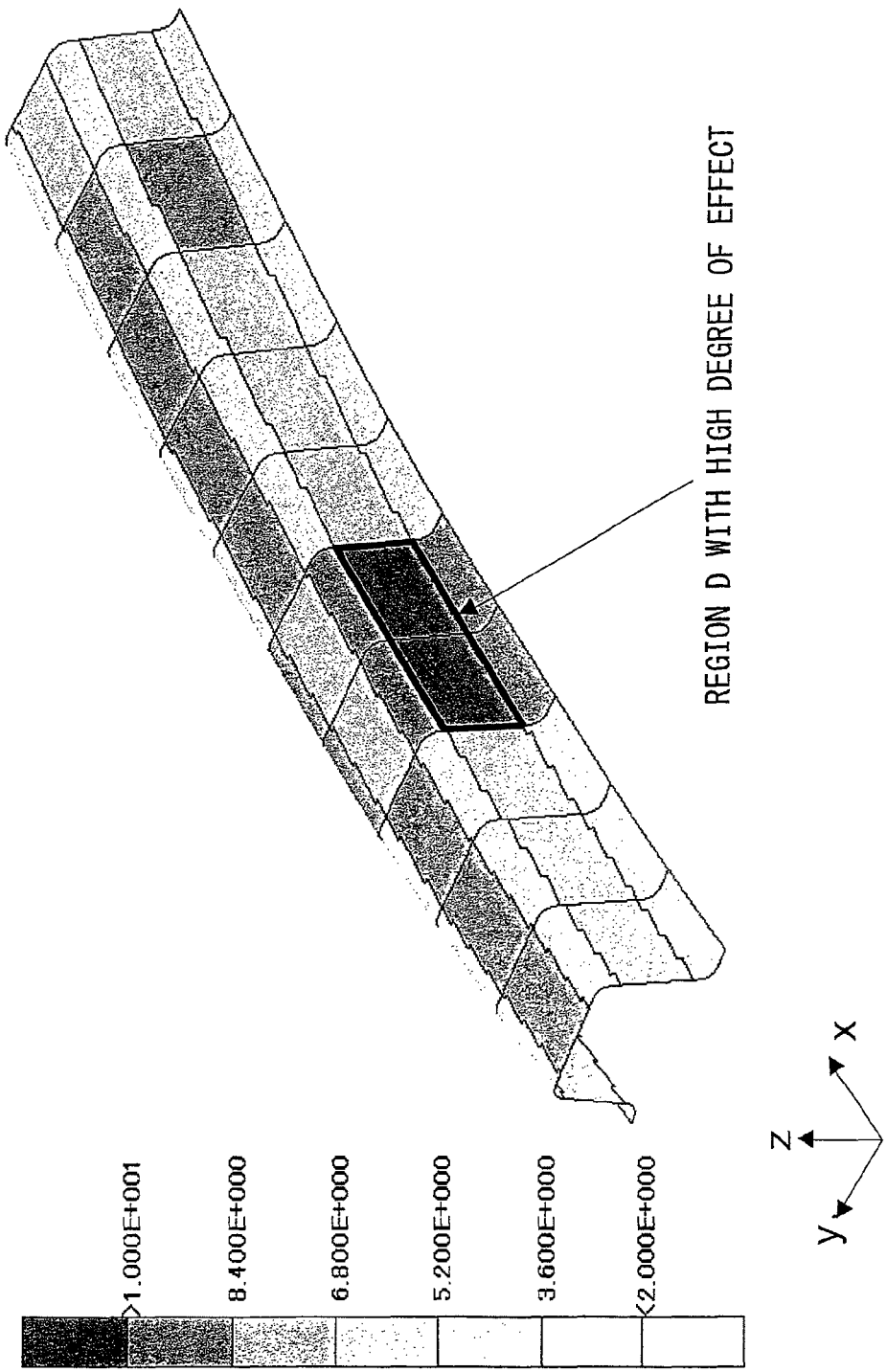
FIG. 48 is a perspective view showing an example showing by a contour diagram a degree of effect of springback at each region of a workpiece according to an embodiment of the present invention, FIG. 49 gives a perspective view and cross-sectional view showing an example of a workpiece according to an embodiment of the present invention, FIG. 50 gives views showing cross-sectional positions and a torsion angle of a part of a hat-formed cross-section according to an embodiment of the present invention.

FIG. 48 is a perspective view displaying by a contour diagram the degree of effect of springback for each region according to an embodiment of the present invention.

The Z-direction displacement of the noted point B belonging to the cross-section A before and after the springback shown in FIG. 46 was made the springback value. Here, the normalized value, that is, the degree of effect of springback, was defined as the degree of effect of springback=springback value÷each divided region area× 1000+10. The degree of effect of springback at each processed region was processed by the post processing software and displayed as the contour diagram shown in FIG. 48. From FIG. 48, the region D with the large springback value could be identified as the location of the cause of occurrence of springback.

Note that said degree of effect of springback is an example normalized by the divided regions, but may also be made the value divided by one of the representative length, representative width, representative height, representative sheet thickness, and tensile strength of the press formed part. By using a representative dimension to find the degree of effect of springback, the effect of the dimension of the workpiece on the springback can be quantitatively judged and the judgment of the identified location and measures against it become easier. For example, when the degree of effect of springback normalized by a representative dimension in the longitudinal direction is a value larger than that in the lateral direction, the fact that extending the bead form in the longitudinal direction enables the springback value to be reduced more and other information can be easily obtained.

Further, the value of the degree of effect of springback divided by the punch speed or blank holding force can be displayed by a contour diagram. By using such a variable for display by a contour diagram, it is possible to provide not only measures regarding the form of the workpiece so as to reduce the springback value, but also quantitative material for judgment of the press forming conditions. Measures based on the press forming conditions of the identified location can therefore be taken.

In the above, display by a contour diagram was explained as the method for display of the springback value and degree of effect of springback, but the springback value etc. may also be displayed by a vector diagram or by bars or other 3D objects or displayed by another well known display method.

As the post processing program for display by a contour diagram, LS-PREPOST, HyperView, Animator, Meta-Post, etc. may be used.

Example 7

FIG. 49 gives views showing a part of a hat-formed cross-section covered by springback analysis according to an embodiment of the present invention, wherein (a) is a perspective view and (b) is a cross-sectional view of the same. This is comprised of a web W0, side walls W1 and W2, and flanges F1 and F2.

For the numerical analysis performed by the press forming analyzer 11 and the springback analyzer 12, the existing plating forming simulation analysis software PAM-STAMP based on the finite element method was used. For the springback analysis, elastic analysis based on the static implicit method was used.

The forming conditions used were data of high strength steel sheet having, as properties of the metal plate, a sheet thickness of 1.6 mm and a tensile strength of the 780 MPa class. Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input, and a blank holding force of 600 kN was set.

FIG. 50 gives views of the cross-sectional positions and torsion angle of a part of a hat-formed cross-section according to an embodiment of the present invention, wherein (a) is a perspective view and (b) is a cross-sectional view of the same.

The obtained results were processed by the post processing software to obtain the coordinate values of the points forming the cross sections at the positions A and B shown in FIG. 50(a) and find the angle θ formed by the webs of the cross-sections. Here, the "springback value" is made the torsion angle θ.

Figure 51:
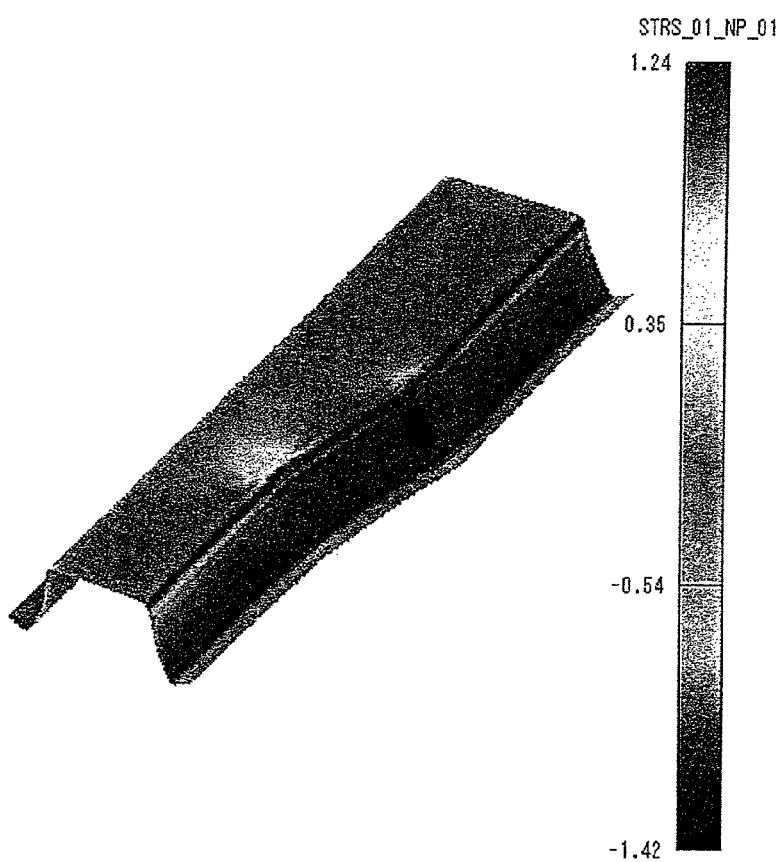
FIG. 51 is a view showing a stress distribution after springback of a workpiece according to an embodiment of the present invention.

FIG. 51 is a view showing the stress distribution after springback of the workpiece. The physical property value/physical property quantity processor 14 selects a region with a stress level of a level of 5% based on the stress distribution obtained from the springback analyzer 12 shown in FIG. 51.

Figure 52:
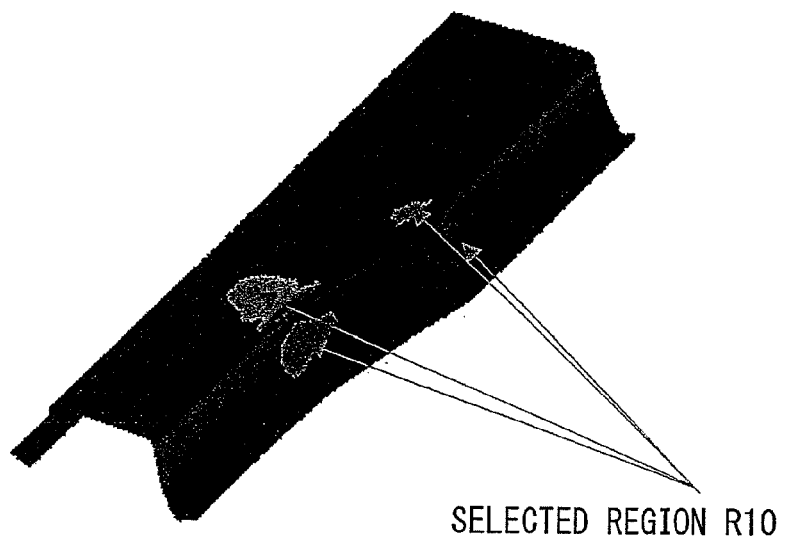
FIG. 52 is a view showing a region selected based on the stress distribution after springback of a workpiece according to an embodiment of the present invention.

FIG. 52 is a view showing the region selected based on the stress distribution after springback of the workpiece. FIG. 52 shows the region R10 selected by a stress level of a level of 5%.

The physical property value/physical property quantity processor 14 executes the following operations on all of the integration points of elements belonging to the selected region in this way:

$\sigma_x=0, \sigma_y=0, \sigma_z=0, \tau_{xy}=0, \tau_{yz}=0, \tau_{zx}=0$ $\epsilon_x=\epsilon_{x0}, \epsilon_y=\epsilon_{y0}, \epsilon_z=\epsilon_{z0}, \gamma_{xy}=\gamma_{xy0}, \gamma_{yz}=\gamma_{yz0}, \gamma_{zx}=\gamma_{zx0}$ Here, the stress components before processing at the integration points of the selected region were made ($\sigma_{x0}, \sigma_{y0}, \sigma_{z0}, \tau_{xy0}, \tau_{yz0}, \tau_{zx0}$), the strain components were made ($\epsilon_{x0}, \epsilon_{y0}, \epsilon_{z0}, \gamma_{xy0}, \gamma_{yz0}, \gamma_{zx0}$), the stress components after processing were made ($\sigma_x, \sigma_y, \sigma_z, \tau_{xy}, \tau_{yz}, \tau_{zx}$), and the strain components were made ($\epsilon_x, \epsilon_y, \epsilon_z, \gamma_{xy}, \gamma_{yz}, \gamma_{zx}$). The sheet thickness was the value before processing used as it is, while the modulus of elasticity and modulus of plasticity were made the values input to the software PAM-STAMP in the press analysis processing as they are. The processed stress or strain values were output as a processing result file by the file output means.

As the springback analysis processing, the above-mentioned software PAM-STAMP was used. The results of output of the physical property value/physical property quantity processing execution program were input to the software PAM-STAMP for springback analysis. For the springback analysis, elastic analysis based on the static implicit method was used.

Figure 53:
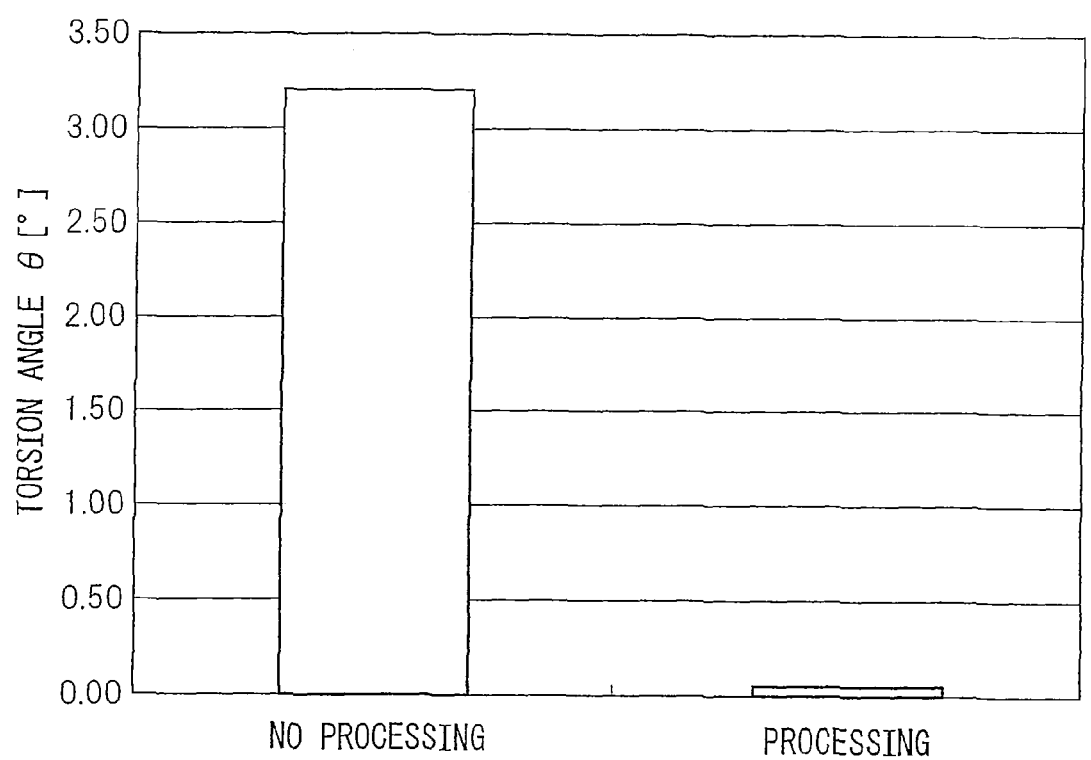
FIG. 53 is a view comparing the springback value in the case of not performing processing and the springback value in the case of performing processing according to an embodiment of the present invention, FIG. 54 gives views showing a cross-sectional position and flange spring quantity of a part of a hat-formed cross-section according to an embodiment of the present invention, FIG. 55 gives views showing the stress distribution before and after springback of a workpiece according to an embodiment of the present invention, FIG. 56 gives views showing the distribution of stress difference before and after springback of the workpiece and a region selected based on the stress difference according to an embodiment of the present invention.

FIG. 53 is a view comparing the springback value in the case of not performing processing and the springback value in the case of performing processing. From this, it became clear that the processing of the selected region R10 shown in FIG. 52 reduced the springback value. The selected region R10 shown in FIG. 52 could be identified as the location of the cause of occurrence of springback.

Example 8

Figure 54:
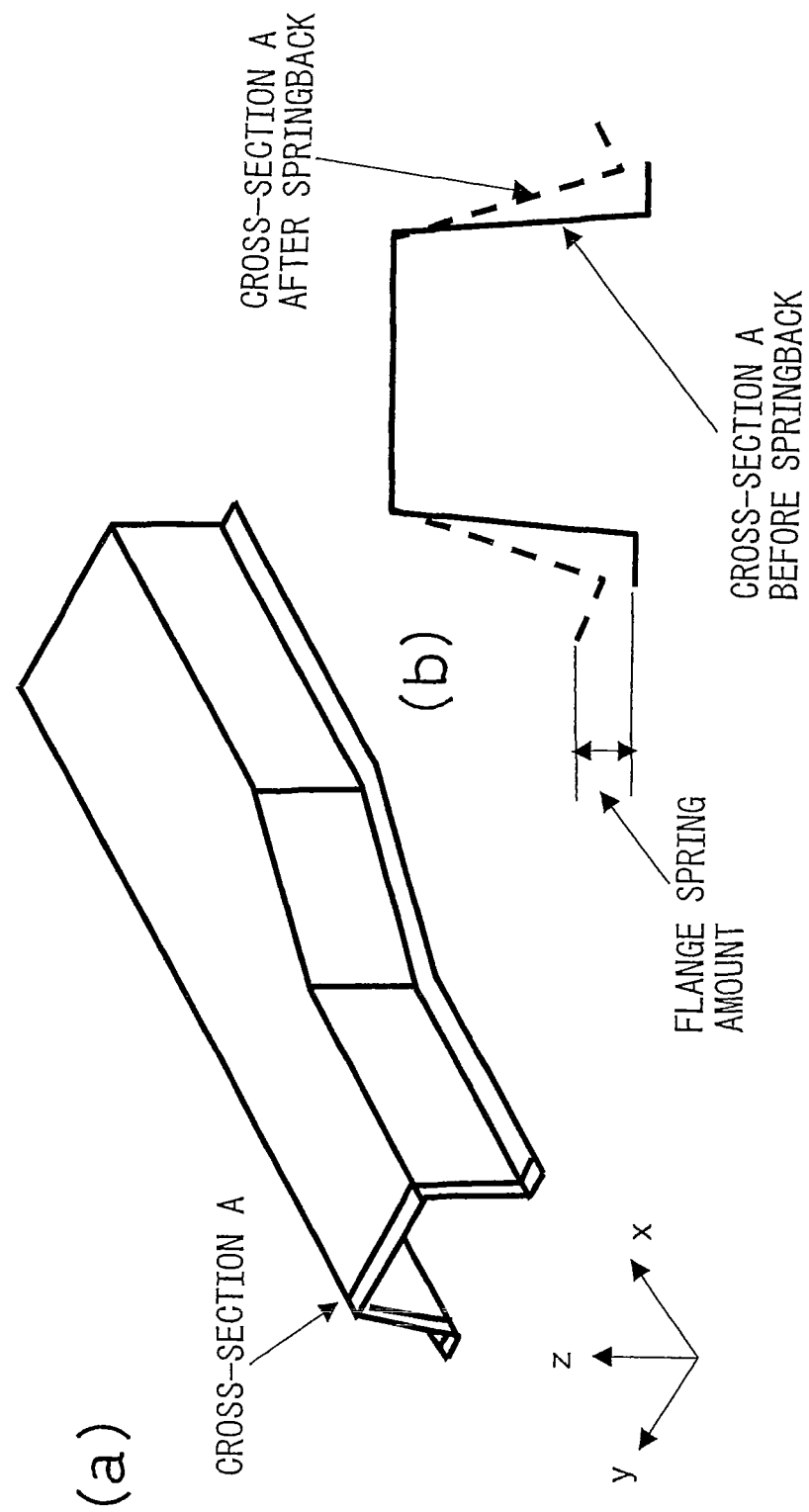

FIG. 54 is a view showing the cross-sectional position and flange spring quantity of a part of a hat-formed cross-section according to an embodiment of the present invention, wherein (a) is a perspective view, and (b) is a cross-sectional view of the same. The springback value was made the displacement of the end point of the cross-section A before and after springback, that is, the flange spring amount.

For the numerical analysis performed by the press forming analyzer 11 and springback analyzer 12, the existing plating forming simulation analysis software PAM-STAMP based on the finite element method was used. For the springback analysis, elastic analysis by the static implicit method was used.

The forming conditions used were data of high strength steel sheet having, as properties of the metal plate, a sheet thickness of 1.6 mm and a tensile strength of the 780 MPa class. Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input and a blank holding force of 600 kN was set.

Figure 55:
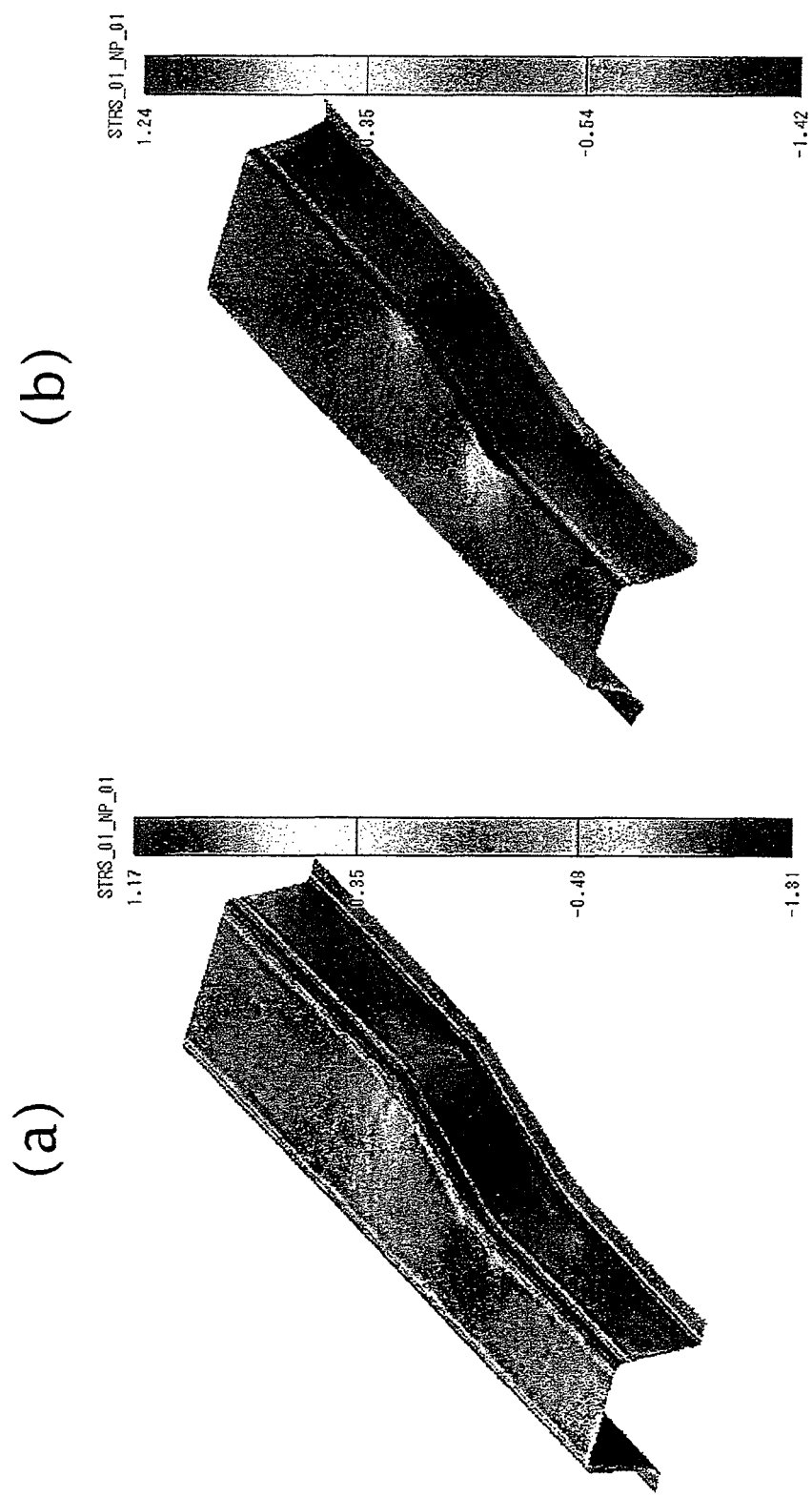
Figure 56:
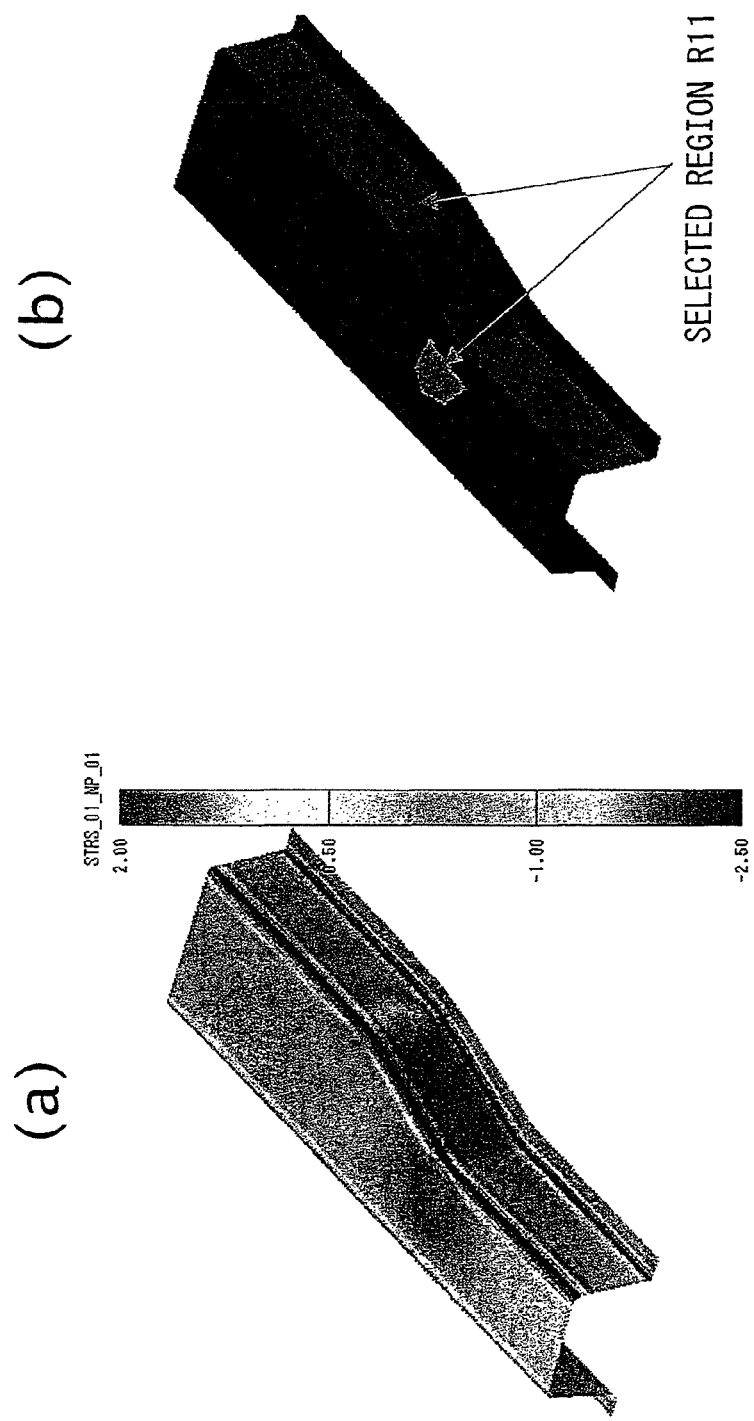

In FIG. 55, (a) shows the stress distribution before springback of the workpiece, while (b) shows the stress distribution after springback of the workpiece. In FIG. 56, (a) shows the stress difference before and after springback of the workpiece, while (b) shows the region selected based on the stress difference. FIG. 56 shows the region R11 selected by a stress level of a level of 5%.

The physical property value/physical property quantity processor 14 selects the region R11 of the stress level of a level of 5% shown in FIG. 5 based on the stress distribution obtained from the springback analyzer 12 shown in FIG. 55.

The physical property value/physical property quantity processor 14 performs the following processing on all integration points of elements belonging to the region selected in this way.

$\sigma_x=0, \sigma_y=0, \sigma_z=0, \tau_{xy}=0, \tau_{yz}=0, \tau_{zx}=0$ $\epsilon_x=\epsilon_{x0}, \epsilon_y=\epsilon_{y0}, \epsilon_z=\epsilon_{z0}, \gamma_{xy}=\gamma_{xy0}, \gamma_{yz}=\gamma_{yz0}, \gamma_{zx}=\gamma_{zx0}$ Here, the stress components before processing at the integration points of the selected region were made ($\sigma_{x0}, \sigma_{y0}, \sigma_{z0}, \tau_{xy0}, \tau_{yz0}, \tau_{zx0}$), the strain components were made ($\epsilon_{x0}, \epsilon_{y0}, \epsilon_{z0}, \gamma_{xy0}, \gamma_{yz0}, \gamma_{zx0}$), the stress components after processing were made ($\sigma_x, \sigma_y, \sigma_z, \tau_{xy}, \tau_{yz}, \tau_{zx}$), and the strain components were made ($\epsilon_x, \epsilon_y, \epsilon_z, \gamma_{xy}, \gamma_{yz}, \gamma_{zx}$). The sheet thickness was made the value before processing as it is, while the modulus of elasticity and the modulus of plasticity were made the values input to the software PAM-STAMP in the press analysis used as they are. The processed stress and strain values were output as processing result files by the file output means.

As the springback analysis, the above-mentioned software PAM-STAMP was used. The output of the physical property value/physical property quantity processing execution program was input to the software PAM-STAMP for springback analysis. For the springback analysis, elastic analysis by the static implicit method was used. The springback value was made the displacement of the end point of the cross-section A before and after springback, that is, the flange spring amount.

Figure 57:
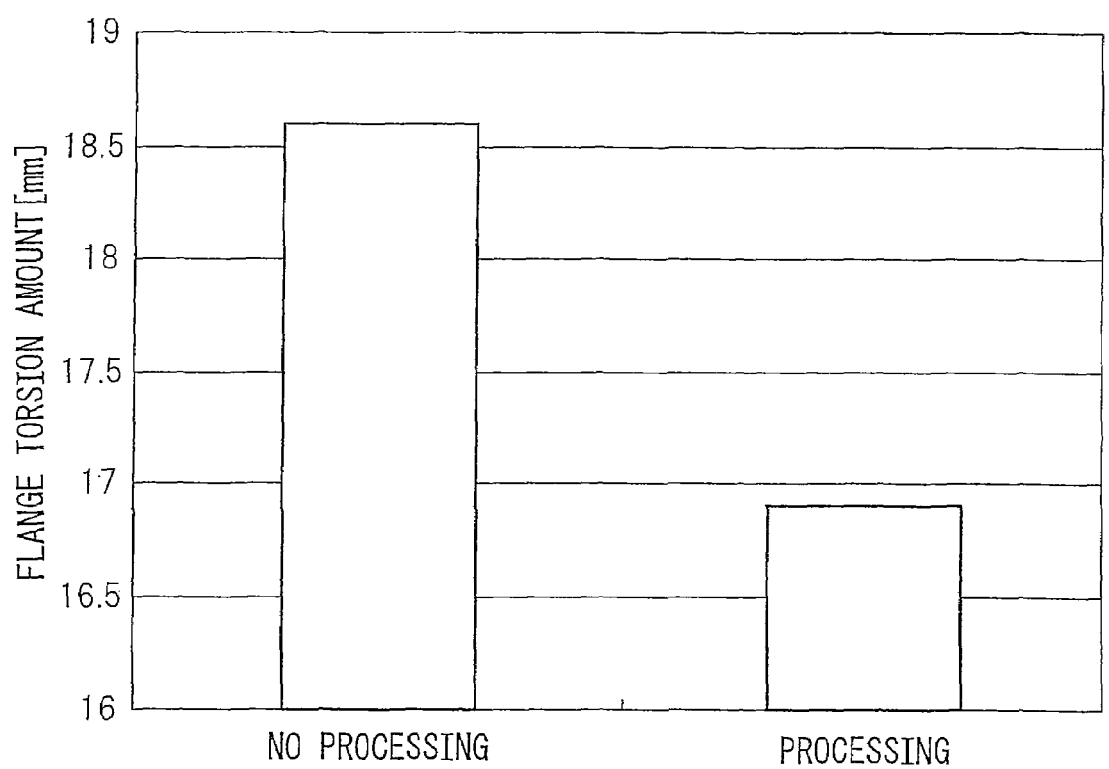
FIG. 57 is a view comparing the springback value in the case of not performing processing and the springback value in the case of performing processing according to an embodiment of the present invention, FIG. 58 gives a perspective view and cross-sectional view showing an example of a workpiece according to an embodiment of the present invention, FIG. 59 gives perspective views showing cross-sectional positions and a torsion angle of a workpiece according to an embodiment of the present invention, FIG. 60 gives views showing distributions of status quantities after press forming of first and second workpieces according to an embodiment of the present invention.

FIG. 57 is a view comparing the springback value in the case of not performing processing and the springback value in the case of performing processing according to an embodiment of the present invention. From this, it became clear that the processing of the selected region R11 shown in FIG. 52 reduced the springback value. The selected region R11 shown in FIG. 56 could be identified as the location of the cause of occurrence of springback.

Example 9

FIG. 58 gives views showing a part of a hat-formed cross-section covered by the springback analysis according to an embodiment of the present invention, wherein (a) is a perspective view and (b) is a cross-sectional view of the same. This is comprised of a web W0, side walls W1 and W2, and flanges F1 and F2.

For the numerical analysis performed by the press forming analyzer 11 and springback analyzer 12, the existing plating forming simulation analysis software PAM-STAMP based on the finite element method was used. For the springback analysis, elastic analysis by the static implicit method was used.

The forming conditions used were data of high strength steel sheet having, as properties of the metal plate, a sheet thickness of 1.6 mm and a tensile strength of the 780 MPa class. Further, the form of the tooling (die, punch, holder) was modeled by shell elements and analyzed assuming a rigid body. The clearance between the die and punch was made the same as the sheet thickness, that is, 1.6 mm. A frictional coefficient of 0.15 was input and a blank holding force of 600 kN was set.

FIG. 59 is a view showing cross-sectional positions and a torsion angle of a part of a hat-formed cross-section according to an embodiment of the present invention, wherein (a) is a perspective view and (b) is a cross-sectional view of the same.

The obtained results were processed by the post processing software to obtain the coordinate values of points forming the cross-sections at the positions A and B shown in FIG. 59, and the angle θ formed by the webs of the cross-sections was found. The "springback value" here is made the angle θ.

Figure 60:
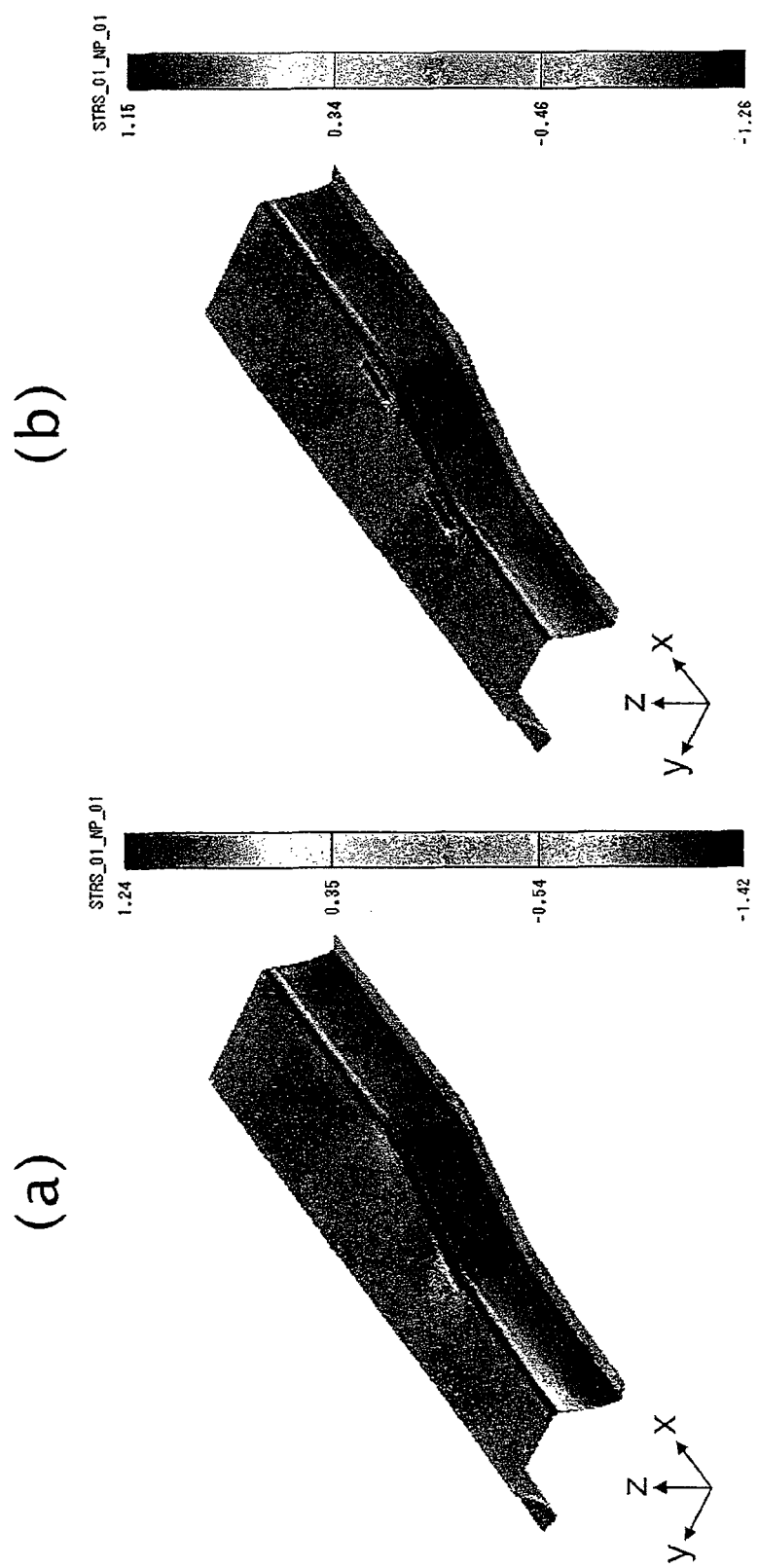

FIG. 60 is a view showing the distribution of status quantities after press forming of first and second workpieces. The first workpiece shown in (a) is a press formed part obtained under the first forming conditions, while the second workpiece shown in (b) is a press formed part obtained under second forming conditions differing in at least one element from the first forming conditions. In FIG. 60, a bead was added to change the form as the element of the different forming conditions of the second workpiece.

Figure 61:
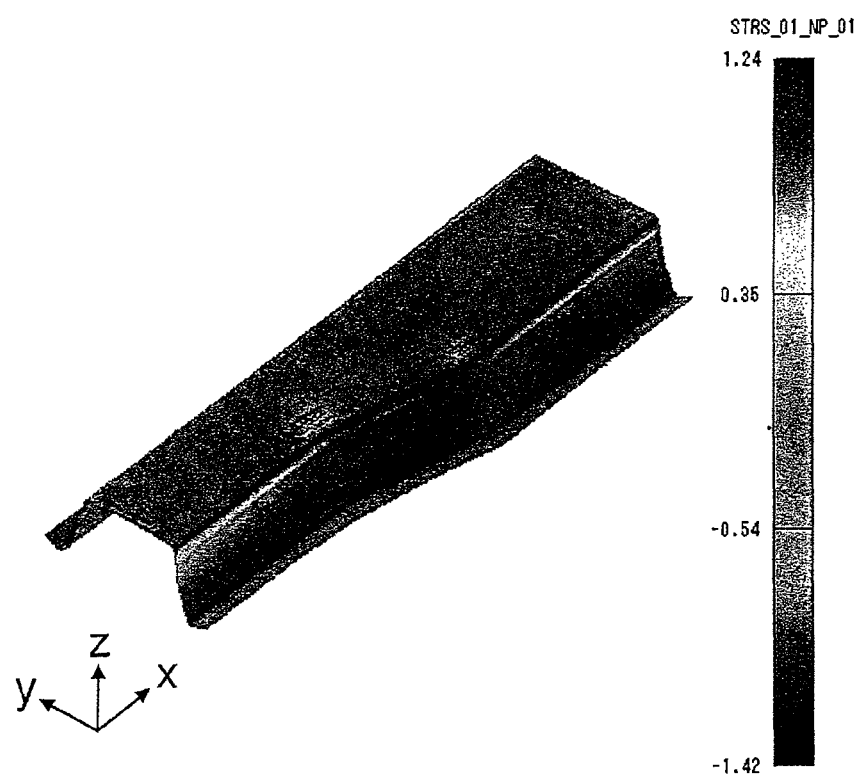
FIG. 61 is a view showing differences of status quantities after press forming of first and second workpieces according to an embodiment of the present invention.
Figure 62:
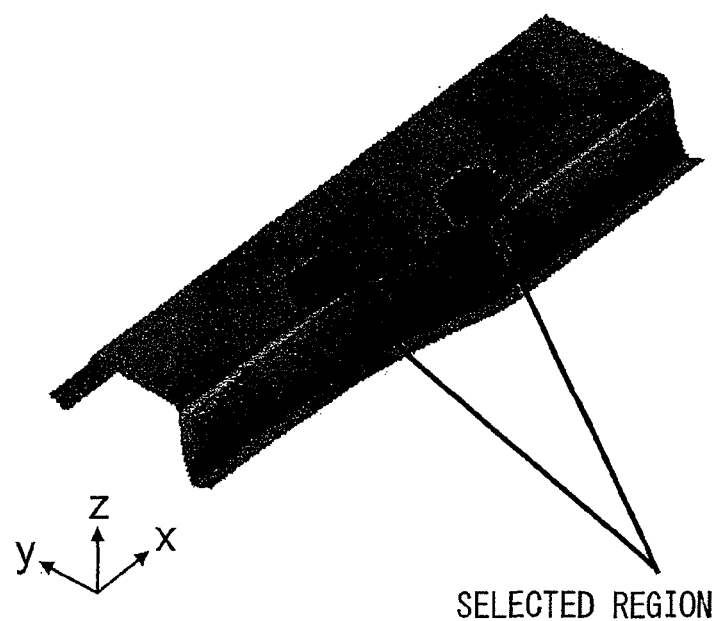
FIG. 62 is a view showing the selection of a region based on the difference of the status quantity according to an embodiment of the present invention.

FIG. 61 is a view showing the difference in status quantities after press forming of the first and second workpieces. FIG. 62 is a view showing the selection of regions based on the difference in status quantities. As shown in FIG. 61, a physical property value/physical property quantity processing program was used to find the difference in stress of the first and second workpieces for all regions. As shown in FIG. 62, a stress difference of a level of 10% was used to determine a selected region.

The physical property value/physical property quantity processing execution program executing the physical property value/physical property quantity processing divided said selected regions as the regions for processing and performed the following processing on all integration points of elements belonging to each selected region of the first workpiece.

$\sigma_x=0$, $\sigma_y=0$, $\sigma_z=0$, $\tau_{xy}=0$, $\tau_{yz}=0$, $\tau_{zx}=0$ $\epsilon_x=\epsilon_{x0}$, $\epsilon_y=\epsilon_{y0}$, $\epsilon_z=\epsilon_{z0}$, $\gamma_{xy}=\gamma_{xy0}$, $\gamma_{yz}=\gamma_{yz0}$, $\gamma_{zx}=\gamma_{zx0}$ Here, the stress components before processing at the integration points of the selected region were made ($\sigma_{x0}$, $\sigma_{y0}$, $\sigma_{z0}$, $\tau_{xy0}$, $\tau_{yz0}$, $\tau_{zx0}$), the strain components were made ($\epsilon_{x0}$, $\epsilon_{y0}$, $\epsilon_{z0}$, $\gamma_{xy0}$, $\gamma_{yz0}$, $\gamma_{zx0}$), the stress components after processing were made ($\sigma_x$, $\sigma_y$, $\sigma_z$, $\tau_{xy}$, $\tau_{yz}$, $\tau_{zx}$), and the strain components were made ($\epsilon_x$, $\epsilon_y$, $\epsilon_z$, $\gamma_{xy}$, $\gamma_{yz}$, $\gamma_{zx}$). The sheet thickness was made the value before processing as it is, while the modulus of elasticity and modulus of plasticity were made the values input to the software PAM-STAMP in the press analysis used as they are. The processed stress and strain values were output as processing result files by the file output means.

As the springback analysis, the above-mentioned software PAM-STAMP was used. The output of the physical property value/physical property quantity processing execution program was input to the software PAM-STAMP for springback analysis. For the springback analysis, elastic analysis by the static implicit method was used.

Figure 63:
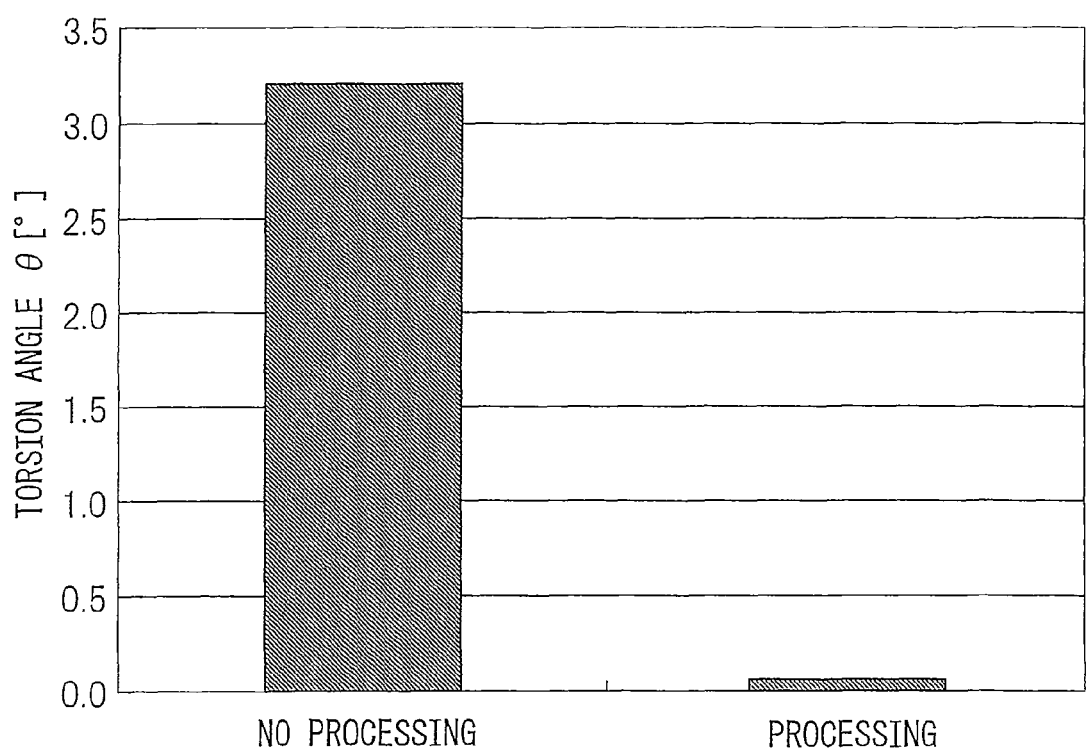
FIG. 63 is a view comparing the springback value in the case of not performing processing and the springback value in the case of performing processing according to an embodiment of the present invention, FIG. 64 gives views showing a part of a hat-formed cross-section covered by springback analysis.

The torsion angle of the cross-section B with respect to the cross-section A shown in FIG. 59 was made the springback value. FIG. 63 is a view comparing the springback value in the case of not performing processing and the springback value in the case of performing processing. Due to this, it became clear that the processing of the selected region at FIG. 62 enabled the springback value to be reduced. The selected region shown in FIG. 62 could be identified as the location of the cause of occurrence of springback.

Example 10

Figure 64:
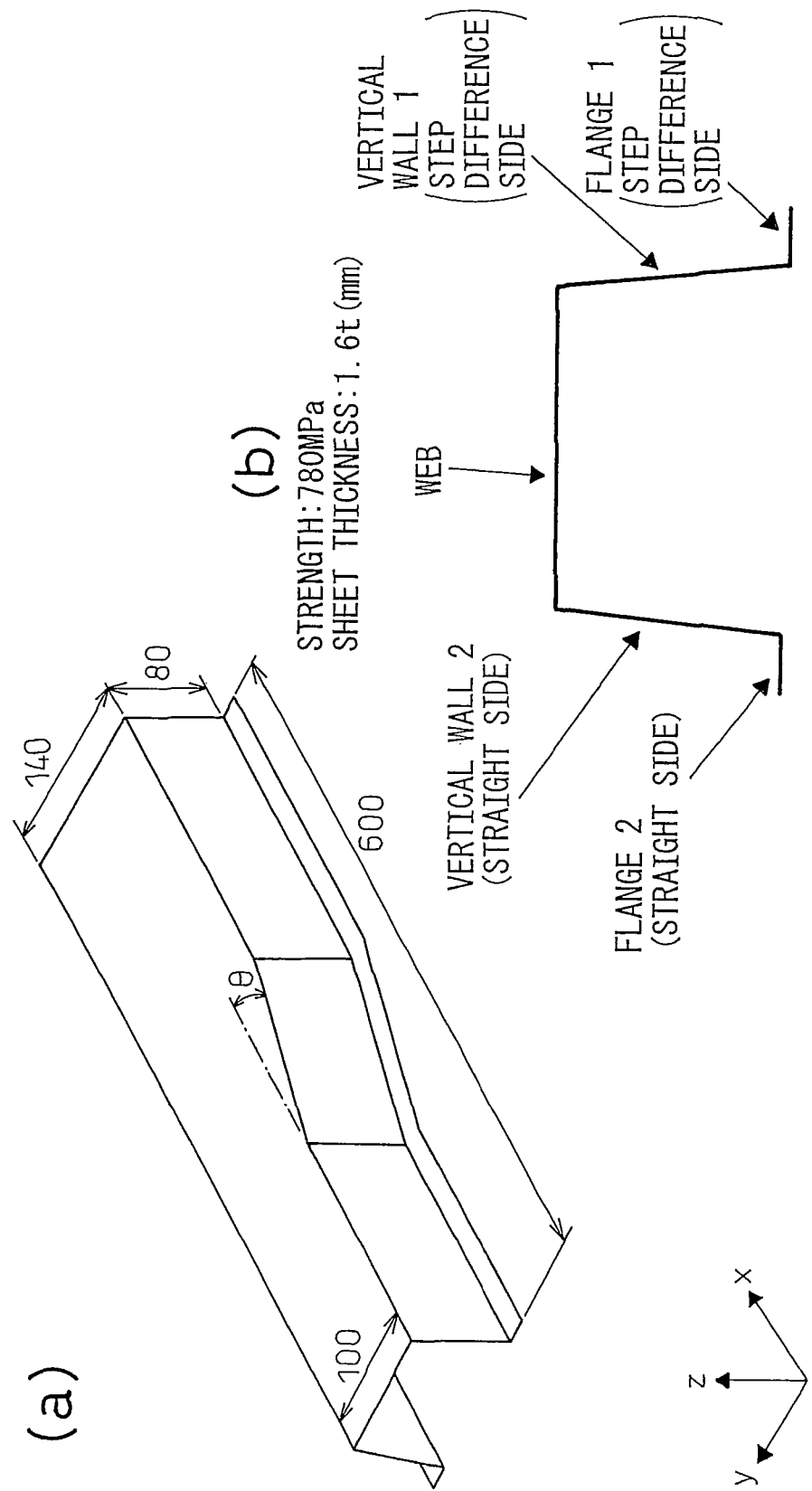

FIG. 64 gives views showing a part of a hat-formed cross-section covered by springback analysis according to an embodiment of the present invention, wherein (a) is a perspective view and (b) is a cross-sectional view of the same. This is comprised of a web, side walls 1 and 2, and flanges 1 and 2. The forming conditions used were data of high strength steel sheet having, as properties of the metal plate, a sheet thickness of 1.6 mm and a tensile strength of the 780 MPa class. The numerical analysis by the press forming analyzer 11 was performed using the finite element method LS-DYNA, while the springback analysis by the springback analyzer 12 was performed using the finite element method LS-DYNA.

Figure 65:
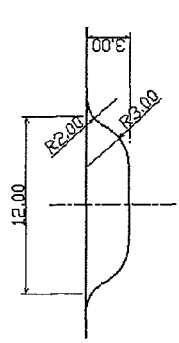
FIG. 65 is a view showing a data table of a bead and stress distribution substituted according to an embodiment of the present invention.

FIG. 65 is a view showing a data table of substituted beads and stress distribution according to an embodiment of the present invention. In this embodiment, three forms of beads and stress distribution were used.

Figure 66:
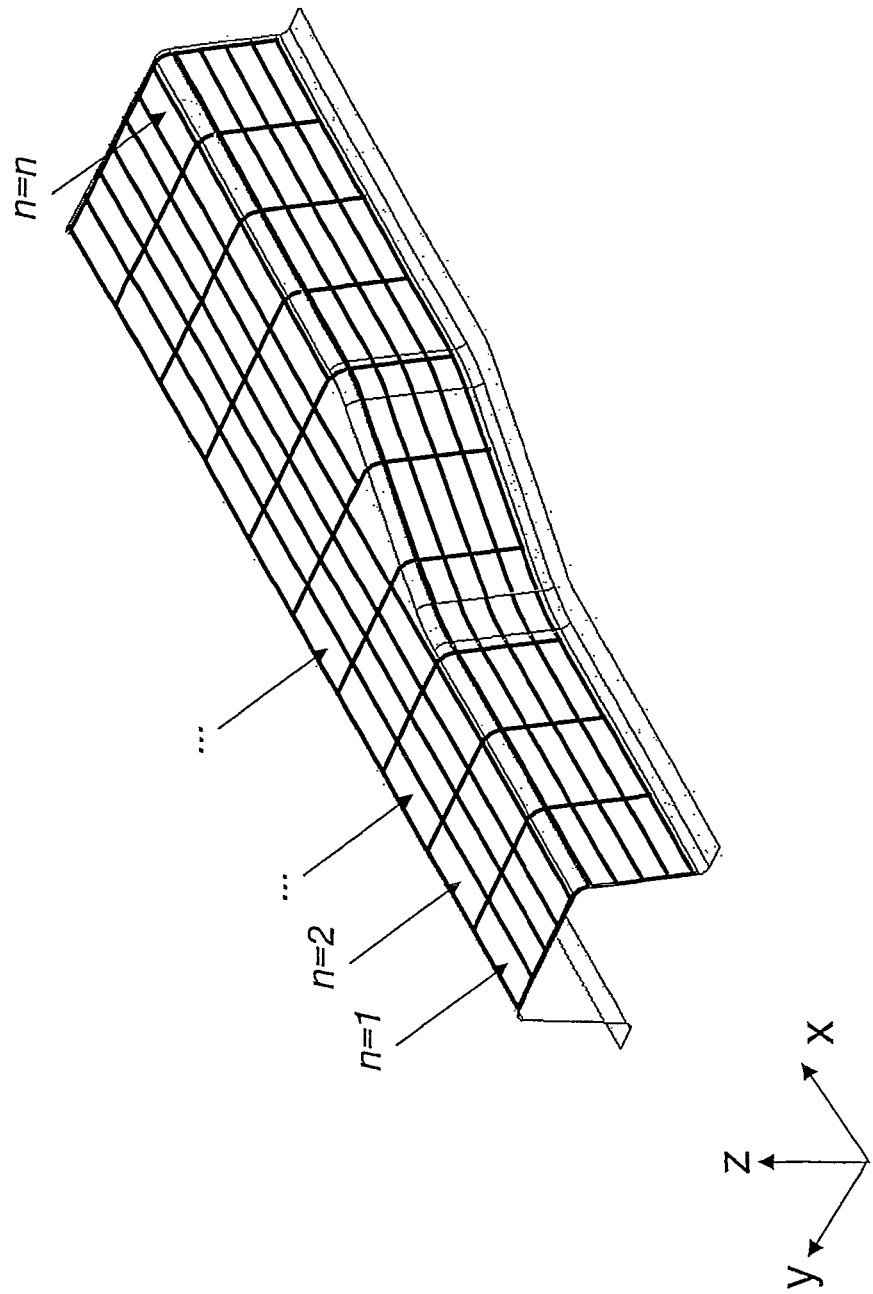
FIG. 66 is a view showing a division of a workpiece into regions according to an embodiment of the present invention.

FIG. 66 is a view showing the division of a workpiece into regions according to an embodiment of the present invention. As illustrated, to match with the forms shown in FIG. 65, the regions in which forms of beads and stress distributions of the workpiece can be arranged are divided into a number of regions in which the forms can be arranged. Further, the divided regions are assigned position nos. such as n=1, 2, . . . , n.

Figure 67:
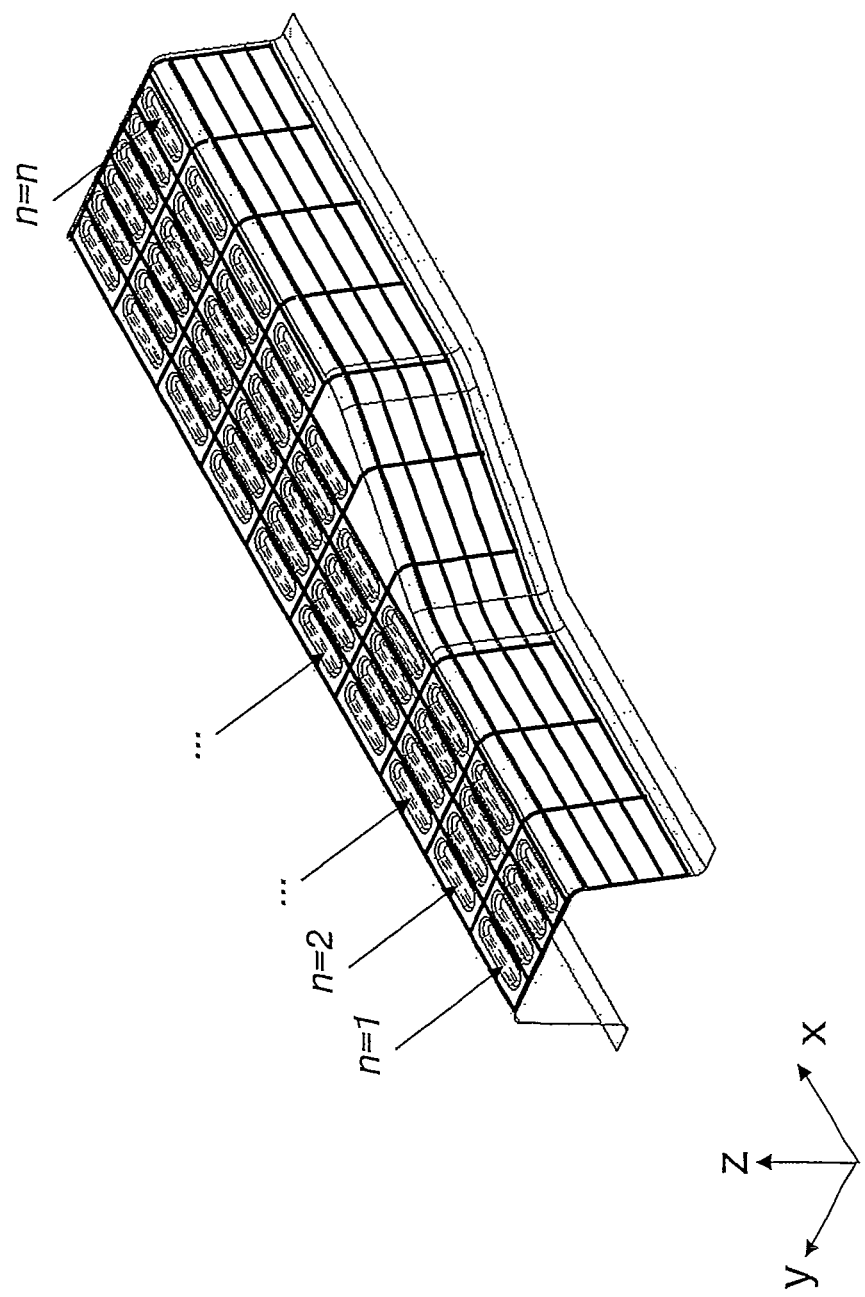
FIG. 67 is a view of arrangement of a form and stress at all designated regions of a workpiece according to an embodiment of the present invention, FIG. 68 gives views defining cross-sectional positions and a torsion amount according to an embodiment of the present invention.
Figure 68:
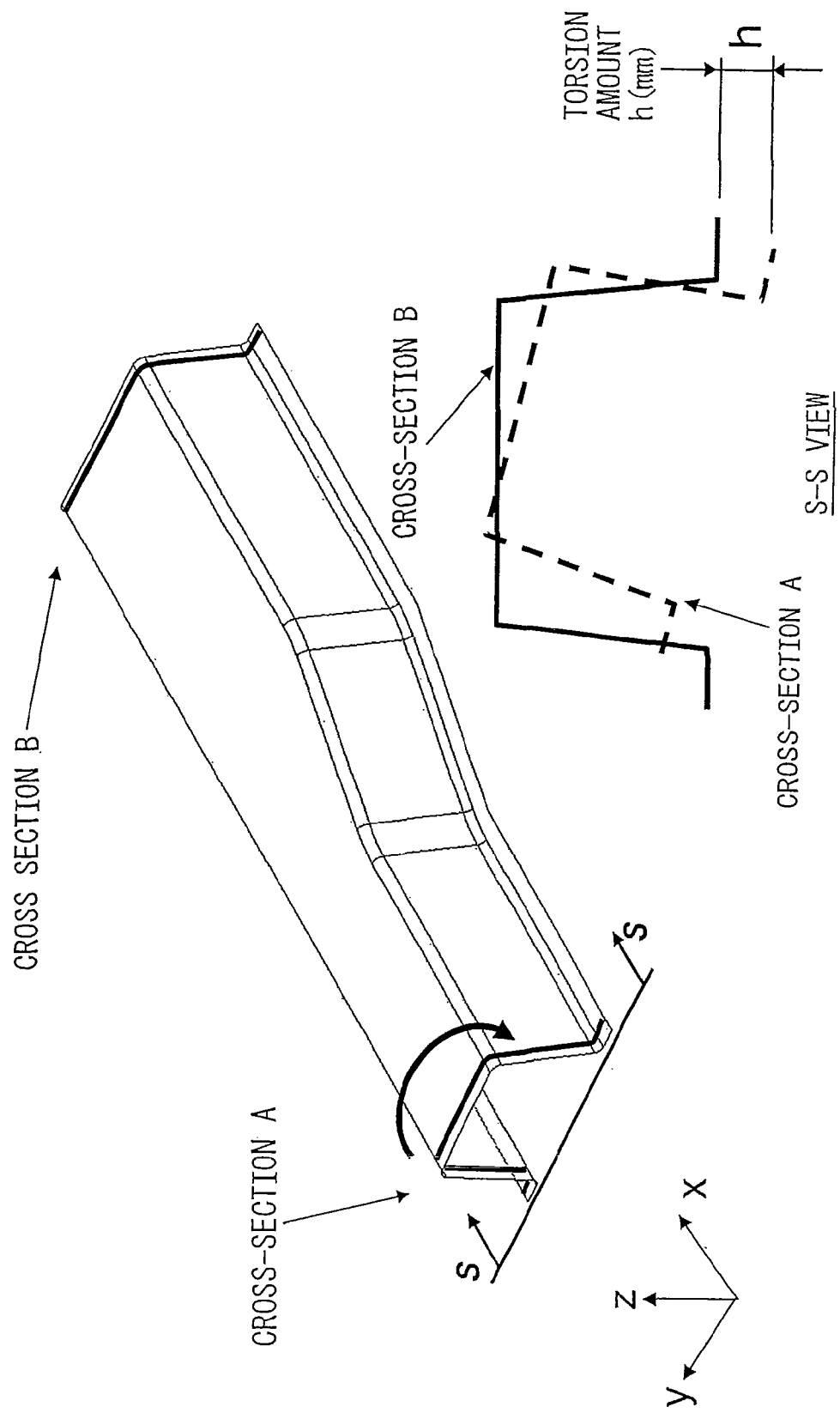

FIG. 67 is a view of the arrangement of form and stress in all designated regions of a workpiece according to an embodiment of the present invention. FIG. 68 gives views defining cross-sectional positions and amount of torsion according to an embodiment of the present invention. Here, this amount of torsion is made the springback value. Note that in the initial state where no bead or stress etc. is substituted, the springback value is 5.60 mm.

Figure 69:
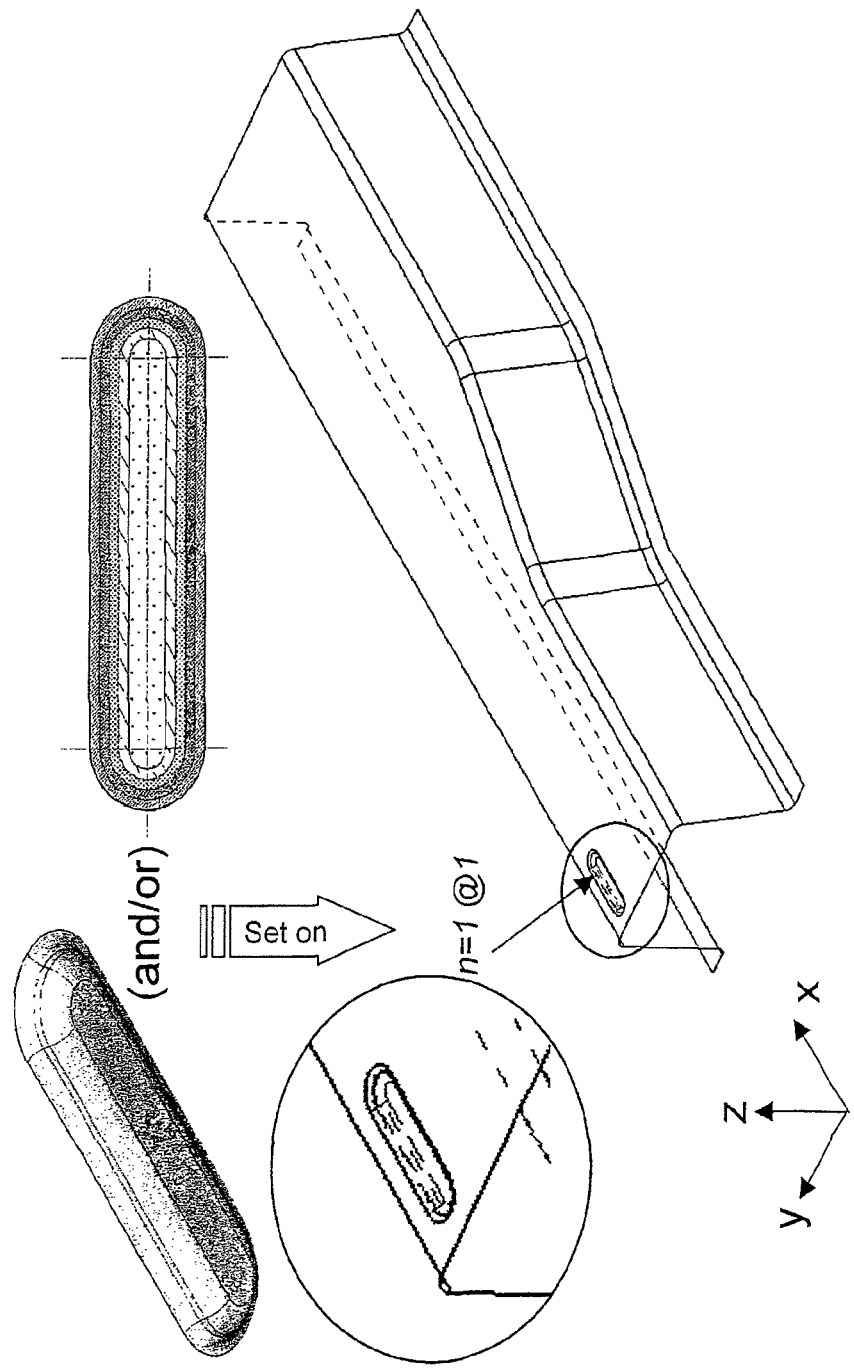
FIG. 69 is a view of arrangement of a bead and region at a designated region of a workpiece according to an embodiment of the present invention.

FIG. 69 is a view of the arrangement of the bead and region at a designated region of a workpiece according to an embodiment of the present invention. As a case study 1, the case of arrangement of a bead at the position shown by n=1@1 (initial position no.) of the workpiece, the case of arrangement of stress, and the case of arrangement of both the bead and stress were numerically analyzed. The form used was the Form No. A12w3d shown in FIG. 65 (depth 3 mm). The springback value was 5.58 mm, 5.64 mm, and 5.62 mm for the bead substitution, stress substitution, and bead and stress substitution.

Figure 70:
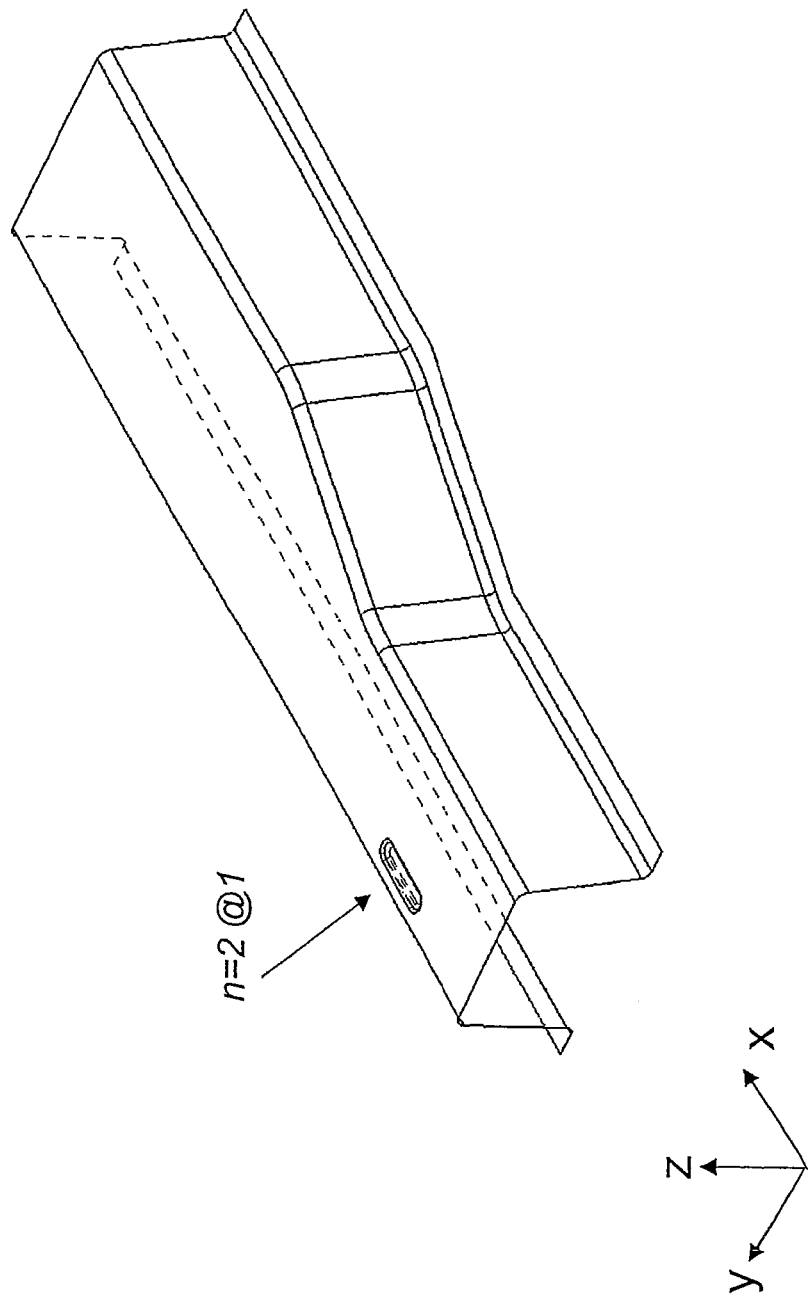
FIG. 70 is a view of arrangement of a bead and region at a designated region of a workpiece according to an embodiment of the present invention.

FIG. 70 is a view of the arrangement of a bead and region at a designated region of a workpiece according to an embodiment of the present invention. As a case study 2, the case of arranging a bead at a position shown by n=2@1 (second position no.) of a workpiece, the case of arranging stress, and the case of arranging a bead and stress were numerically analyzed. The springback value was 5.57 mm, 5.64 mm, and 5.62 mm for the bead substitution, stress substitution, and bead and stress substitution. When the springback value does not meet an allowable value etc. in this way, it is also possible to successively increase the position no. for the study.

Figure 71:
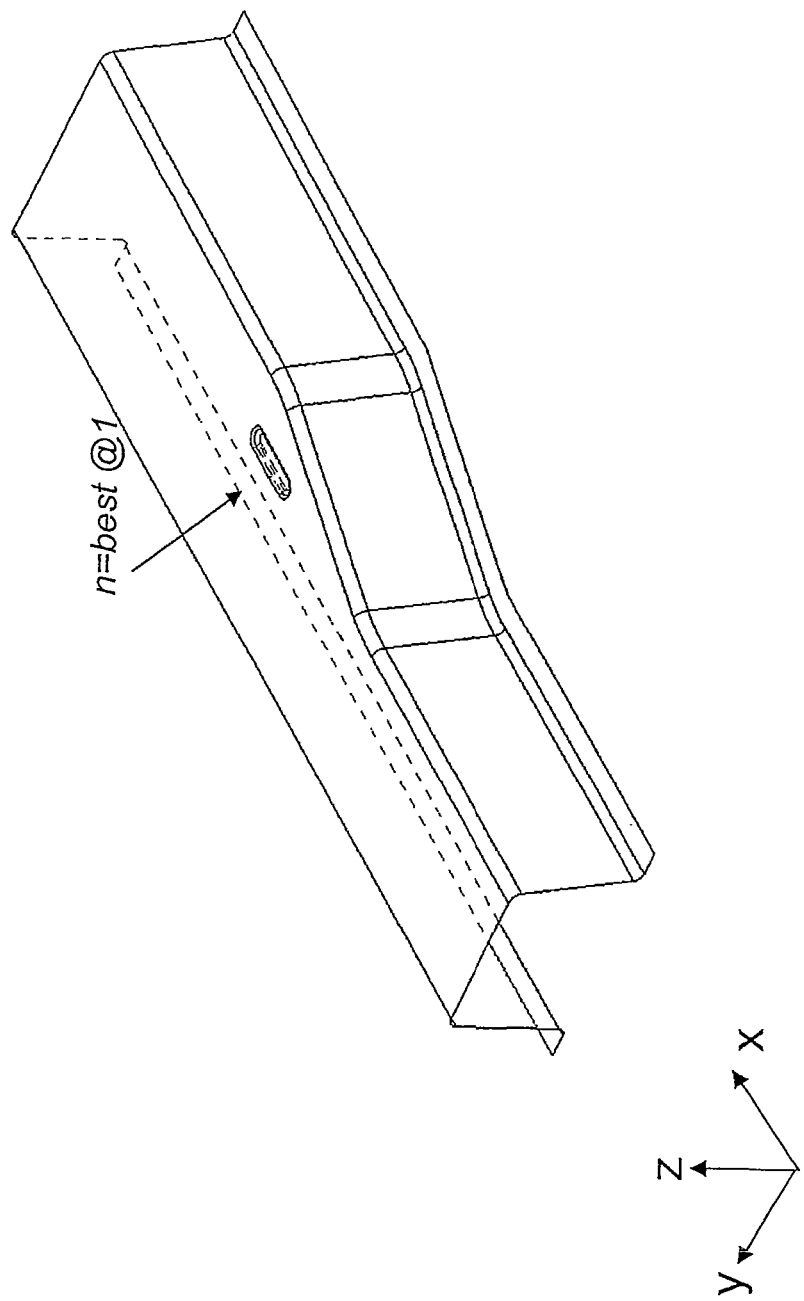
FIG. 71 is a view of arrangement of the one bead with the smallest springback value etc. according to an embodiment of the present invention.

FIG. 71 is a view of arrangement of one bead with the smallest springback value etc. according to an embodiment of the present invention (measure for reducing first springback value). As a case study 3, the case of arranging a bead at a position shown by n=best@1 of a workpiece, the case of arranging stress, and the case of arranging a bead and stress were numerically analyzed. The springback value was 5.22 mm, 4.26 mm, and 4.03 mm for the bead substitution, stress substitution, and bead and stress substitution. When the springback value is smallest in the case of substitution at one position in this way, the springback was improved 28%.

Figure 72:
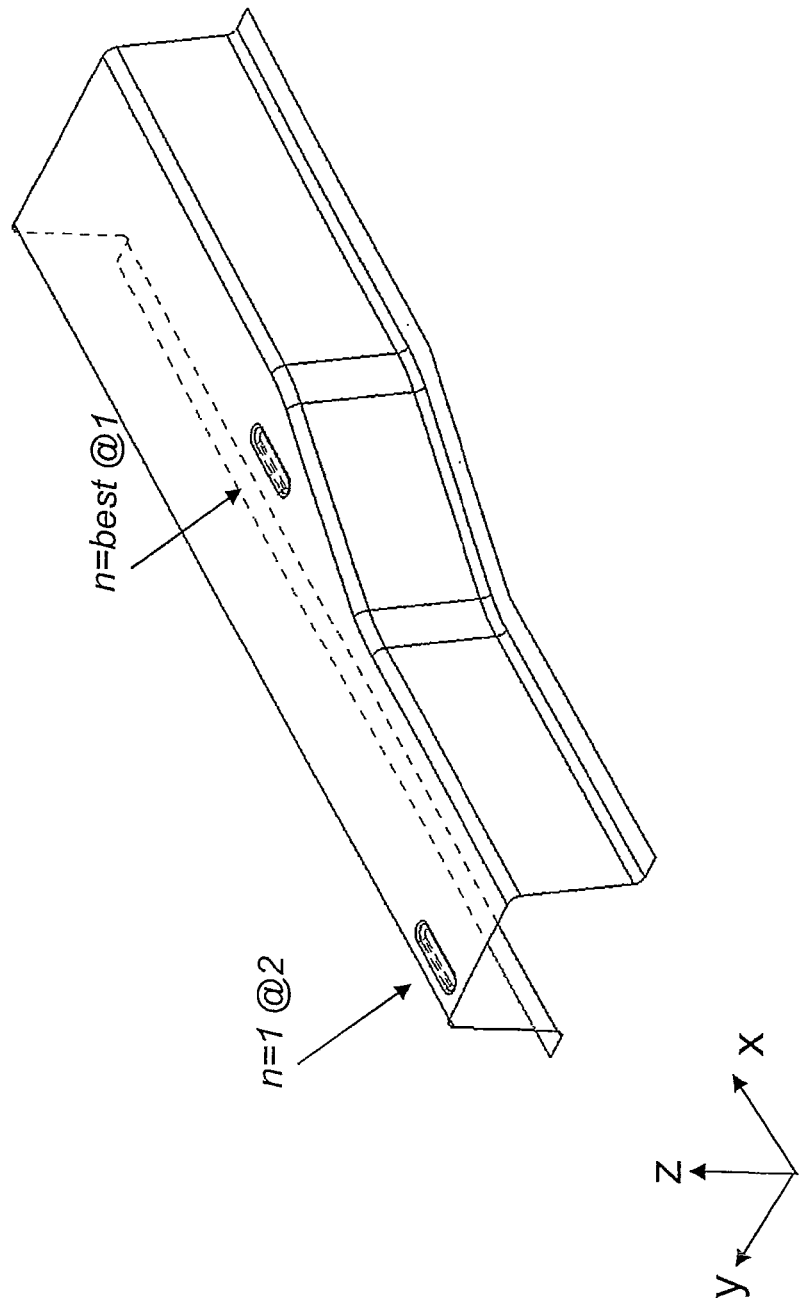
FIG. 72 is a view of arrangement of a second bead at the arrangement of the one bead with the smallest springback value etc. according to an embodiment of the present invention.

FIG. 72 is a view of arrangement of a second bead etc. at the arrangement of the one bead with the smallest springback value etc. according to an embodiment of the present invention. As a case study 3, the case of arranging beads at positions shown by n=1@2 and n=best@1 of a workpiece, the case of arranging stress, and the case of arranging a bead and stress were numerically analyzed. The springback value was 5.21 mm, 4.34 mm, and 4.11 mm for the bead substitution, stress substitution, and bead and stress substitution. When performing substitution for arranging a second bead in addition to the optimal example of arrangement of one bead in this way, the springback was improved 27% (measure for reducing second springback value).

Figure 73:
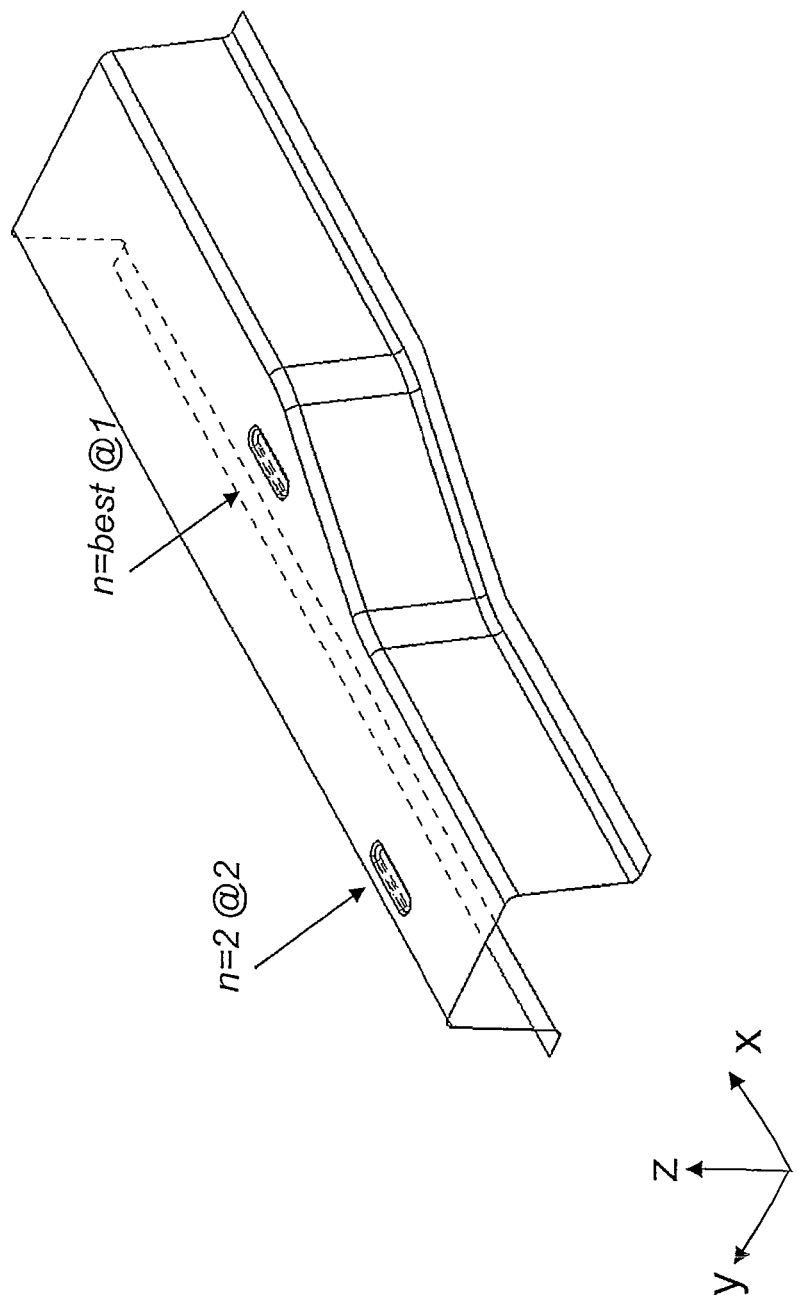
FIG. 73 is a view of arrangement of a second bead at the arrangement of the one bead with the smallest springback value etc. according to an embodiment of the present invention.

FIG. 73 is a view of arrangement of a second bead at the arrangement of the one bead with the smallest springback value etc. according to an embodiment of the present invention. As a case study 5, the case of arranging beads at positions shown by n=2@2 and n=best@1 of a workpiece, the case of arranging stress, and the case of arranging a bead and stress were numerically analyzed. The springback value was 5.23 mm, 4.32 mm, and 4.09 mm for the bead substitution, stress substitution, and bead and stress substitution. When performing substitution arranging a second bead etc. at a second position no. in addition to the optimum example of arrangement of the one bead etc. in this way, the springback was improved 27%. When the springback value does not meet an allowable value etc. in this way, it is also possible to successively increase the position no. for the study.

Figure 74:
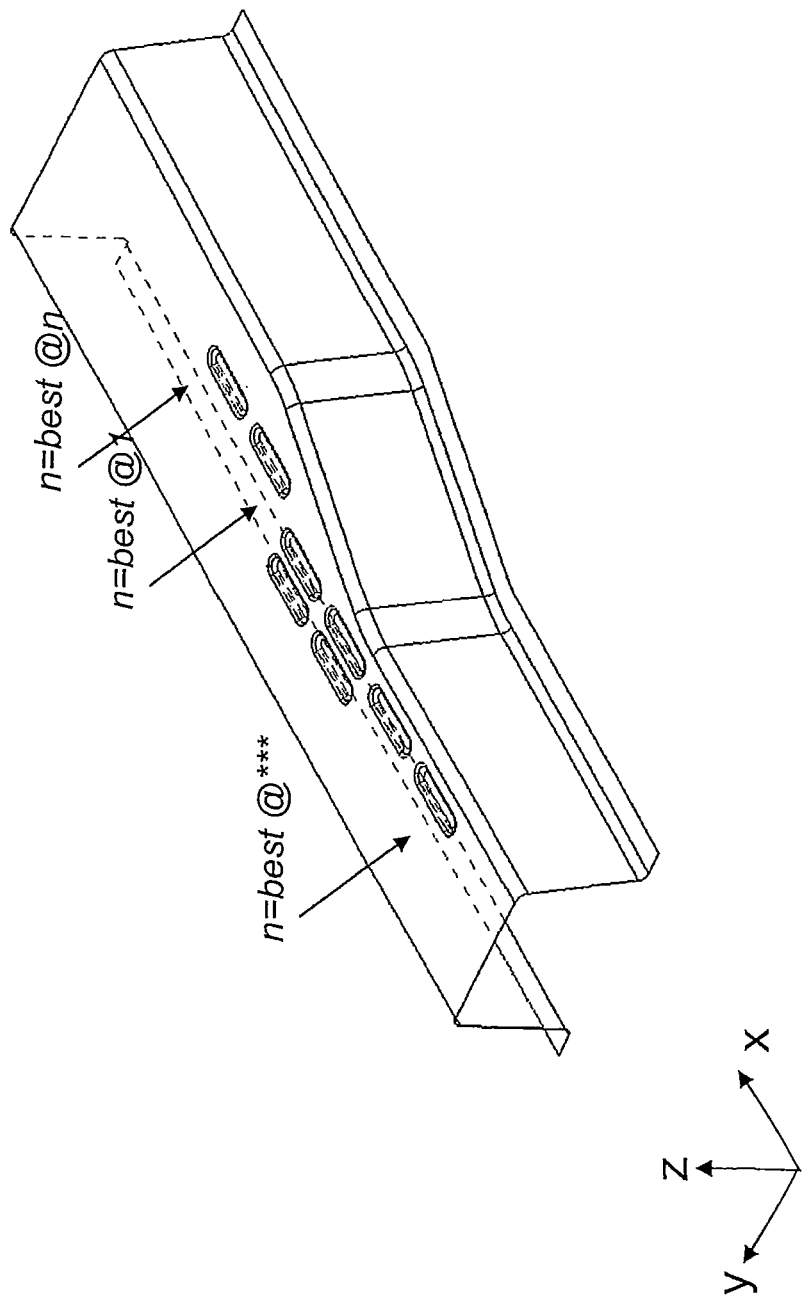
FIG. 74 is a view of arrangement of n number of beads etc. at a designated region of a workpiece according to an embodiment of the present invention.

FIG. 74 is a view of the arrangement of n number of beads etc. at a designated region of a workpiece according to an embodiment of the present invention. As a case study 6, substitution arranging, after a position n=best@1 where the springback value becomes the smallest when arranging one bead etc., a second bead etc. at the position n=best@2 where the springback value becomes the smallest was performed n number of times. The springback value was 3.22 mm, 1.60 mm, and 1.51 mm for the bead substitution, stress substitution, and bead and stress substitution. When performing substitution repeatedly searching for the optimum positions n times in this way, the springback was improved 73%.

Furthermore, as a case study 7, the case of substituting Form Nos. A12w3d (depth 4 mm) different from FIG. 74 at the n number of positions discovered at FIG. 74 was studied.

In this case, the springback value was 3.20 mm, 1.54 mm, and 1.46 mm for the bead substitution, stress substitution, and bead and stress substitution. When performing substitution repeatedly searching for the optimum positions n times in this way, the springback was improved 74%.

FIG. 75 is a view of arrangement of actual beads at designated regions of a workpiece according to an embodiment of the present invention. As a case study 8, actual beads were arranged at the positions shown in FIG. 74 and numerically analyzed. Even when arranging actual large beads at the locations of arrangement of small beads as shown in FIG. 74, the springback value was 1.60 mm. The springback was improved 72%. In this way, even when arranging actual beads based on the study of the positions of arrangement of beads explained above, the springback can be equivalently cut.

Table 3 shows the results of springback for the above-mentioned cases 1 to 8.

TABLE 3

| | | Springback h [mm] | | |
|---|---|---|---|---|
| Case | Characteristics | Bead | Stress | Bead and stress |
| 0 | No bead | 5.60 | 5.60 | 5.60 |
| 1 | n = 1@1 | 5.58 | 5.64 | 5.62 |
| 2 | n = 2@1 | 5.57 | 5.63 | 5.60 |
| 3 | n = best@1 | 5.22 | 4.26 | 4.03 |
| 4 | n = 1@2 | 5.21 | 4.34 | 4.11 |
| 5 | n = 2@2 | 5.23 | 4.32 | 4.09 |
| 6 | n = best@n | 3.22 | 1.60 | 1.51 |
| 7 | bead A12w3d -> 4d | 3.20 | 1.54 | 1.46 |
| 8 | Actual bead arranged | 1.60 | 1.60 | 1.60 |

In this way, the present invention can not only identify the position of occurrence of springback, but can also calculate measures against it.

As shown by the examples given above, the apparatus for identification of a location of occurrence of springback according to the present invention, compared with the past where an actual apparatus was used to study springback, can use numerical analysis to identify the location of occurrence of springback. Further, by quantitatively analyzing the degree of effect of springback of a workpiece and displaying information to enable a visual grasp, it is possible to easily identify the location of a cause of occurrence of springback. Furthermore, the present invention can also provide a measure against springback of a workpiece.

In this way, the apparatus for identification of a location of a cause of occurrence of springback according to the present invention, compared with the past where an actual apparatus was used to study springback, can use numerical analysis to identify the cause of occurrence of springback location, so the test work and expenses in the stage of mechanical design of a formed member can be reduced. Further, the apparatus for identification of a position of a measure against springback according to the present invention, compared with the past where an actual apparatus was used to study springback, can use numerical analysis to identify the position for the measure against springback, so the test work and expenses in the stage of mechanical design of a formed member can be greatly reduced.

Further, this apparatus according to the present invention can be expected to be able to be used for the entire range of workpieces, so would give rise to tremendous benefits in industry.

The embodiments explained above were only given as typical examples. Combinations of the elements of the embodiments and modifications and variations of the same would be clear to a person skilled in the art. A person skilled in the art clearly could make various modifications to the above embodiments without departing from the principle of the invention and the scope of the invention described in the claims.

The invention claimed is:

1. A method of identification of a location of a cause of occurrence of springback, said method comprising:
   numerically analyzing, by a computer, forming conditions of press forming to obtain forming data of a press formed part;
   dividing the press formed part into a plurality of regions based on a curvature and/or angle of the forming data of the press formed part, the curvature and/or angle providing a ridgeline as a boundary of the region;
   calculating a physical property value and physical property quantity of the plurality of regions after springback based on the forming data of said press formed part;
   specifying a region among the plurality of regions where at least one of said physical property value and physical property quantity data is larger than a predetermined value;
   numerically processing said at least one of a physical property value and physical property quantity data of said specified region;
   calculating a springback value after springback based on the results of said processing; and
   determining said specified region as a location of a cause of occurrence of the springback when the calculated springback value is equal to or under an allowable value.

2. The method of identification of a location of a cause of occurrence of springback as set forth in claim 1, wherein said processing step processes at least one of a physical property value and physical property quantity data of a region when there is a region where a difference of at least one of a physical property value and physical property quantity data of a press formed part before and after springback is larger than a predetermined value.

3. The method of identification of a location of a cause of occurrence of springback as set forth in claim 1, wherein said physical property value and physical property quantity are a sheet thickness, modulus of elasticity, modulus of plasticity, stress component values, and strain component values.

4. A method of identification of a location of a cause of occurrence of springback, said method comprising:
   numerically analyzing, by a computer, first forming conditions of press forming to obtain first forming data of a press formed part;
   numerically analyzing second forming conditions differing in at least one of said first forming conditions to calculate second forming data;
   dividing the press formed part into a plurality of regions based on a curvature and/or angle of the forming data of the press formed part, the curvature and/or angle providing a ridgeline as a boundary of the region;
   specifying a region where a difference of at least one of a physical property value and physical property quantity for the plurality of regions in said first and second forming data is larger than a predetermined value;
   numerically processing said at least one of the physical property value and physical property quantity data of said specified region;
   calculating a springback value based on the results of said processing; and
   determining said specified region as a location of a cause of occurrence of the springback when then calculated springback value is equal to or under an allowable value.

5. The method of identification of a location of a cause of occurrence of springback as set forth in claim 4, wherein said forming conditions are a form and properties of steel sheet, tooling form, and press conditions.

6. The method of identification of a location of a cause of occurrence of springback as set forth in claim 4, wherein said physical property value and physical property quantity are a sheet thickness, modulus of elasticity, modulus of plasticity, stress component values, and strain component values.

7. A method of identification of a cause of occurrence of springback comprising:
   numerically analyzing, by a computer, forming conditions of press forming to obtain forming data of a press formed part;
   dividing the press formed part into a plurality of regions based on a curvature and/or angle of the forming data of the press formed part, the curvature and/or angle providing a ridgeline as a boundary of the region;
   specifying at least one of the regions of the press formed part as a region for numerically processing;
   numerically processing at least one of a physical property value and physical property quantity data of said specified region; and
   calculating, by the computer, a springback value based on results of the numerical processing;
   wherein the numerically processing and the calculating are repeated while changing at least one of the regions, a physical property value, and physical property quantity, and when the calculated springback value is the smallest or the difference between the calculated springback value and a springback value calculated while not performing the numerically processing is the largest, the numerically processed physical property value and physical property quantity of the specified region is specified as a cause of occurrence of the springback.

8. The method of identification of a cause of occurrence of springback as set forth in claim 7, wherein the physical data are a sheet thickness, modulus of elasticity, modulus of plasticity, stress component values, and strain component values.

9. The method of identification of a cause of occurrence of springback as set forth in claim 7, wherein the numerically processing simultaneously processes a plurality of regions.

10. The method of identification of a cause of occurrence of springback as set forth in claim 7, wherein the dividing, the determining, the numerically processing and the calculating are repeated so that a region where the calculated springback value is the smallest is subdivided until the size of a subdivided region becomes a predetermined value or less.

11. The method of identification of a cause of occurrence of springback as set forth in claim 7, wherein the region includes one or more elements or calculation unit sections.

12. The method of identification of a cause of occurrence of springback as set forth in claim 7, wherein the region includes one or more integration points.

13. The method of identification of a cause of occurrence of springback as set forth in claim 7, wherein the dividing divides the press formed part into a plurality of regions based on a curvature and/or angle of the forming data of the press formed part.

14. The method of identification of a cause of occurrence of springback as set forth in claim 13, wherein the numerically processing numerically processes the physical data of integration points of the determined region where the curvature and/or angle is relatively large.

15. The method of identification of a cause of occurrence of springback as set forth in claim 7, further comprising:
   displaying the calculated springback value for each region.

16. The method of identification of a cause of occurrence of springback as set forth in claim 15, wherein the displaying displays the calculated springback value by a contour diagram.

17. The method of identification of a cause of occurrence of springback as set forth in claim 15, wherein the displaying displays a value of the calculated springback value divided by the area of each region.

18. The method of identification of a cause of occurrence of springback as set forth in claim 15, wherein the displaying displays a value of the calculated springback value divided by one of a representative length, representative width, representative height, representative sheet thickness, and tensile strength of the press formed part.

19. The method of identification of a cause of occurrence of springback as set forth in claim 15, wherein the displaying displays a value of the calculated springback value divided by a punch speed or blank holding force.

\* \* \* \* \*